United States Patent
Connary et al.

(10) Patent No.: US 11,935,288 B2
(45) Date of Patent: Mar. 19, 2024

(54) SYSTEMS AND METHODS FOR GENERATING OF 3D INFORMATION ON A USER DISPLAY FROM PROCESSING OF SENSOR DATA FOR OBJECTS, COMPONENTS OR FEATURES OF INTEREST IN A SCENE AND USER NAVIGATION THEREON

(71) Applicant: Pointivo Inc., Atlanta, GA (US)

(72) Inventors: Iven Connary, Atlanta, GA (US); Guy Ettinger, Flowery Branch, GA (US); Habib Fathi, Atlanta, GA (US); Jacob Garland, Peachtree Corners, GA (US); Daniel Ciprari, Atlanta, GA (US)

(73) Assignee: Pointivo Inc., Atlanta, GA (US)

( * ) Notice: Subject to any disclaimer, the term of this patent is extended or adjusted under 35 U.S.C. 154(b) by 0 days.

(21) Appl. No.: 17/567,347

(22) Filed: Jan. 3, 2022

(65) Prior Publication Data
US 2022/0130145 A1 Apr. 28, 2022

Related U.S. Application Data

(63) Continuation of application No. 17/108,976, filed on Dec. 1, 2020, now Pat. No. 11,216,663.
(Continued)

(51) Int. Cl.
*G06V 20/10* (2022.01)
*G05D 1/00* (2006.01)
*G05D 1/10* (2006.01)

(52) U.S. Cl.
CPC ......... *G06V 20/176* (2022.01); *G05D 1/0016* (2013.01); *G05D 1/0044* (2013.01); *G05D 1/101* (2013.01); *G06V 20/10* (2022.01)

(58) Field of Classification Search
None
See application file for complete search history.

(56) References Cited

U.S. PATENT DOCUMENTS 9,476,730 B2 10/2016 Samarasekera
9,786,097 B2 10/2017 Bell
(Continued)

OTHER PUBLICATIONS

Koch C, Paal SG, Rashidi A, Zhu Z, König M, Brilakis I. Achievements and challenges in machine vision-based inspection of large concrete structures. Advances in Structural Engineering. Mar. 2014;17(3):303-18. (Year: 2014).*
(Continued)

*Primary Examiner* — Michelle M Entezari
*Assistant Examiner* — Michelle M Entezari Hausmann
(74) *Attorney, Agent, or Firm* — Thomas | Horstemeyer, LLP

(57) ABSTRACT

The systems and methods herein provide improved methodologies for visualization on a user's display of sensor data (e.g., 2D and 3D information obtained from or derived from sensors) for objects, components, or features of interest in a scene. The previously acquired sensor data is processable for concurrent display of objects/features/scene or location visualizations to a user during their real-time navigation of a scene camera during a variety of user visualization activities. Sensor data can be acquired via the operation of vehicles configured with one or more sensors, such as unmanned aerial vehicles, or from other methodologies, or from any other suitable sensor data acquisition activities. Objects etc. for which acquired sensor data can be visualized by a user on a display includes buildings, parts of buildings, and infrastructure elements, among other things. The improved display of information to a user for visualization and information generation therefrom provides significant benefits over prior art display methodologies and exhibits
(Continued)

notable utility for user activities such as, inspection, condition assessment, performance assessment, insurance applications, construction, inventorying, building information modeling, asset management and the like. Information derivable from the methodologies herein can be used for machine learning libraries and digital twin processes.

11 Claims, 27 Drawing Sheets
(24 of 27 Drawing Sheet(s) Filed in Color)

Related U.S. Application Data

(60) Provisional application No. 62/942,171, filed on Dec. 1, 2019.

(56) References Cited

U.S. PATENT DOCUMENTS

| | | | |
|---|---|---|---|
| 9,886,774 B2 | 2/2018 | Fathi | |
| 9,904,867 B2 | 2/2018 | Serrano | |
| 9,911,340 B2 | 3/2018 | Samarasekera | |
| 10,127,722 B2 | 11/2018 | Shakib | |
| 10,139,985 B2 | 11/2018 | Mildrew | |
| 10,163,261 B2 | 12/2018 | Bell | |
| 10,217,488 B1 | 2/2019 | Huang | |
| 10,304,240 B2 | 5/2019 | Bell | |
| 10,445,933 B2* | 10/2019 | Rasane | G06T 19/006 |
| 10,659,686 B2 | 5/2020 | Trevor | |
| 10,777,004 B2 | 9/2020 | Gray | |
| 10,782,680 B2 | 9/2020 | Chapin | |
| 10,962,630 B1* | 3/2021 | Walls | G01S 7/4972 |
| 2010/0207936 A1* | 8/2010 | Minear | G06T 7/30 |
| | | | 345/419 |
| 2011/0176179 A1 | 7/2011 | Judelson | |
| 2012/0071752 A1 | 3/2012 | Hannuksela | |
| 2014/0192159 A1* | 7/2014 | Chen | G06T 15/20 |
| | | | 348/46 |
| 2016/0127690 A1* | 5/2016 | Kaehler | G06V 20/52 |
| | | | 348/143 |
| 2016/0217225 A1* | 7/2016 | Bell | G06F 30/13 |
| 2017/0039765 A1* | 2/2017 | Zhou | G06T 7/521 |
| 2017/0244959 A1 | 8/2017 | Ranjeet | |
| 2018/0032128 A1* | 2/2018 | Baranyi | G06F 3/011 |
| 2018/0144547 A1* | 5/2018 | Shakib | G06T 15/503 |
| 2018/0350130 A1 | 12/2018 | Westerhoff | |
| 2019/0050133 A1* | 2/2019 | Grossman | G06T 19/003 |
| 2019/0139297 A1 | 5/2019 | Chen | |
| 2020/0104646 A1* | 4/2020 | Eno | G06V 20/00 |

OTHER PUBLICATIONS

Tatzgern, Markus, et al. "Exploring real world points of interest: Design and evaluation of object-centric exploration techniques for augmented reality." Pervasive and mobile computing 18 (2015): 55-70. (Year: 2015).*

Zollmann, Stefanie, et al. "Flyar: Augmented reality supported micro aerial vehicle navigation." IEEE transactions on visualization and computer graphics 20.4 (2014): 560-568. (Year: 2014).*

Chen, Linfeng, et al. "Pinpointfly: An egocentric position-control drone interface using mobile ar." Proceedings of the 2021 CHI Conference on Human Factors in Computing Systems. 2021. (Year: 2021).*

Li, Jiannan, Ravin Balakrishnan, and Tovi Grossman. "StarHopper: A touch interface for remote object-centric drone navigation." ( 2020): 317. (Year: 2020).*

International Search Report for PCT/US20/62753 dated Mar. 3, 2021.

* cited by examiner

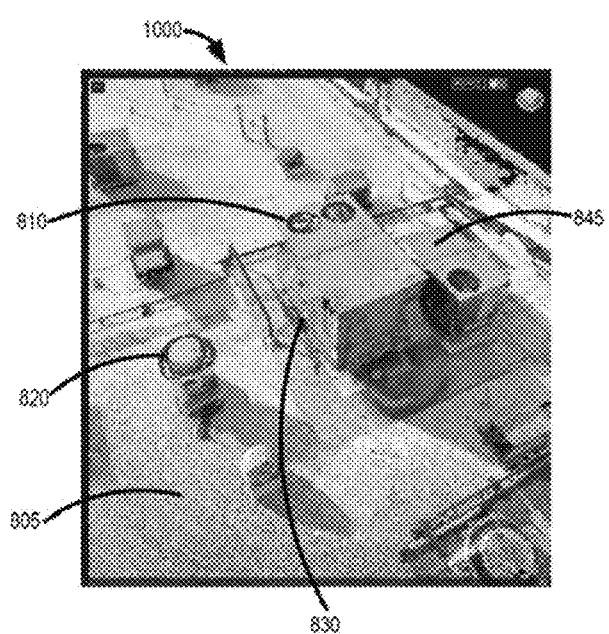 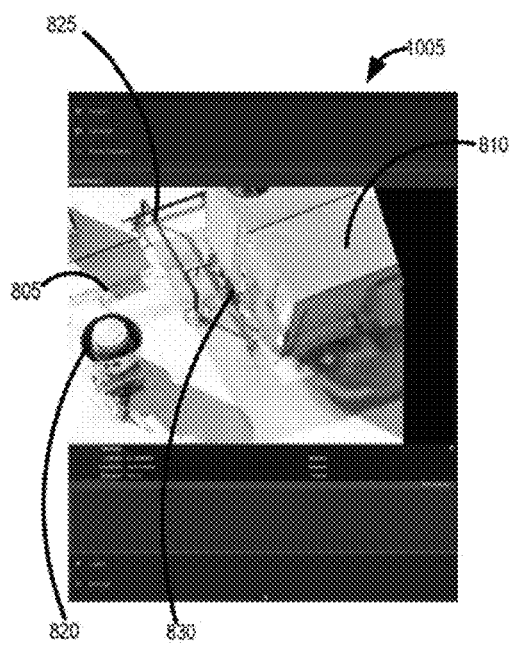
*FIG. 10A*  *FIG. 10B*

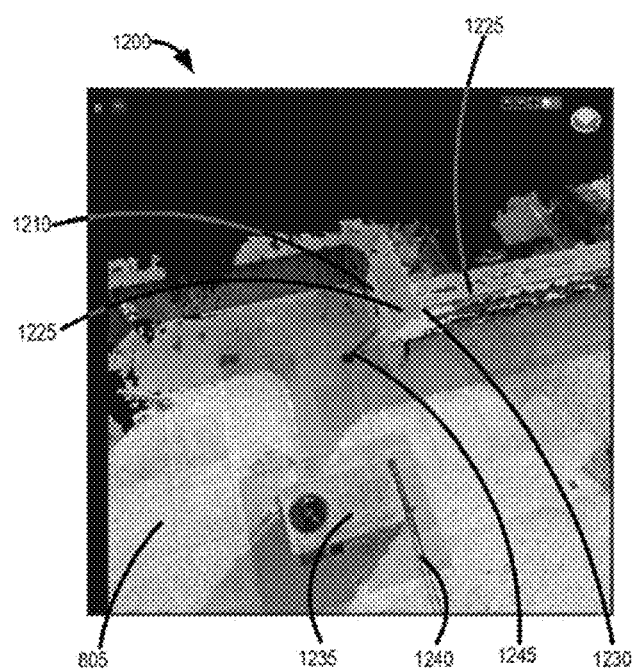 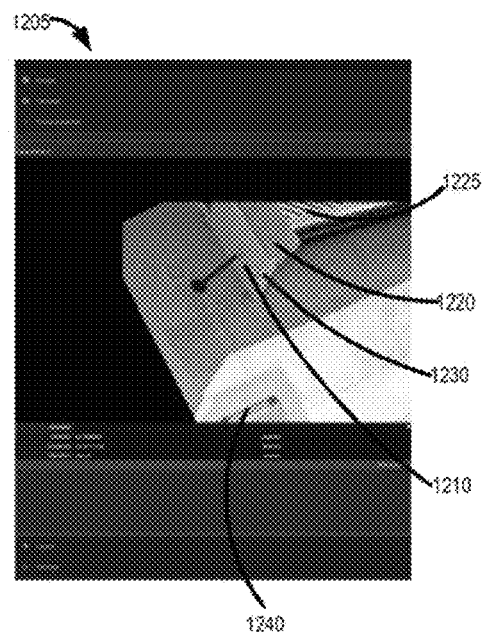
*FIG. 12A*  *FIG. 12B*

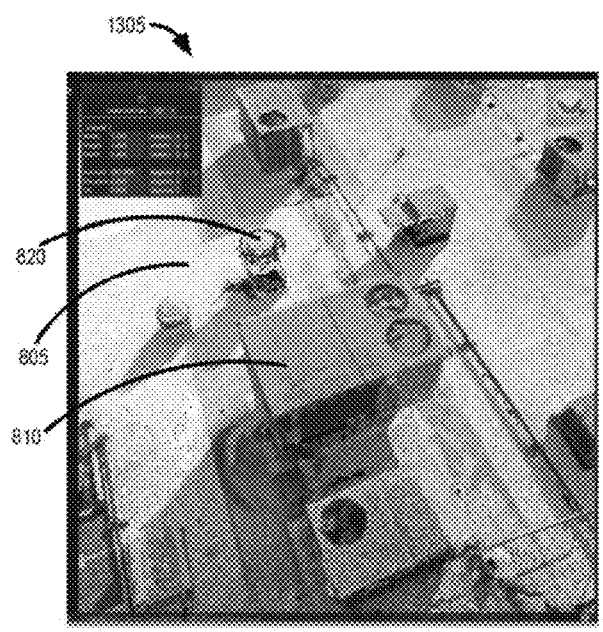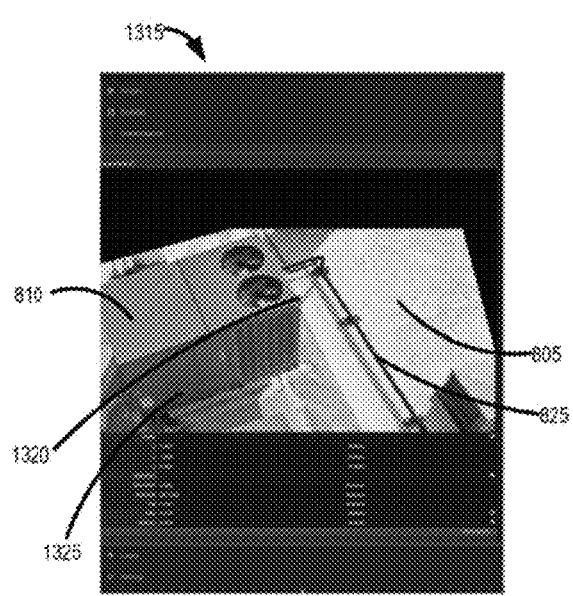
*FIG. 13B*  *FIG. 13C*

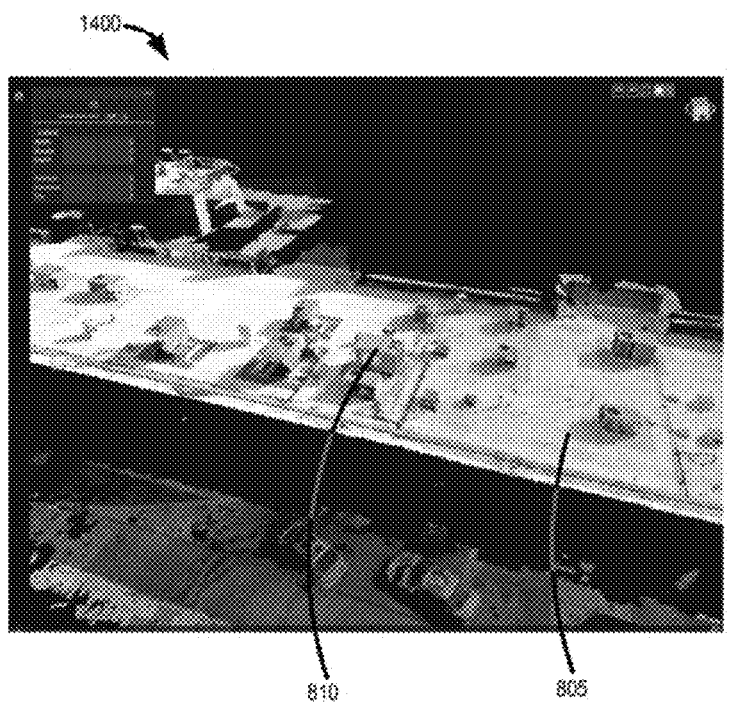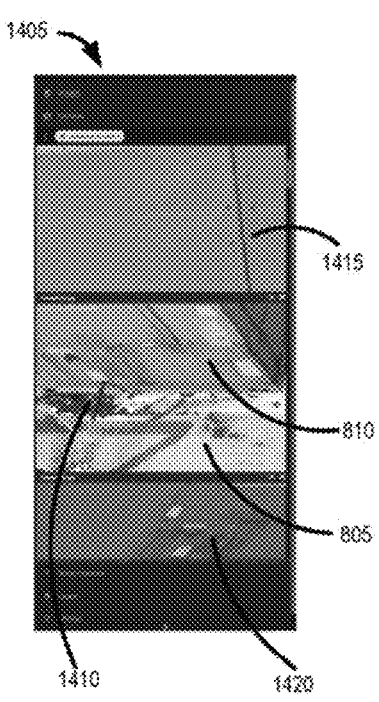
*FIG. 14A*  *FIG. 14B*

SYSTEMS AND METHODS FOR GENERATING OF 3D INFORMATION ON A USER DISPLAY FROM PROCESSING OF SENSOR DATA FOR OBJECTS, COMPONENTS OR FEATURES OF INTEREST IN A SCENE AND USER NAVIGATION THEREON

CROSS-REFERENCE TO RELATED APPLICATIONS

This application is a continuation application of co-pending U.S. Non-Provisional Application entitled "SYSTEMS AND METHODS FOR GENERATING OF 3D INFORMATION ON A USER DISPLAY FROM PROCESSING OF SENSOR DATA FOR OBJECTS, COMPONENTS OR FEATURES OF INTEREST IN A SCENE AND USER NAVIGATION THEREON," having Ser. No. 17/108,976 and filed Dec. 1, 2020, and claims priority to U.S. Provisional Patent Application No. 62/942,171, filed Dec. 1, 2019, the disclosure of which are incorporated herein in their entireties by reference.

STATEMENT OF GOVERNMENT INTEREST

This invention was made with government support under contract numbers 1519971 and 1632248 awarded by the National Science Foundation. The Government has certain rights in the invention.

FIELD OF THE DISCLOSURE

The systems and methods herein provide improved methodologies for visualization on a user's display of acquired sensor data (e.g., 2D and 3D information obtained from or derived from sensors) for objects, components, or features of interest in a scene. Information derivable from the methodologies herein can be used to generate reports, in dashboards, in the generation of machine learning libraries and in digital twin processes.

BACKGROUND OF THE DISCLOSURE

Advances in image capture and processing technologies continue to show great promise to reduce the amount of human labor needed to perform tasks associated with the inspection of objects that are located at a scene or location of interest. For example, image data acquired via cameras and other sensors mounted on remotely operated vehicles (e.g., drones, terrestrial vehicles, etc.) can streamline the human effort required to generate actionable information about objects or locations, such as buildings, infrastructure elements, or the like. The ability of a user to review such acquired image information while he remains at a remote location can improve safety and speed of tasks that previously required one or more humans to be physically present at the location where the object is in the physical world. Moreover, the ability of an unmanned vehicle, such as a drone, to move freely through and around a scene and objects present therein can allow a greater amount of information to be acquired than a human might be physically able to acquire from an in-person inspection.

By way of a non-limiting example, in the past, a cellular tower inspection required a trained person to climb the tower to assess the condition of the various tower components. Of course, this not only requires a person to travel from location to location to be physically present with the cellular towers, it is also dangerous. Moreover, some areas of a cellular tower are not even assessable by a skilled tower inspector. This meant that some portions of the tower could not be inspected at all by a human.

Cellular tower inspection is today conducted via drone information capture, whereby trained pilots operate a drone around a cellular tower to remotely view the cellular tower. While flying the drone around the cellular tower, the pilot can view the tower in real time for remote inspection that effectively makes the drone the "eyes" for the inspector while the drone is in the air. In other implementations, RGB images, as well as other relevant data, such as radio frequency ("RF") data can be captured during the drone flight for later review. This latter method can provide improvements over real time inspection that requires a human to simultaneously navigate the drone and assess the condition of the cellular tower. Instead, the pilot can focus on generating good coverage of the cellular tower with RGB images and other sensor data, and the actual inspection can be conducted using the data collected from the previously conducted drone fight.

The total amount of information that can be acquired from a well-piloted drone flight about the cellular tower is certainly much more expansive than would likely be obtained from a human, who will, of course, not be able to fly through the air to capture image/sensor data. Thus, an inspection of a cellular tower by a drone flight is likely to be more comprehensive than that conducted by a human inspector onsite in the first order. Moreover, the ability to capture and store data can also generate a more durable record of the cellular tower to allow review, analysis, and improvements to be provided for relevant aspects of the cellular tower (e.g., installation, performance/function, inspection, etc.) However, the value obtainable by separation of the data capture and data analysis steps for later human review is currently somewhat limited.

In this regard, the ability for a human to generate contextually relevant task information about a scene or location by remote viewing of previously captured image and/or sensor data will be highly dependent on the type(s) of information needed to complete the specific tasks, the nature and characteristics of the acquired data, the type and location of the object, features, scene, or locations of interest and/or scene in which it is located, the data acquisition event characteristics (e.g., weather, season, time of day, adjacent objects/buildings/trees, occlusions etc.), and the processing methodologies used. If the quality of the information available in the captured data to is not of a nature and caliber that enables him to generate the information required to complete the subject task, there is no reason for the switch from in-person to remote completion of that task. Even if remote data capture can generate enhancements in the available data, it is likely that there will be "holes" in the captured data that will limit the information obtainable.

Separation of data capture from data analysis is divorced from how a human takes in information in real time. In a real-life inspection, a human inspector who is onsite will adjust his actions in real time in response to his own senses. Thus, when he observes that a location or area may need closer inspection, he will home in on that area for closer review. Similarly, review of an object using image and sensor data obtained in a previously completed data capture event will generate visual or other signals to the person (or sometimes a computer) that an area on the object may require closer review. The person will then seek to home in on that area of interest to determine whether there is, in fact, a concern at that area on the object. However, since the data associated with that area will have already been captured and therefore is static, the ability to actually view that location will often be limited by the fidelity of the data associated with that location.

In this regard, the quality of 3D renderings of objects of interest obtainable from previously captured data will be dependent on the nature and characteristics of that data. In the example of drone data capture, the drone will capture RGB images for the scene or location having object(s) of interest therein. While a large number of images are typically captured in a drone flight, data available for later review will be dependent on the flight pattern of the drone vis a vis the location and scene, as well as the size, orientation, and number of objects in the scene and the environmental conditions prevailing when the image acquisition event was conducted.

In some cases, information needed for an object or location may require a closer review to obtain the information of interest in context. In such a case, in real life a person would move closer to the location or use magnification to generate the perspective needed to provide the necessary viewing perspective. However, this is often not possible when a review is conducted with previously captured image data. Magnification of a 3D rendering generated from image data may not provide the detail required to generate the information needed about that location in context. For example, when a plurality of RGB images is generated in a drone imaging event at a distance of x meters, magnification of those images with a goal of providing a remote viewing perspective of y meters distance (where y meters is desired reduction in the distance if a person was viewing the object in the images in real life), the detail available in a user view may be insufficient to generate the needed clarity for the object as needed in the context of the task.

Often in the case of 3D representation of a scene by a point cloud, the necessary magnification will generate a point cloud that is "lossy." That is, 3D information displayed in the form of point clouds may provide sufficient information in a display to allow someone to review the objects, components, or features of interest represented when the user is positioning his scene camera from viewport (or "viewport") that is close to the location where the image was obtained by the drone (i.e., proximate to x meters distance), but when the user seeks to magnify the point cloud to y meters distance, the magnified point cloud may not include sufficient detail to allow him to view the 3D rendering at the level of detail needed to tease out the necessary information because the point cloud does not include that detail in the first order. A lossy point cloud will generally be associated with missing information about the object, feature, scene, or location of interest as compared to the information that would be present from in-person viewing or from viewing of a high-resolution image thereof. To this end, a lossy point cloud may include fewer points or attributes for the object of interest, or the precision or accuracy of the generated points can be lower.

Magnification issues may be a lesser concern with high quality imaging devices existing now or in the future. Nonetheless, the use of previously captured image data will continue to be a problem even with improvements in imaging and other sensor data capture devices. Using the example of when point clouds are generated from a plurality of 2D RGB images generated in a drone image capture event, a lossy point cloud can also occur when there are occluded areas on the object of interest when the 2D image data is being acquired. Such occluded areas will, by definition, be associated with the absence of data in that region. Magnification of a generated point cloud might allow the object of interest to be viewed in sufficient detail, but the information needed about the object in context will not be obtainable because the captured image data will be missing that information. Another reason for a lossy point cloud is the fact that for a 3D point to be generated, at least two images are needed. An object region might be only visible in one RGB image and hence no 3D information would be available for the object in that region. Lossy point clouds can also occur when the image processing methodology is configured to increase the compression ratio at the expense of the quality of 3D data output. Whatever the reasons a point cloud is lossy, the amount of useful information about an object, feature, scene, or location of interest derivable from a 3D imaging event may be reduced and the usefulness of the displayed information for a specific task in context will be decreased when using previously captured data for that object.

By way of illustration of prior art processes, as shown in FIG. 1A, when the desired user viewpoint for the rendered scene point cloud 100 that is displayed from a distance on commercial roof 115, where the component or features 105 and 110 are equipment on the commercial roof 115 as the object of interest in the scene, the presence or absence of 105 and 110 can be identified from this far away vantage point shown by the positioning of the user's viewport (e.g., a scene camera operational in the scene or location) on their display. However, when the user desires to obtain a closer view of the features/components 105 and 110 on the commercial roof 115 as the object of interest as shown by point cloud 120 as an example 3D rendering generated from photogrammetry methods may not allow such information to be clearly viewable by the user in a display from the positioning of the user's scene camera, as is shown in FIG. 1B.

For some operations performed by a user viewing a display of generated sensor data, a lossy point cloud may be sufficient to provide the needed information about the object, feature, scene, or location of interest, as shown in FIG. 1A. Objects, features, scene, or locations of interest can be identified because they are observable as having characteristics expected (e.g., the size and shape of a conduit 110 present on commercial roof 115 in FIG. 1A), but more specific information about the object/component/feature may not be accurately obtainable by the user because the necessary detail for visualization from this vantage point is not discernible from the 3D rendering alone, as seen in FIG. 1B. For example, if a generalized count or inventory of an object, such as the number of a specifically shaped object on a commercial roof, is the subject of the user visualization event, the non-specific detail obtainable from a rendered point cloud of the commercial roof and the components and features thereon may be suitable to complete the task in context. However, in situations where a user desires more information than is resolvable from the 3D information as displayed to him, only approximate insights about an object, feature, scene, or location of interest will be obtainable from viewing of the 3D rendering alone. It follows that in many situations, onsite visitation by a human may be required to generate the information desired about an object of interest, and any components or features associated therewith.

A further limitation of the separation of displayed information on a user display in many, if not most, remote reviews of previously captured image or sensor data is that the information a user seeks to derive about an object of interest in a 3D scene rendering on his display he desires to be obtained from his review of the displayed object information—as indicated by his positioning of the scene camera in the scene vis a vis the object visible on his display—will not be directly derivable from the images that were captured from the imaging device. Drone flights in which image and sensor data are acquired may be conducted according to a flight pattern that is conducted independently of the nature and caliber or information that may be needed about the scene or location in context. In this regard, a drone pilot may operate a flight pattern directed toward good data capture for the location substantially without reference to the object of interest that may be present therein. Even if the pilot operates the drone in and around the scene or location to specifically generate good coverage of one or more objects present therein, the specific information that may be relevant to a specific object may not be known until a review of the data is conducted at a later time. For example, a user conducting an inspection of a cellular tower from previously captured scene or location data may be interested in visualizing information for the tower that is visible at a perspective that is at a 45 degree difference from the perspective at which the images were generated during the drone flight. If there are no images available as needed by the user to generate the information of interest about the object, he will not be able to complete the inspection as required. In other words, using prior art methodology, the intent and needs of a user who is conducting a virtual review of a 3D scene rendering including one or more objects of interest cannot always be affected. This means that while collection of image data for a scene or location of interest can allow a user to conduct his inspection from wholly new vantage points versus those available by a person on site, the amount of information derivable from these images will not allow him unlimited viewing angles and distances.

Moreover, the manner in which previously captured image and sensor data is provided to humans for remote viewing does not align with the way humans acquire and process information naturally. Humans best absorb information in the same way they exist in the world, by visualization in 3D. It follows that if a human is tasked with reviewing images of an object to provide his assessment thereof, such as in an inspection of a cellular tower, the information presented to him for task completion should replicate as closely as possibly how he would visualize and interact with the object in real life. To this end, he should be presented with information that allows him to visualize any areas or aspects that are relevant to his task in both 2D and 3D as naturally as possible, as this would be the way he interacts with the object and its surroundings is in real life.

Current methodology for displaying 2D and 3D information presents the 2D information with the 3D information in a non-synchronized fashion, which is different from the integrated manner in which humans acquire visual information in real life. While the 2D and 3D information displayed using these prior art methodologies may be close in perspective, the user will nonetheless be required to separately process the 2D and 3D information visually, followed by performance of a mental step where the visual information is integrated in his mind to define further actions, such as selection of an area on an image for further review. To allow the user to visualize 2D and 3D information for an object of interest and associated surroundings concurrently on his display, the user is typically required to select a point on the displayed 3D object rendering, after which the system will then serve up a plurality of 2D images associated with the object at or near the selected location. The user will then need to mentally toggle between the 3D rendering while browsing the several presented 2D images to identify the imagery that provides the most relevant information about that object location in context. The ability of the user to fully absorb the 2D and 3D information during the display of thereof is a significant issue in existing methods of remote review of previously captured image and sensor data. Depending on the skill level of the human reviewer, some relevant information may not be obtained. Even a highly skilled person will tire from the extra mental processing needed to move between the 2D and 3D image information.

Some refinements are currently available to reduce the effort needed to specifically identify 2D imagery that may be more relevant to a specifically selected location on the object as shown in 3D rendering form. This can be performed by filtering the 2D images displayed so that only images that are proximal to the point are selected for display along with the 3D information, however, the user is still required to expend considerable effort to mentally toggle between the 2D and 3D data to perform visual assessments of previously acquired sensor data, whether imagery or other sensor data, on a user display.

Still further, it would be expected that the collection of a large database of information about objects of interest could allow review of those objects over time, such as for generating automated predictions associated with condition, maintenance needs, and lifecycle analysis for facilities and infrastructure, or componentry associated therewith. The limitations discussed above with respect to human analysis of images and sensor data generated from existing capture methodologies also reduce the ability to perform robust automated analysis thereof, as well as the ability to acquire and deploy useful information thereof in forward-looking processes.

There remains a need for improved methodologies to generate user displays of information needed for remote review of previously captured image or sensor data for one or more objects of interest in a scene or location. There is a further need to allow the user to view 3D information for one or more object(s) present in previously captured data from substantially any perspective (e.g., distance, angle, etc.) to generate the information needed in context. It would further be desirable to be able to automatically analyze previously captured image or sensor data for one or more objects of interest in a scene or location to generate useful information relevant thereto. The present disclosure provides these and other benefits.

SUMMARY OF THE DISCLOSURE

Aspects of the present disclosure are related to visualization of acquired sensor data for objects, components, or features of interest in a scene. The data can include 2D and 3D information obtained from or derived from sensors. In one aspect, among others, a method comprises providing, by a computer, a first sensor data collection associated with a first object in a scene or location. The first sensor data collection can be generated from one or more sensor data acquisition events and the first sensor data collection comprises synchronized sensor data including one or more sensor data types. The first sensor data collection is generated by transforming all sensor data in the first sensor data collection into a single coordinate system; or calculating one or more transformations for sensor data in the first sensor data collection, wherein the one or more transformations enable representation of the sensor data in the first sensor data collection in a single coordinate system. The method further comprises processing, by the computer, the first sensor data collection to generate a user display including at least one viewport wherein: each of the at least one viewport is configured to display first object information associated with the first object; and the displayed first object information is derived from the synchronized sensor data; defining, by the computer, a viewport on the user display as a first object base viewport; identifying, by the computer, each of one or more remaining viewports on the user display as a first object dependent viewport comprising first object information; and displaying, by the computer, the first object base viewport and each of the one or more first object dependent viewports on the user display, wherein the displayed first object information in the first object dependent viewports substantially corresponds to a real-time positioning and orientation of a scene camera in the first object base viewport, thereby providing a concurrent display of synchronized first object information in each of the viewports.

In various aspects, the method can further comprise navigating, by the scene camera, in and around the first object base viewport, thereby providing an updated first object base viewport; and updating, by the computer, the one or more first object dependent viewports on the user display. The first object base viewport can include a 3D rendering of the first object and at least one first object dependent viewport can comprise one or more 2D images of the first object; or the first object base viewport can include one or more 2D images of the first object and the at least one first object dependent viewport can comprise a 3D rendering of the first object. The 3D rendering and the one or more 2D images can have at least partially generated from synthetic RGB image data derived from the positioning of the scene camera in the first object base viewport. Navigation of the scene camera around the user display can generate an identification of a new first object base viewport and a new first object dependent viewport when the scene camera is navigated to from the first object base viewport to one of the one or more first object dependent viewports.

In some aspects, the first object base viewport can comprise either a 3D rendering or an RGB image of the first object and at least some of the one or more first object dependent viewports comprise one or more of: measurement information, geometry information, topology information, topography information; or semantic information. The sensor data types can comprise one or more of: RGB image data; thermal image data; charge coupled device data; photosensor data; radio frequency (RF) data; time/date information; LIDAR data; temperature data; terrain elevation data; solar data; spherical image data; building information model ("BIM") data; weather data; or accelerometer data. The method can further comprise recording, by the computer, information derived from navigation of the scene camera on the user display among the viewports on the user display; and configuring, by the computer, the recorded information for use in one or more of: a report, a user dashboard, machine learning processes; or digital twin processes. The first sensor data collection can comprise sensor data associated with the first object generated from different sensor data acquisition events. The first object base viewport can be derived from sensor data acquired at a first time and one of the one or more first object dependent viewports can be derived from sensor data acquired at a second time. In one or more aspects, the method can comprise generating, by the computer or a user, information about a presence or absence of an observable difference in a condition of the first object at the first time and the second time; and generating, by the computer, information associated with the generated difference information.

Additional advantages of the present disclosure will be set forth in part in the description that follows, and in part will be apparent from the description, or may be learned by practice of the present disclosure. The advantages of the present disclosure will be realized and attained by means of the elements and combination particularly pointed out in the appended claims. It is to be understood that both the foregoing general description and the following detailed description are exemplary and explanatory only and are not restrictive of the present disclosure, as claimed.

SUMMARY OF THE DRAWINGS

The present disclosure may be better understood with reference to the following figures. Matching reference numerals designate corresponding parts throughout the figures, which are not necessarily drawn to scale. The patent or application file contains at least one drawing executed in color. Copies of this patent or patent application publication with color drawing(s) will be provided by the Office upon request and payment of the necessary fee.

The patent or application file contains at least one drawing executed in color. Copies of this patent or patent application publication with color drawing(s) will be provided by the Office upon request and payment of the necessary fee.

FIGS. 2-14B illustrate examples of user display scenarios, in accordance with various aspects of the present disclosure.

DETAILED DESCRIPTION OF THE DISCLOSURE

Figure 1A:
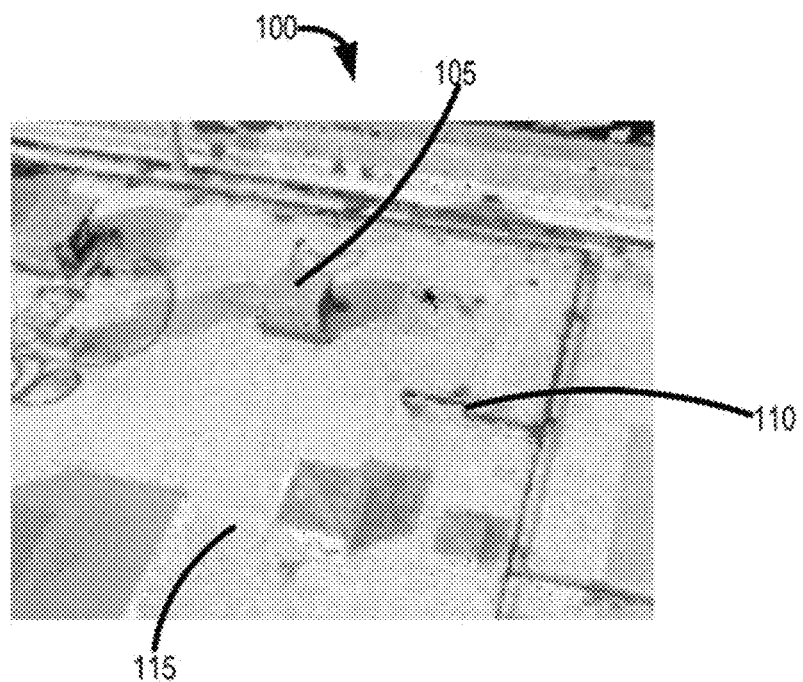
FIGS. 1A and 1B show examples of a rendered scene point cloud displayed on a user display.
Figure 1B:
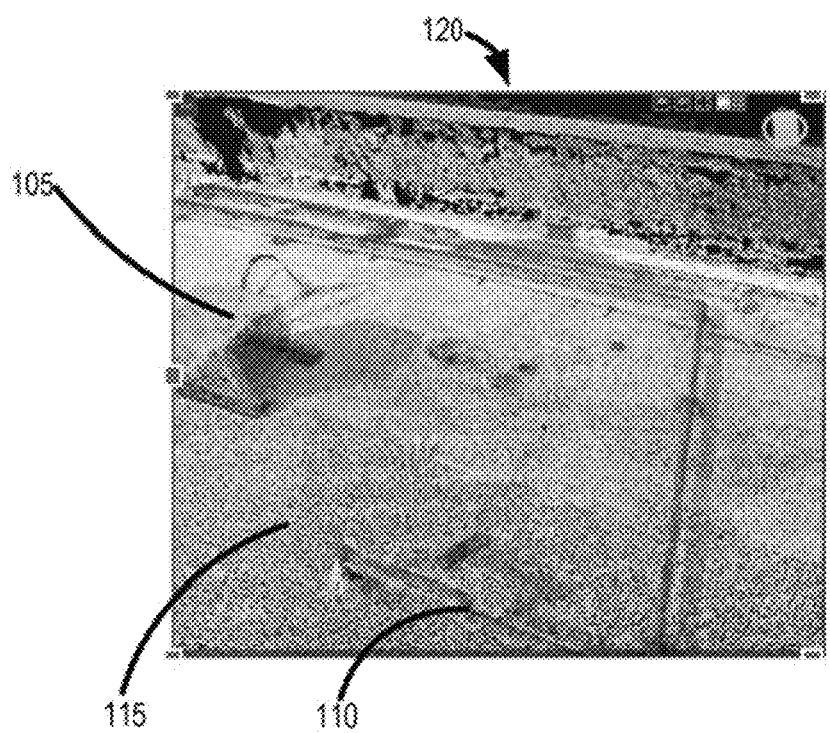

While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "about" is meant to account for variations due to experimental error. All measurements or numbers are implicitly understood to be modified by the word about, even if the measurement or number is not explicitly modified by the word about.

As used herein, a "object of interest" includes, but is not limited to, buildings, parts of a building (e.g., doors, windows, walls, roofing, stairs, plumbing/conduit, electrical equipment, flooring material, decorative aspects), components on parts of buildings (e.g., mechanical equipment/electrical/plumbing components on commercial roofs, decking components on commercial roofs, shingles/fascia etc. on residential roofs), structural components of buildings (concrete slabs, columns), landscape components (e.g., trees, shrubs, driveways, water features, pools, parking lots, vegetation), mechanical equipment, telecommunications infrastructure (cellular towers, antenna arrays, fiber optic transmission lines, etc.), electrical transmission equipment (e.g., electrical transmission towers and substations, distribution lines and poles, transformers, power lines, power poles, insulators, switches, arrestors, generators, solar panels/components mounted on roofs, wind turbines, solar farms, radio frequency propagations), transportation infrastructure (e.g., roads, bridges, ground stockpiles), municipal infrastructure (water tanks, water towers, dams, etc.), vehicles (cars, vans, ships, tankers, trucks, airplanes, railcars, buses etc.), oil and gas equipment (land/sea drill rigs, pipelines, pumpjacks, compressors, dehydrators, well pads, gas clouds, flare stacks, storage tanks), and internal building components (factory equipment, storage racks, floor layouts, interior doors, furniture, wall fixtures, bathroom fixtures, kitchen fixtures).

A "collection of objects of interest" or a "plurality of objects of interest" can comprise a plurality of the same objects (e.g., a plurality of the same type of mechanical or electrical equipment) or a plurality of different objects (e.g., a commercial roof having different mechanical and electrical equipment).

As used herein, a "scene" is an area that can incorporate at least one object of interest, as well as elements, components, features, etc. proximate thereto that might be associated with the positioning, operation, etc. of the objects, components, or features, wherein all or part of the scene may be included in the acquired sensor data for processing according to the methodology herein. A location is a place, such as can be identified by GPS coordinates, for example.

An object of interest may comprise componentry associated therewith that are, either individually or in conjunction with other components of interest for a user task event, as such is defined herein. A "scene or location of interest" refers to an area in which an object or collection of objects of interest may be present. Such a scene or location of interest can include one or more objects of interest, collections thereof, or features thereon. A scene or location can be the object of interest, in some contexts.

The sensor data used herein to generate the datasets from which they can be obtained via known methods of acquiring sensor data. In non-limiting examples of such methods, the processes described in co-pending U.S. patent application Ser. Nos. 16/440,755 and 16/568,104, the disclosures of which are incorporated herein in their entireties by this reference, can be utilized. To summarize the methodology of the referenced co-pending patent applications, the sensor data can include 2D or 3D information generated by suitable imaging devices and other 2D and/or 3D sensor generated information (e.g., RF information, thermal information, topographical information, temperature information, etc.). The sensors can be configured on an unmanned or a manned aerial or terrestrial vehicle during acquisition of the data at the scene where the object(s) or feature(s) are located. The sensors can also be handheld by a user who is present at the scene where the object(s) or features are located. A non-limiting list of suitable sensor data is set out hereinafter.

Unless the context indicates otherwise, 2D and/or 3D data, 2D and/or 3D information, 2D and/or 3D raw and/or processed data, 2D and/or 3D raw and/or processed information, and sensor data can be used interchangeably to refer to information that is relevant to the methods and systems herein. As a non-limiting example of such context-based usage, sensor-generated RF data can be relevant to an object such as a cell tower, but such RF data may be less relevant, or even irrelevant in another object, such as a commercial roof. Thermal data generated from a sensor device may be relevant to a commercial roof to determine factors relevant to the energy envelope thereof, whereas thermal data may be relevant for a cell tower to determine whether a component may be running hot and thus may need servicing, for example. Visualizations generated on a user display of these respective sensor data types can be used to provide one or more user display windows for the subject object, collection of objects, feature, scene, or location that is appropriate in the context of the user task and any information that might be relevant for generation thereof. In some implementations, the user display can include at least one additional visualization of that same object, feature, scene, or location, in the same or in one or more different user windows as is discussed in detail herein to allow the user to concurrently view more than one visualization having the same or substantially the same viewpoint, orientation, or perspective of the object, collection of objects, etc. vis-à-vis the user's scene camera. Still further, information associated with the user display information can be configured for use other than on a user display, as is discussed further hereinafter.

A "digital twin" is a virtual representation of a physical object or system across its life cycle. In the context of the present disclosure, a digital twin is digital duplicate of one or a collection of physical assets of interest in a scene or a location. A collection of physical asset digital twins at a plurality of locations is also contemplated herein. Each digital twin or collection of digital twins have utility herein for the simulation of the operation of a physical asset of interest at a specific time, over one or more time periods, and over a lifecycle of the asset(s) or at the location in which an asset of interest is associated with (e.g., a building, infrastructure element, etc.). Digital twin processes are disclosed, for example, in US Patent Publication Nos. and 2019/0138970 and 20190163215, the disclosures of which are incorporated herein in its entirety by this reference.

"Inspection level detail" comprises information derived from acquired sensor data that is provided as display of one or more visualizations of sensor data for a user's navigation of his scene camera in and among the subject object, feature, scene, or location. Such inspection level detail can be relevant to a user's visualization of and/or the generation of useful information for: a 3D rendering of an object(s) of interest in a scene generated from sensor data acquired from a scene or location, a 3D rendering of an object(s) of interest generated from synthetic images (or other sensor data) derived from sensor data acquired from a scene or location and one or more digital twins associated with a corresponding asset(s) of interest at a scene or location. In some cases, the inspection level detail generated herein can have a resolution or degree of detail substantially equating to the same level that can be seen by a human inspector onsite in person. Such inspection level detail can provide suitable detail to allow the determination of, for example, whether maintenance, repair, or replacement of an object of interest at a scene or location is needed now or at some time in the future.

As used herein, the term "viewport" is a view that corresponds to a location and direction (with extra intrinsic parameters such as focal length, field of view, distortion parameters, distortion type, projection type, and principal point) on a user's display as an object(s), feature(s), scene, or location would be viewed by an actual human viewer who was present in the scene or location at that location in real life. In one aspect, a viewport can comprise a current view that a user is seeing on his display in real time vis-à-vis the information derived sensor data that is provided to him in real time for the object, feature, scene, or location of interest. In the context of this human user, his location vis a vis an object(s), feature(s), scene, or location on his user display, specifically in regards to the information being presented on each of a plurality of user display windows, he will be a "virtual observer" of such information, and the object(s), feature(s), scene, or location view that he observes on his display in real-time will be his "viewport." The viewport can be derived from or associated with a "scene camera". In a non-limiting example, a user's viewport can indicate the positioning of the user's scene camera relative to a displayed 3D rendering (e.g., a point cloud or 3D mesh) and/or a selectable location or area on displayed 2D sensor data (e.g., one or more 2D images). He can also view of non-visual information on his user display, such as when the displayed information is in the form of measurements, geometry, or labels for the object(s), feature(s), scene, or location that are displayed in one or more of a plurality of user display windows. In another non-limiting example, a user's viewport might be associated with extrinsic and intrinsic parameters of the real sensor that was used to capture the data. In this regard, the user's real-time navigation and positioning of a scene camera relative to the specific derived sensor information with which he is interacting in real time can provide a scene camera having the same properties (extrinsic and intrinsic) as those of the real sensor that acquired the subject sensor data in the first order. In other words, the user's scene camera at any point is the same as where the actual camera (or, more broadly, the sensor) was in the scene when the sensor data was acquired. He thus will be an "observer"—albeit virtually—of the object(s), feature(s), scene, or location that is displayed as visualization or other information derived from the sensor data collection. This concept is illustrated in the discussion and Figures hereinafter.

In various implementations, the present disclosure provides systems and methods to process sensor data acquired from a scene or location of interest, where the scene or location comprises one or more objects of interest. The processing improvements herein allow the one or more objects of interest to be displayed in various forms of information on a user display, a single object or collection of objects and/or along with all or part of the scene or location with which the object(s) are associated. The user can navigate freely around his user display using his scene camera when the user display includes one or more information types—for example, as one or more viewports comprising 2D and 3D information—of the object of interest at the scene or location and such navigation can generate one or more additional visualizations to a user of an object(s), feature(s), scene, or location, where such data is acquired or derived from one or more sensor data acquisition events. As set out in more detail herein, the generated display information and the user's actions relative thereto can have utility in generating useful information associated with the past, current, or future state or condition for the one or more objects of interest in the location or scene.

A processing insight of the inventors herein is implementation of an object-centric approach to the processing of acquired sensor data, which results in improved 2D and/or 3D visualizations and navigation through and around a user display of one or more objects of interest in a scene or location. Such processing further improves the quality of information that can be generated from the acquired sensor data for use in subsequent sensor data processing. Use of the phrase "object-centric" denotes that the context of the sensor data processing is aligned with the known or likely identity of each of the objects that will be present in a scene or location that comprises the acquired content of a sensor data acquisition event. In other words, the universe of potential objects that are present in the subject sensor data can be bounded by the purpose—or task—that comprises the reason that a user is reviewing the acquired sensor data in the first order. It follows that by aligning the acquired sensor data with a library of information that is known to or that is likely to comprise information related to or associated with the user's purpose or task, more effective and accurate visualizations, such as 3D object renderings, of the acquired sensor data can be generated. To this end, the system can be configured to process sensor data acquired in a sensor data acquisition event with a library of information associated with an identified or selected user task.

A significant benefit seen with the disclosure herein is an enhanced ability to accurately and efficiently identify objects of interest in data obtained from a sensor data acquisition event. To this end, the task-oriented or purpose-directed nature of the methodology herein can serve to not only improve the quality of 3D renderings of objects for user display and navigation thereupon, but also can allow enriched information to be generated therefrom.

In an implementation, the acquired sensor data can be generated from a scene or location associated with baseline (or "a priori") information. Such library of information may exist for the scene or location from the point of design or installation as baseline information. In this example, the design and installation specifications for a building (e.g., commercial roof area including equipment, electrical, plumbing etc.) or infrastructure elements (e.g., cellular towers, power lines, pipelines, oil storage tanks, etc.) can be incorporated into the library of information for use to determine the presence or absence of those same objects in sensor data acquired in a subsequent sensor data acquisition event for that same location. Differences in the condition of objects of interest at that location over time can also be determined. Because the library of information will comprise both mathematical information (i.e., measurement, geometric, topographical) and semantic information (e.g., identifications, labels, etc.) or the one or more objects in the scene or location, the processing of the acquired sensor data can generate accurate 3D information for the objects in that scene or location for display to the user or for other useful implementations. Other beneficial user display aspects are also provided.

In further implementations, the library of information can include information that may not be specific to a scene or location, but that relates to a task or activity type. In this regard, the library of information can comprise content associated with a collection of objects that are likely to be relevant to a task or activity of interest. For example, a library of information can be relevant to a review of a scene or location that is known to or expected to include one or more objects of interest. The acquired sensor data for the location or scene can be processed against this library of information to generate information for display to the user or generation of other information.

The novel ability provided by the object-centric sensor data processing to generate 3D renderings and other display information, which can also be termed a "task-oriented object identification" can facilitate the generation of high quality information that is relevant in context to a scene or location having one or more objects of interest therein on a user display. In turn, the actions of the user through and around the generated display windows having object information displayed therein via navigation of a scene camera to generate a viewport for the displayed information can allow highly accurate information about the objects of interest in the display to be obtained for use in inspections or other tasks, as discussed hereinafter. Moreover, the actions of the user vis a vis the objects and scene can be assisted by the system to better ensure that the user conducts the subject tasks in an appropriate manner so as to achieve an intended objective therefrom.

The libraries of information used in the processing of acquired sensor data can include geometric and semantic information that were generated from images or other sensor data identified and classified by either or both of a human or a computer. For example, information generated from a human inspection of a cellular tower location after installation can be collected about the object of interest, such as specifications, location characteristics (e.g., GPS and topography, etc.), images, etc. In another implementation, sensor data can be acquired for one or more objects of interest at a scene or location, followed by identification of the object(s) and relevant features from the sensor data. In this regard, a human could review the acquired sensor data to generate baseline inspection information from the sensor data so to identify various aspects of the cellular tower and the scene or location. Alternatively, the acquired sensor data could be automatically processed by the system to identify features therein and any identifications validated by a human for the baseline inspection such as by generating baseline 3D renderings therefrom, along with relevant association with semantic information. Yet further, the system can automatically identify the objects and any features relevant thereto for the baseline inspection library of information along with relevant semantic information.

In a significant implementation, the acquired sensor data is associated with an identified or selected task or activity of interest, for example, an inspection or examination of one or more objects of interest in a location or scene of interest. In implementations, the present disclosure is directed toward the completion of one or more selected or identified tasks or activities associated with acquired sensor data and the completion of a goal therefrom. For example, a selected task can be the inspection of a cellular tower at a location to determine whether the cellular tower requires repair or maintenance. The componentry incorporated on a cellular tower can be known either actually for that same cellular tower or generally known for the class of locations or scenes that include cellular towers that will include the required/intended placement of the componentry on a cellular tower. Sensor data generated from a cellular tower during a sensor data acquisition event can thus be processed with a mathematical and semantic library associated with a cellular tower inspection as the task to generate information about that cellular tower, such as by generating 3D renderings of the cellular tower as it appears at the scene or location to compare the tower with an expected condition or configuration, as well as to determine whether the componentry on the cellular tower is functioning properly.

At least some of the library of mathematical and semantic information can be associated with the object of interest when the object is first installed at a location. In this regard, an object that may be of interest for an activity or task in the future, such as an inspection, can be associated with a digital identification provided by a manufacturer or supplier, where the digital identification will be durably associated with that object over the lifecycle thereof. The digital identification for the object can be retrievable via a QR Code, serial number, or the like. The use of information for one or more specific objects of interest at a scene or location can allow the operation or condition of those one or more objects to be tracked over a lifecycle thereof, such as is the case with a digital twin application. In turn, the lifecycle information for a collection of scene or locations comprising the same or similar collection of one or more objects can be collected to compare operations and to further enrich the relevant libraries of information related thereto.

For example, the library of information used in the processing of the acquired sensor data in a sensor data collection can be associated with location and owner-specific information about an object of interest, such as GPS coordinates, department, team, or contractor having responsibility for maintenance of the object, repair history, etc.

In other example, a library of information associated with a cellular tower model, design, installation, etc. can be generated. Such library of information can comprise details about the types and number of antennae on the cellular tower, including the shape/geometry of each antennae and placement on the cellular tower for proper operation, as well as information about the surrounding location. Each antenna, for example, will have a geometry that can allow identification of that antenna in acquired sensor data. When acquired sensor data includes an identifiable object that includes the same geometry vis a vis the location and other objects proximal thereto as a known elements in the library of information an identification of that object as an antenna in the acquired sensor data can be made. Enriched semantic data can be associated with the identified object, such as by providing general information for the object (e.g., model number, manufacturer, etc.) and, in implementations, more specific information about the object can be obtained (e.g., serial number, age, repair history etc.)

Similarly, the RF signals emitted from a cellular tower that are associated with proper functioning therewith are definable for incorporation in the library of information, and the RF sensor data generated from a data acquisition event for a cellular tower of interest can be processed to determine whether that cellular tower's RF antennae are functioning according to specification.

In some implementations, the high quality object(s), feature(s), scene or locations visualizations generated as viewports on a user display can enrich the display provided to the user to more closely resemble the actual object(s) of interest to the user as pertinent to a specific task. To this end, a library of information for a scene or location that is known to include an object(s) of interest with known specifications can be deployed to not only generate an accurate 3D rendering of the subject object(s) from sensor data acquired at that location at a later date, but also to place that identified object of interest at the location where it was known to be present. The library of information about that object can allow an accurate 3D rendering of the object to be provided on the user's display in the form of a viewport even though acquired sensor data may include occluded areas that can reduce the ability to generate an accurate 3D rendering from the sensor data in the first order. This benefit is discussed further hereinafter with regard to objects on each of a cellular tower and a commercial roof.

Referring to user display aspect of the disclosure, the methodology relates to generation of at least one viewport comprising information about an object of interest (e.g., a physical asset of interest), feature, scene, or location, where the viewport is provided on a user display along with one or more additional viewports. A first viewport can serve as the reference—or "base"—viewport for the other viewports, the latter of which are denoted as "dependent" viewports. The data from which each of the base viewport and the one or more dependent viewports are derived comprise sensor data that is synchronized as discussed further herein. The synchronization of the sensor data to allow a plurality of viewports to be simultaneously displayed with the same perspective is a significant improvement with the disclosure herein. The base viewport can be automatically provided to the user on his display or the user can select the base viewport from a list of available options presented on his display.

In implementation, the acquired sensor data for the object(s), feature(s), scene, or location can be processed to generate a 3D scene rendering as the displayed information in a viewport. The viewport can have one or more objects therein. When generated as a 3D rendering, the viewport is configured to allow the user to navigate through and around the 3D scene rendering on his display with his scene camera to deploy using the task-oriented processing methodology of the present disclosure.

In an implementation, the user's navigation through and among the viewports on his user display can generate useful information about an object of interest via a vis the user's placement of his scene camera in his display. An object that is located proximal to the user's scene camera can then be inferred to be the object information type selected by the user for application of task-related activities associated therewith, such as for inspection etc. The system can then be configured to process the sensor data associated with that object and any relevant areas proximal thereto as incorporated in a viewport. A notable implementation of the present disclosure is the ability of the system to replicate or duplicate both the relative distance from the object and the viewing angle/perspective that the user is viewing the selected object of interest as indicated by his placement of the scene camera in and around his display to generate a viewport. For example, the user may be interested in information about the object that is visible at a distance of about 50 feet away from the object, as would be the case if he was positioned 50 feet above the object in real life. This intended positioning would be indicated by the placement of the scene camera in his display to generate a viewport. In an example, the system can then be configured to generate a 3D rendering of the object of interest for display as a viewport and, optionally, any associated scene or location information, that visually corresponds to the user-selected distance and perspective from a collection of images and sensor data, as is set out herein.

In practice, the 3D information displayed to the user on his display would appear to him as if he was hovering above the object at that distance in real life. Notably, however, such a positioning may in many cases not actually be possible for the human in real life. The present methodology thus not only allows existing, in-person inspection processes to be duplicated in a remote location using acquired sensor data from a scene or location, the methodology also provides significant improvements over what has been possible using human inspection methods in some situations.

The 3D rendering so generated can be combined with other object visualizations that correspond to the user selected location and view perspective vis a vis the object of interest. For example, the user can be provided with one or more 2D images associated with the user-selected location and view perspective in a single display window or in one or more separate display windows. The displayed images can be actual images generated by the imaging device in the image acquisition event and/or the images can comprise synthetic images derived from the acquired images, as discussed elsewhere herein. Yet further, the user-selected object location and view perspective and/or the additional displayed information can comprise actual or synthetically generated sensor data.

When one or more scene or object visualizations are generated as viewports on the user display from acquired sensor data, one of the visualizations provided for concurrent display can be termed herein as the "base viewport," with the reasons therefore apparent from the context herein. Any other visualizations can each be term "dependent viewport," with the reasons therefore also being apparent from the context herein. User activity relative to navigation and positioning of a scene camera in and around the one or more displayed visualizations of the object(s), feature, scene, or location can be associated with an identified or selected user activity, task, and/or information goal, as defined further herein. As will be discussed in detail hereinbelow, one of the significant improvements associated with the systems and methods herein is the ability to infer user intent from the user's navigation and positioning of the scene camera in and around each of the viewport including information about the object, feature, scene, or location of interest. Yet further, the systems and methods can incorporate an activity or task-oriented processing step applied to the sensor data from which the one or more visualizations is generated, provided, or rendered, so as to enhance visual context for the user as he navigates in and around the display vis-à-vis his scene camera. In a further implementation, when at least two visualizations are presented on a display, each can be presented substantially uniform to each other in perspective, viewpoint, and orientation such that the user will be able to view multiple visualizations for the subject object, feature, scene, or location of interest concurrently on his display in real time.

The user or the computer can select one or more additional information types for the subject object, feature, scene, or location for concurrent display on his display, or such one or more additional visualizations can be automatically provided by the computer. Each of the at least one additional information type can be derived from sensor data obtained from one or more sensor data acquisition events. The at least one additional information can comprise any type of information that can be obtained, generated, or rendered from the available sensor data, as such data types are set out herein. As the user navigates in and around the base viewport, at least one additional information type that comprises a dependent viewport can be automatically modified/updated to duplicate or substantially duplicate the orientation, or perspective of the base viewport in real time. Moreover, if the user navigates or positions the scene camera vis-à-vis one of the one or more dependent viewports, the orientation, perspective of the base viewport, as well as any additional visualizations, will also automatically change to match—that is, to duplicate or substantially duplicate—the navigation and positioning of the user's scene camera in real time.

Moreover, the system can also automatically select the best sensor data configurations to provide the one or more additional viewports so as to duplicate or substantially duplicate the user's current positioning of his scene camera with respect to the selected base viewport or one or more dependent viewports in real time. Yet further, the system can process the raw/processed sensor data in real time in prior to the concurrent viewport generation event to provide enhancements or improvements to the generated or rendered object information, as is discussed hereinafter.

As would be appreciated, in many situations the information sought by a user as indicated by his positioning of the scene camera in the scene vis a vis an object therein may not be directly derivable from the images as captured from an imaging device. That is, the positioning of his scene camera on his display may not be associated with an actual image (or other sensor data) that was generated at that location. In this regard, prior art display methodology would then select for display the closest or best fit actual image (or sensor data) for the object of interest in relation to its positioning in the scene or location. A significant improvement in the methodology herein is generation of one or more synthetic images for a selected location, where the one or more synthetic images are displayable to the user as a viewport.

An insight of the inventors herein is that a 3D rendering of the object of interest corresponding to each placement of the user's scene camera can be generated from acquired image data irrespective of whether at least two actual images corresponding to that location actually exist for that location in the data set derived from an image acquisition event. Such image data can be processed to generate one or more synthetic images for display to the user, where such generated synthetic images correspond to the object and any relevant scene or location data associated there with at the location where the user's scene camera is positioned on his display. As would be appreciated, a 3D rendering for that scene camera location can be generated from such synthetically generated image data. Thus, the present disclosure generates a 3D rendering of the one or more objects of interest in a scene or location as a base visualization at least partially derived from synthetic image data.

Yet further, the 3D visualizations herein, and the information associated therewith, can be generated from synthetic images—or more broadly, synthetic sensor data—derived from the sensor data acquired in one or more sensor data acquisition events. In an example, mathematical information that is generated as a base viewport on a display can be modified, such as by a user, and a dependent viewport that is an 3D rendering can be modified in real time to show the modified mathematical information on the object of interest. The dimensions of the object can be increased or decreased, and the visualized object will be increased or decreased visually in real time to match the modifications.

Various implementations that are discussed herein that are primarily directed toward the use of 3D point clouds along with associated 2D imagery from which the point clouds have been rendered via image processing techniques discussed herein and as known to those of skill in the art. However, it is to be recognized that the types of data that can be visualized herein on a user display and from which information can be derived can extend beyond that specifically discussed in the Figures herein. Namely, permutations of sensor data sources from which a first visualization can be provided, generated, or derived as the base visualization for display with at least one additional visualization as a concurrent display to the user can be contemplated as set forth in the following listing:

2D RGB imagery/2D thermal imagery/2D ultrasound imagery
2D aerial imagery/2D satellite imagery
3D point cloud generated from 2D RGB imagery/3D point cloud generated from 2D thermal imagery/3D point cloud generated from 2D ultrasound imagery
3D point clouds from laser scanning or LiDAR
RGBD imagery
Sparse 3D point cloud from surveying equipment or practices such as Total Station surveying, GCPs, manual tie points, etc.
2D CAD drawings, sketches, or blueprints
3D BIM models/4D BIM models (3D+time)/5D BIM models (3D+time+cost)
3D CAD drawings
3D mesh from 2D RGB imagery or RGBD imagery/3D mesh from 2D thermal imagery
2D orthomosaic/DEM/DSM image
3D wireframe/textured 3D wireframe
Imagery generated from 360-degree video cameras
Voice or video recordings that are tagged with location, object instances, and/or object types
Images that are tagged with location, object instances, and/or object types
Notes or labels that are tagged with location, object instances, and/or object types
Orthographic or oblique manned aerial or satellite imagery
Metadata information about budget, cost, scheduling, progress, as-planned vs. as-built discrepancy information, etc. that could be associated to individual objects, a collection of objects, or the entire project
Acquisition plan/pattern information
Data processing metadata information
Historical and/or current maintenance and repair information
Technical specifications for individual objects or a collection of objects
Sunlight pattern and amount of energy that hits different sections of a building in a given time period
2D and/or 3D virtual vies that could be generated from combining multiple sources of data (e.g., two or more 2D imagery)
Time-lapse versions of all the above Due to the wide variability in the types of sensor data that can be used or processed for visualization herein, the expansive nature of the user activities and possible information goals, as well as the almost limitless variety of objects, features, or scenes of interest that may be relevant thereto, the utility of the presently disclosed methods and systems is broad.

Figure 2:
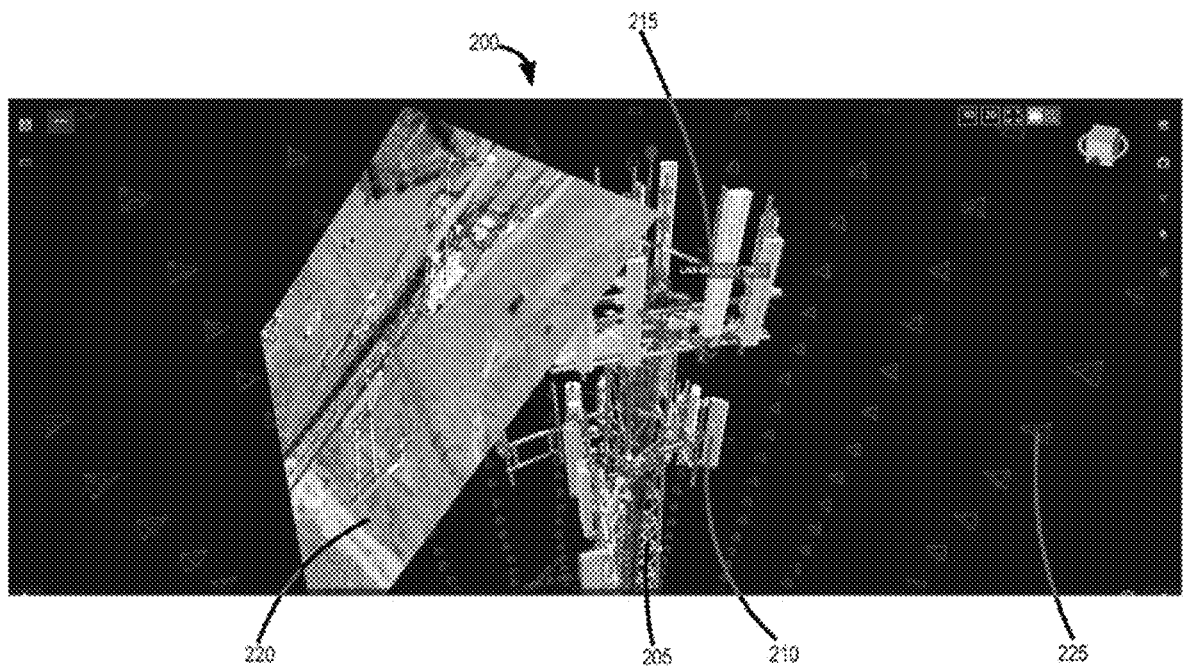

In FIG. 2, cell tower portion visualization 200 includes cell tower point cloud rendering 205 as a base viewport that is an object visualization, along with additional object visualizations of antenna object 210 as a dependent viewport that occludes or overlays that portion of 205 along with other antenna point clouds that are not visible, textual metadata 215, 2D image overlay 220, and exemplary camera location indicator 225. Point cloud rendering 205 also incorporates geometry information in the form of wireframe renderings and semantic information (e.g., object labels), each of which is derivable from the sensor data collection used to generate the visualizations displayed to the user. The visualization in FIG. 2, can be generated from actual image data or synthetic image data. Indeed, an improvement in the methodology herein is the ability of the user to move seamlessly through his display to view the 3D renderings of the one or more objects of interest irrespective of whether actual image data exists for a real time placement of his visual camera on his display. To this end, and as illustrated in FIG. 2, the base visualization can be augmented by the data and/or information available in the context of at least one additional visualization to: a) significantly enhance/simplify the overall comprehension of geometry, topology, and semantics of the scene; b) minimize/eliminate user mental fatigue when trying to maintain the connection between data presented in multiple windows; c) enable the user to navigate through structured/organized/indexed data/information and extract actionable insight; d) allow the user to maintain an understanding of the relationship of specific features between different sources of data; e) enable the user to generate contextually relevant information about the scene or location from remote visualization of suitably structured/processed sensor data alone; f) allow the user to infer missing links between multiple available data types; and g) enable the user to comprehend the scene from viewpoints that were not possible before even while physically attending the scene for on-site visualization/inspection. A specific goal for overlaying or superimposing different data types one a viewport in a user display is to provide a seamless integration that eliminates boundaries between existing data in different spaces with different dimensionality. As a non-limiting example, it can be beneficial for a user to be able to seamlessly and quickly move back and forth between a 3D point cloud, a 3D wireframe, one or more 2D images, and textual information without being overwhelmed or confused by those disparate data representations in multiple visualization windows. Moreover, the overlaid or superimposed data visualization or presentation can demonstrate higher-level connection, relationship, layout, and topology of multiple sources of data/information which could be difficult to comprehend by a user in case of concurrent data presentation in multiple viewports.

Figure 3A:
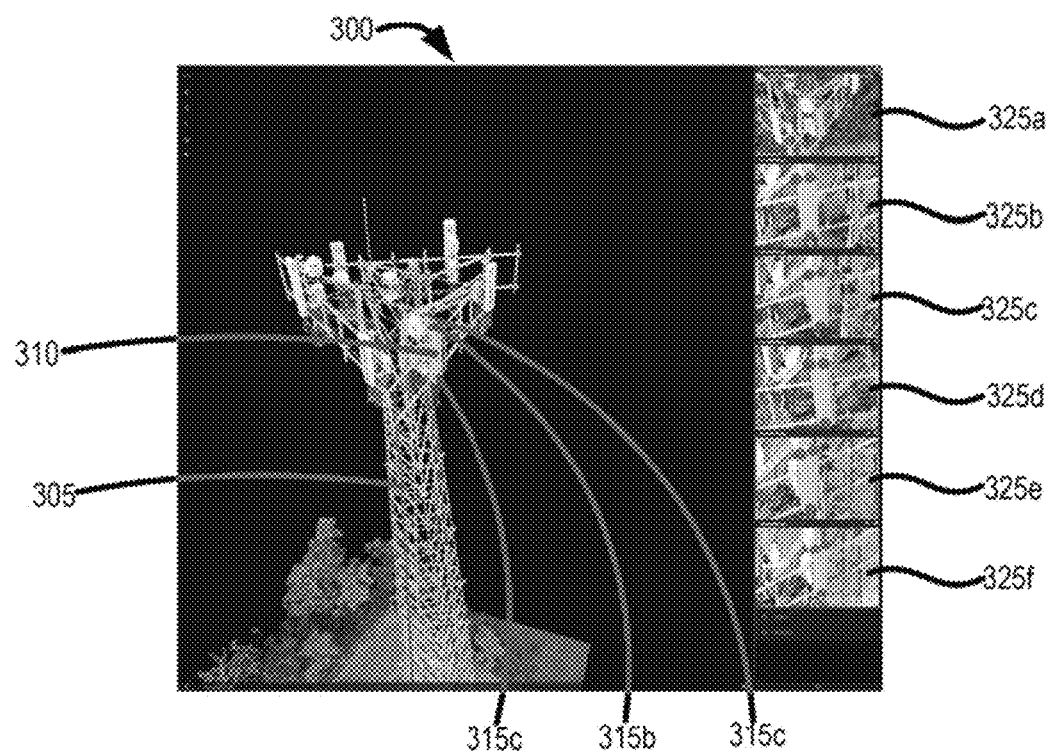

In a further example of an implementation of the present disclosure, and as shown in FIG. 3A, a base viewport can comprise a 3D rendering of an object, feature, scene, or location of interest, such as being in the form of a 3D point cloud in a non-limiting example. The user can be concurrently provided with one or more additional 2D images of the subject object, feature, scene, or location, or a collection of 2D images that are associated with the displayed 3D rendering in one or more additional windows on his display in real time. As discussed hereinafter, the concurrently displayed one or more 2D images—or other concurrently displayed information that can be generated from acquired sensor data—can comprise data that is registered with the database from which the base visualization is obtained, so as to provide the user with at least one additional visualizations having substantially duplicated orientations, viewpoints, or perspectives to that of the base visualization in real time. As the user navigates in and around the 3D point cloud on his display that is the base viewport in this example, the scene camera navigation and positioning will continue to be duplicated or substantially duplicated with respect to each of the one or more dependent viewports, with each of these viewports derived from synchronized data being continuously updated in real time to follow the scene camera navigation and positioning within the user display.

FIG. 3A illustrates a point cloud rendering 300 including cell tower 305, where 300 serves as the base viewport for this example. The geometry of antenna 310 (not shown) is represented via a bounding volume highlighted with red points referring to the bounding volume corners 315a, 315b, and 315c on cell tower 305. When the user highlights each antenna corner at each of 315a, 315b, and 315c, such as via a first click of a mouse or point identification on a user touch screen (not shown) at 315a, a second and third click of a mouse or point identification at 315b and 315c, such selected features of interest can be made visible to the user on the display via green highlight 320 (FIG. 3B), which is automatically generated using annotation capabilities, as would be appreciated. Such identification and display of features or elements of cell tower 305 can be associated with a user activity of inspection (among other things) of the cell tower 305, such as antenna 310 (not shown), where an attendant user information goal can be to obtain information about at least the antenna. Shown to the right on FIG. 3A are 6 individual 2D images 325a, 325b, 325c, 325d, 325e, and 325f of antenna 310 are included as the at least one additional visualization, where these images are generated from processing of the input resulting from identification of 315a, 315b and 315c from navigation and positioning of the user's scene camera. Each individual 2D image 325a, 325b, 325c, 325d, 325e, and 325f of antenna 310 was identified for selection by evaluation of the 2D image set from which point cloud 305 was derived to identify for concurrent display of 2D images associated with cell tower 305 at 315a, 315b, and 315c. In use, 2D images 325a, 325b, 325c, 325d, 325e, and 325f are concurrently displayed substantially in real-time and will change to concurrently display further 2D images associated with each real time positioning of the user's scene camera vis-à-vis point cloud 305.

In a further implementation, the disclosed synchronized data display concept can further comprise overlaying or superimposing the representation of one or more data types concurrently with the representation of one or more other data types while preserving the real-time seamless interaction functionalities which allow interacting with a specific data type even in the context of another data type space. In a non-limiting example for 3D point clouds derived from 2D image data where a 2D image can be overlaid or superimposed over a base viewport including the 3D point cloud, the methodology can allow the subject object, feature, scene, or location of interest to be viewed by a user from any and all locations or areas visible on the 3D point cloud that is derived from the 2D image data, at least because each location on the point cloud can be associated with at least one 2D image from which at least part of the 3D rendering was derived in the first order. As the user navigates in and around the 3D rendering that is the base viewport in this example, 2D images that best illustrate, or fit, the real time positioning of the scene camera will be overlaid or superimposed on the 3D rendering. Such "best" image selection or identification can comprise one or more native (e.g., as generated) images and/or can comprise the results of processing image and/or sensor data to generate synthetic images, and/or derived from machine learning processes and/or artificial intelligence operations. Moreover, the alignment of each of the one or more 2D images with an associated 3D rendering orientation, viewpoint, or perspective will be precise in this example because the concurrently displayed 2D image information, by definition, will be registered with the 3D point cloud information because they are derived from the same source. While the base viewport may be partially or fully occluded by the overlaid or superimposed visualization on the user display, the base viewport can nonetheless remain the framework for the user's navigation of the scene camera in and through the object, feature, scene, or location of interest.

Figure 3B:
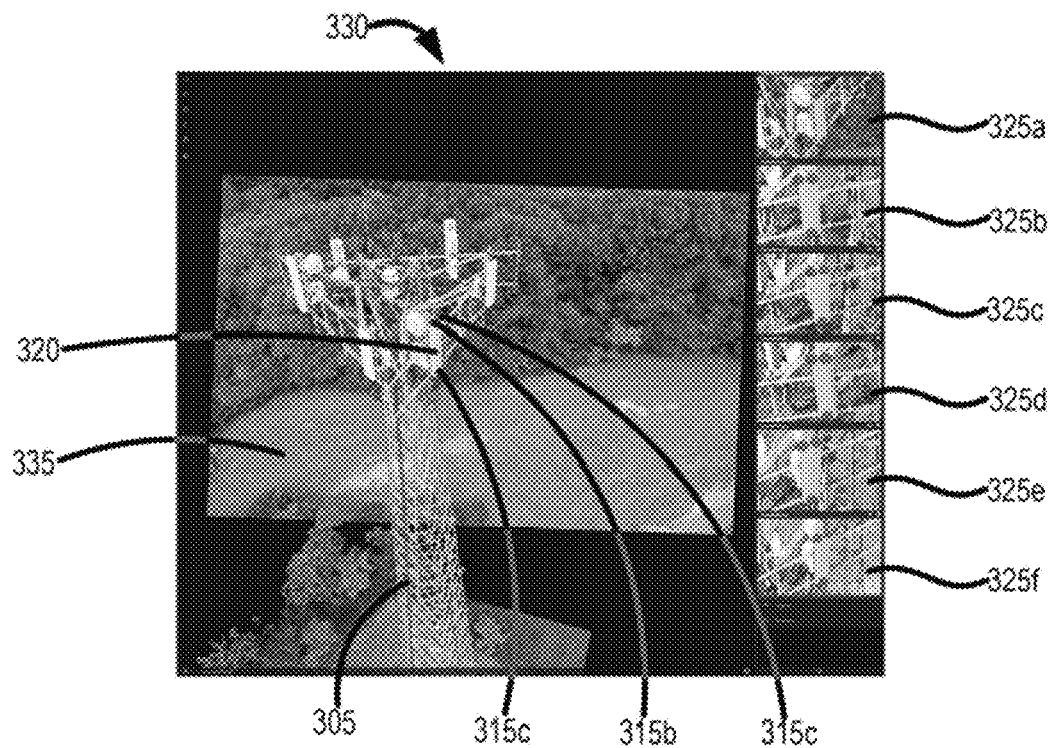

In the example of FIG. 3B, the system identified and concurrently displayed for overlay on point cloud 300 as the base viewport a single 2D image 330 from a library including a plurality of 2D images generated from a sensor data acquisition event for cell tower 305. As shown, the overlay of image 330 is precisely aligned with cell tower point cloud rendering 305. This precise alignment—or registration—is possible because the point cloud rendering 300 was derived from the library of 2D images that included image 330, which means at least that the coordinate system for each of 300 and 335 is identical. The one or more dependent viewports as the dependent viewports in this example are images 325a, 325b, 325c, 325d, 325e, and 325f, and overlay image 330. As shown, 3D bounding volume corners for antenna 310 (not shown) with corners 315*a*, 315*b*, and 315*c* are also included on 2D image 330, as 320 of antenna 310 (not shown). As with FIG. 3A, the user activity can be inspection of the entirety of cell tower 305, or a part thereof, such as antenna 310 (not shown) or any other component or feature thereon. An information goal for the user activity can be the condition of cell tower 305 or that of antenna 310 (not shown), for example.

In a further implementation, the user can optionally create and/or modify data in different spaces. For example, if the user intends to fine-tune the location of one of the antenna corners, he can perform the task on the wireframe itself, the wireframe overlaid or superimposed on the 3D point cloud, or the wireframe overlaid or superimposed on the 2D RGB image. Significantly, irrespective of the space or data type that is used for data modification, the user action relative to the object/feature/scene or location will propagate simultaneously throughout the entire data types as presented on his user display and the user will not see any difference in the outcome.

Data types that could be displayed to a user as different viewports using the systems and methods herein are not limited to 2D imagery or 3D representations of a scene. It is also not necessary for the data to be collected using a sensor or be a direct outcome of processing a dataset collected using a sensor. As such, data types could include numerical, textual, iconic, graphical, symbolic, ideogrammic, and time-lapse metadata. In such a scenario, the term "duplicated perspective, orientation, or viewpoint vis a vis the base viewport" could refer to real-time filtering, highlighting, hiding, sorting, playing, animating, fading, cropping, trimming, etc. of the data such that it matches the current or present user viewport. As an illustrative example, in the case of concurrently presenting visualizations of the data associated to a specific cell tower, the base and dependent viewports could be configured to include one or more of a 3D point cloud, 2D RGB imagery, a 3D CAD drawing, tower metrics, field inspection notes, antenna catalog, mount catalog, ground equipment catalog, and contract information. If the 3D point cloud is selected as the base viewport and if the user's scene camera points towards the equipment installed on the center of radiation (RAD) with the highest elevation, all the other data (i.e., imagery, drawings, metrics, notes, catalogs, and contracts) could be automatically filtered to only represent the data associated to the target RAD. Additionally, if the window representing the existing antenna catalog is selected as the base viewport and the user selects a specific antenna type, all other data in the one or more dependent viewports will be automatically trimmed or filtered to match that selection (e.g., only 3D points representing the specific antenna type in the point cloud will be shown and the rest of the point cloud is hidden from the user). It should be noted that this expands the definition of "viewport" beyond that of a scene camera to provide enriched information provided automatically by the system. For example, the system can generate information relevant, or likely relevant to the purpose of the user's navigation around the user display to assist or enhance the user's efforts in this regard.

Yet further, a particular feature of interest on or associated with an object of interest can be extracted for generation as a viewport on the user display. The extracted feature can be separated from the overall structure in which it is present and can thus be viewed in isolation, for example as thumbnail views as set out hereinafter. This comprises a data trimming, isolation, or summarization that allows individual aspects or features of an object(s) of interest or relevant scene or location features to be reviewed. Separate windows that include alternate viewport of the extracted feature that is a base visualization can also be provided. Data trimming can operate as a powerful tool that allows a user to only focus on the portion of the data that is of interest or significance at that moment to perform the specific task at hand. This can minimize the user distraction, prevents overwhelming the user with non-relevant or non-helpful data, and enhances the user experience and workflow. This feature is shown in FIGS. 4A-4F, for example.

Figure 4A:
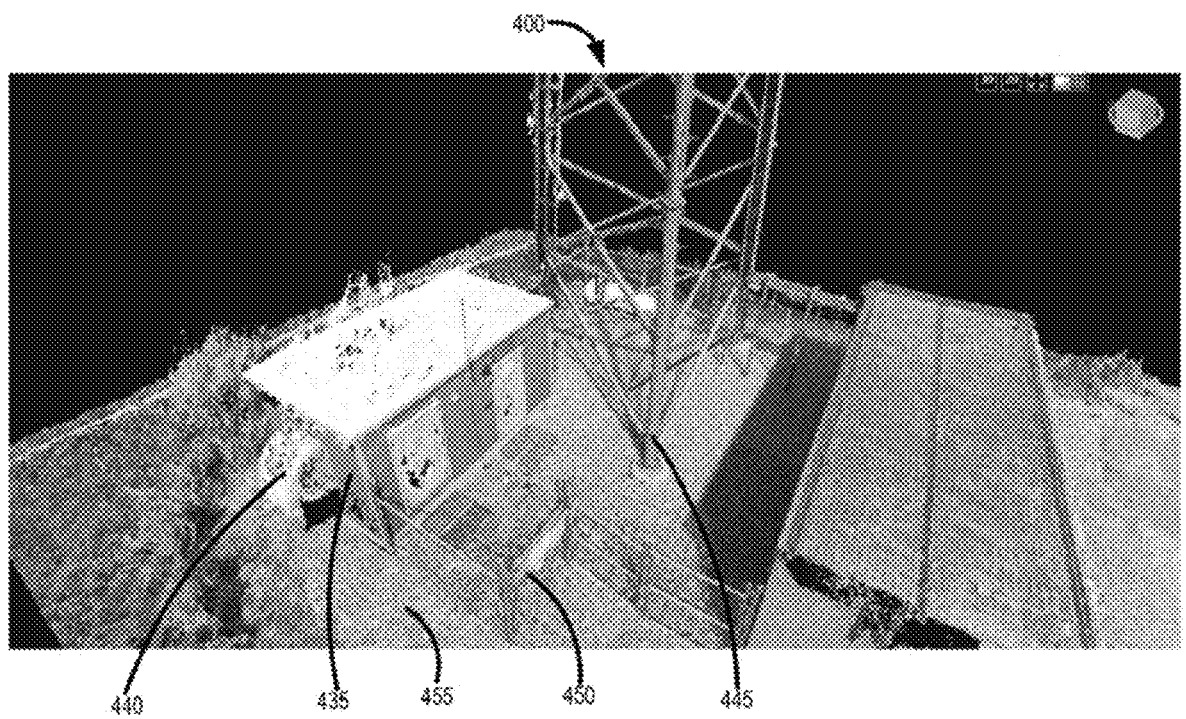
Figure 4B:
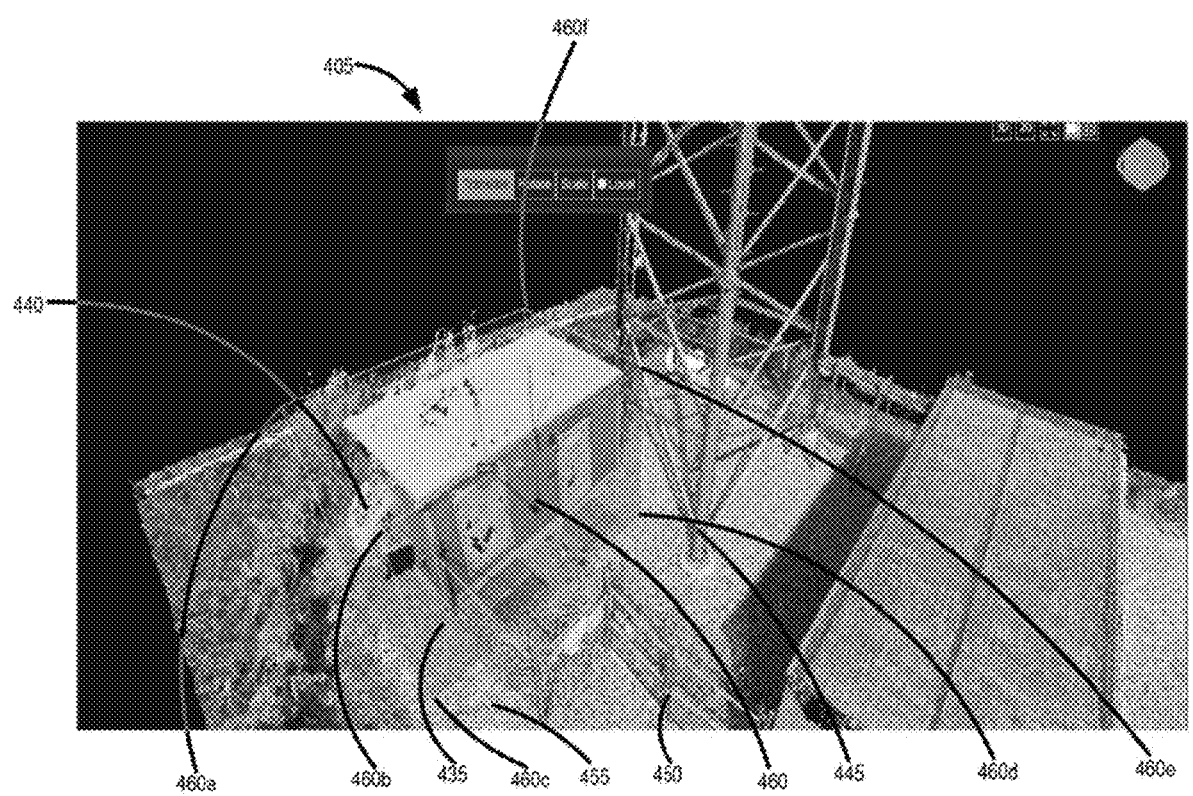
Figure 4C:
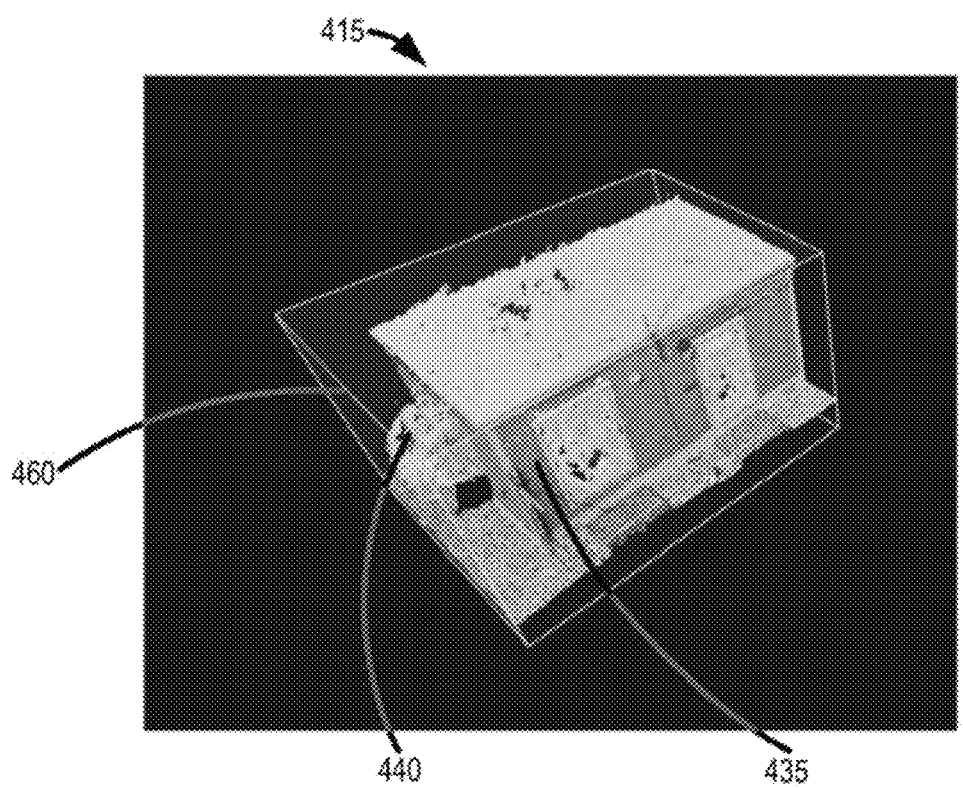
Figure 4D:
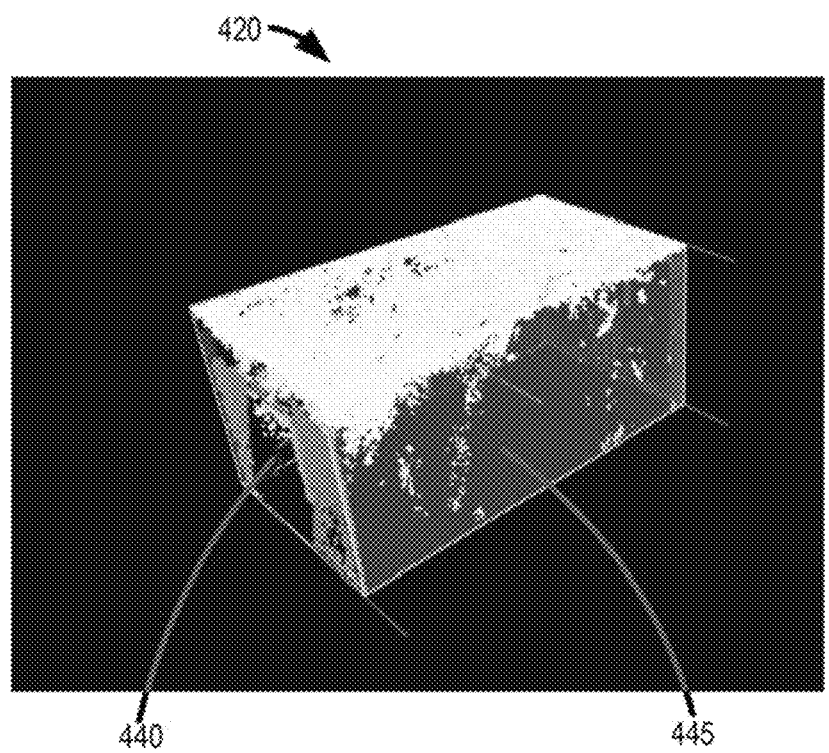
Figure 4E:
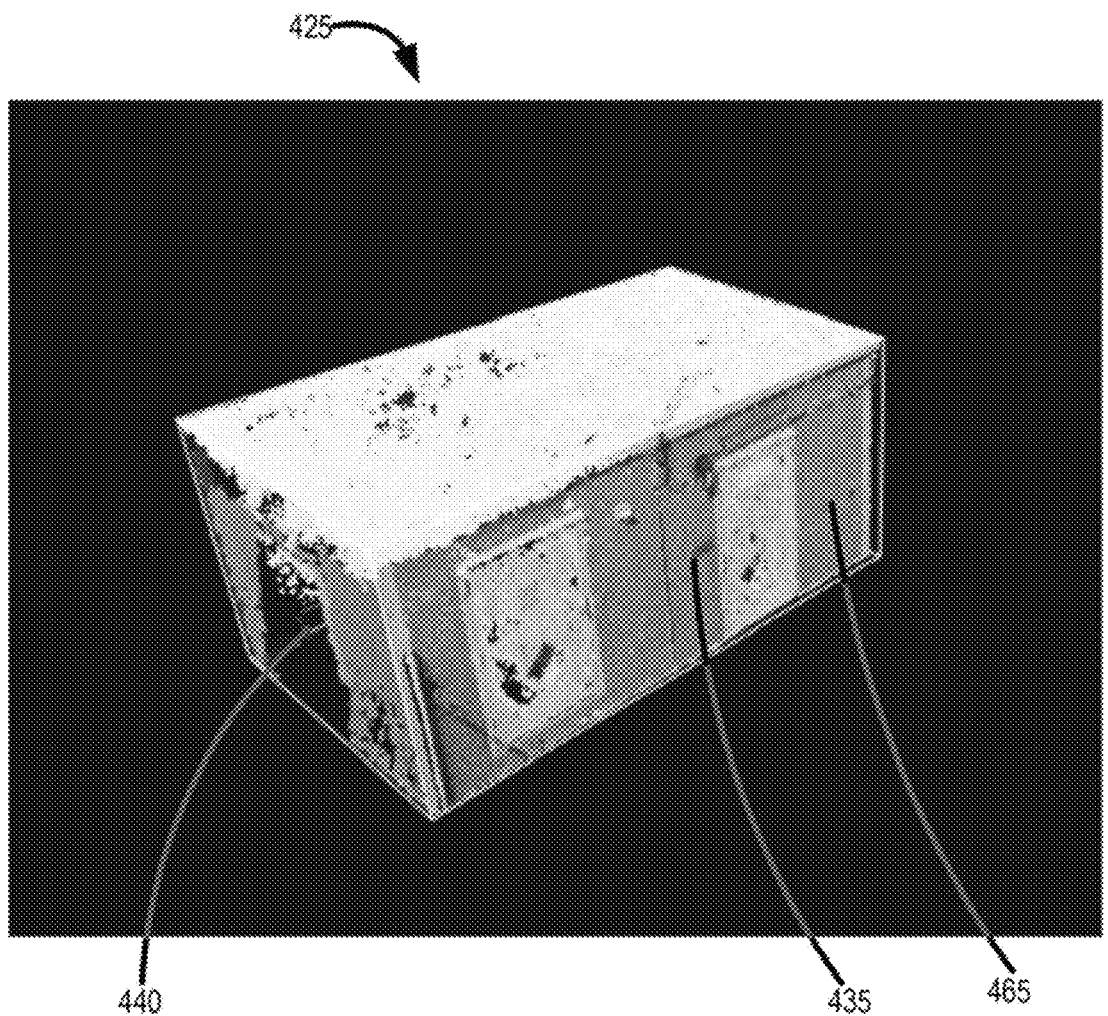
Figure 4F:
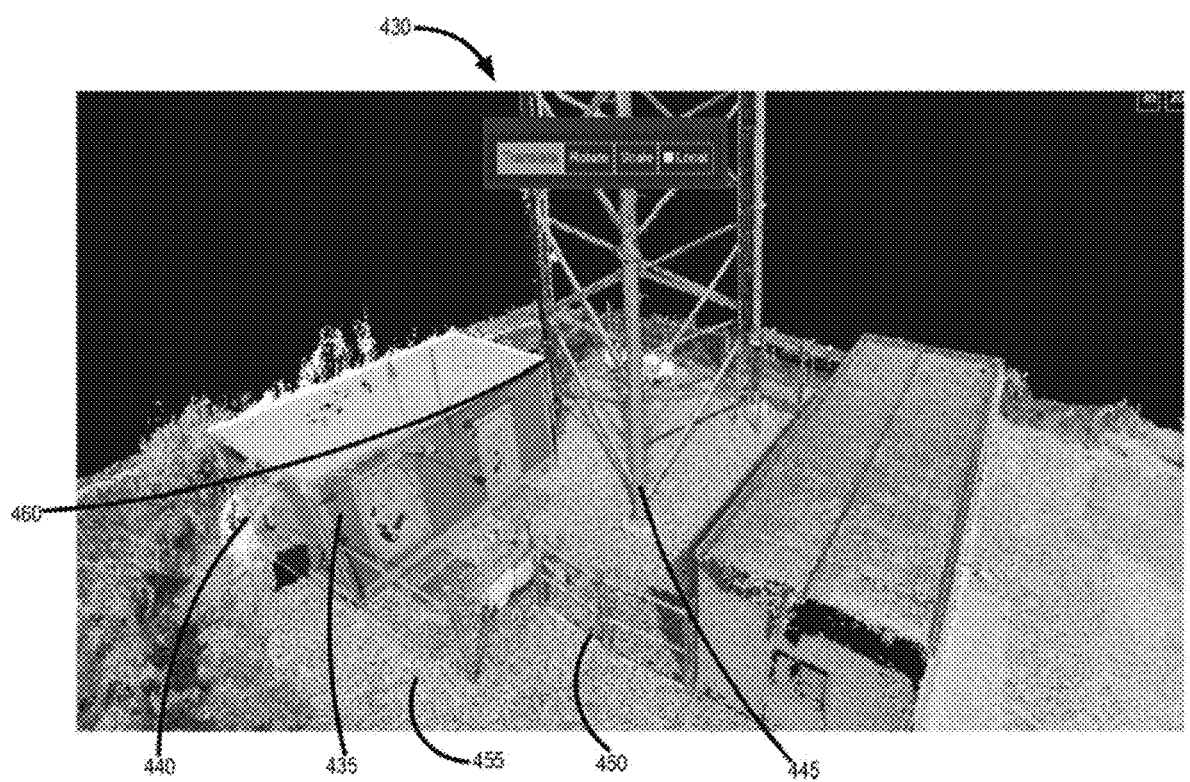

In this illustrative and non-limiting example, the user task is to define the 3D geometry of the ground equipment shown in FIGS. 4A-4F that shows scene or location user display renderings 400, 405, 415, 420, 425, and 430 respectively. In FIG. 4A, 3D point cloud 400 of the entire cell tower site is being used as the base viewport. As can be seen, the scene or location in which actual cell tower is located is a cluttered site with tens of thousands of 3D points representing the building 435, ventilation equipment 440, cell tower base 445, fence 450, ground 455, etc. In order to simplify the task, and as shown in FIG. 4B, the user can import a rough 3D volume 460 into the scene via a drag and drop functionality or selecting 3D points in the space to define the corners of the 3D volume as area or region of interest 460*a*, 460*b*, 460*c*, 460*d*, 460*e*, and 460*f*, as well as 460*g* and 460*h* (not shown). The user now has the option to activate data trimming. Once activated, the user's display will only include the data that is of interest to the user in the base viewport as shown in FIGS. 4C-4F. It can be noted that the same impact can be propagated simultaneously into the dependent viewport(s). The user is now capable of fine-tuning the geometry of the selected 3D volume of interest in a number of manners, for example via manipulation of one or more of corners 460*a*-460*h*, modifying the geometry in a free form such as by drawing on the display with a pen etc., modifying the geometry of a corner while all other corners are locked to their current location, modifying the geometry of a surface while all other surfaces are locked to their current location, rotating the 3D volume, modifying the 3D geometry of a surface while the surface can only be moved in a certain direction, or ultimately asking automated algorithms to fine-tune to the best-fit 3D geometry considering the existing data in the local neighborhood. While performing any manual or automatic modification to the 3D geometry (i.e., 3D area/region/volume of interest), data trimming continuously updates the content of the user's display to match the user actions, such as shown in rendering 425 (FIG. 4E) where ventilation area 440 has been removed. Once all the fine-tuning steps are done so that the accuracy requirement levels are met (FIG. 4E), data trimming can be deactivated, and the user display will once again include all the available data points (FIG. 4F). It needs to be noted that the same data trimming functionality can be expanded to include overlaying or superimposing data which previously disclosed herein, such as the imagery shown as 465 (FIG. 4E) in renderings 425 and 430.

As would be appreciated, to provide substantially equivalent viewports for concurrent display, that is viewports including object different object information having exact or substantially equivalent orientation, perspective, or viewpoint vis-à-vis the user's real time navigation and position of the scene camera with respect to the subject object, feature, scene, or location, each of the at least two concurrently displayed viewports must be generated or derived from sensor data that registered. Such registration allows the concurrently displayed viewports to comprise substantially uniform first and second (and third and fourth etc.) information representations of the subject object (or feature scene, or location) to the user in real time. When each of the at least two viewports are generated or derived from a single dataset, the subject data will be fully registered because, as would be appreciated, the subject viewport will be derived from the same dataset in the first order. When the at least two viewports are generated from different datasets, a data registration step can be performed on the subject datasets, as will be discussed in more detail hereinafter. In some implementations, a registration validation step can be performed to test alignment of the sensor data obtained from two different sensors and/or two different sensor data acquisition events.

To this end, for sensor data that are not derived from the same source (e.g., 3D point clouds that are not derived from associated 2D image data), appropriate registration techniques can provide data alignment for generation of suitably aligned viewports comprising of 2D and/or 3D information, as well as enabling substantially seamless navigation in and around a user display obtained, generated, or rendered from 2D and/or 3D for an object, feature, scene, or location of interest, as well as any surrounding areas. An exemplary scenario where at least partial registration is appropriate could be the concurrent display of a 3D point cloud that is generated from a set of 2D RGB imagery as the base viewport, where this base viewport is concurrently displayed with a set of 2D thermal imagery as the one or more dependent viewports. Other scenarios can be contemplated.

In general, there are several registration techniques suitable to allow estimation of the data alignment parameters, including but not limited to: transformation to a known or global coordinate system, P3P or in general PnP algorithms, iterative closest point (ICP) algorithms, 2D feature matching algorithms, virtual 2D feature matching algorithms, Ground Control Points, and manual tie points.

As a non-limiting example for the case of transforming data to a known or global coordinate system where the subject sensor data comprises 2D and 3D data generated from different sensors and/or in different sensor data capture events, one of the data sources (e.g., either a 3D rendering or an independent set of 2D image data) can be selected as the base data source, which, in turn, corresponds to the viewport for presentation on the user's display. At least one additional data source, which is not already registered with the base data source, can be selected as the model data source from which the at least one further viewport is obtained, provided, or rendered. A transformation matrix $X_b$ is defined such that it converts coordinates of the base data source into a known or global coordinate system such as Geocentric, Geodetic, UTM, etc. On the other hand, a transformation matrix $X_m$ is defined such that it converts coordinates of the model data source into the same known or global coordinate system that was used for transforming coordinates of the base data source. Once the common coordinate system is established, coordinates of the model data source can be converted into the coordinate system of the base data source by first applying $X_m$ followed by applying the inverse of $X_b$. This transformation chain can be combined into a single transformation matrix that encompasses necessary alignment parameters.

In a further example of a suitable registration technique, given a set of n 3D points from the 3D rendering data and their corresponding 2D projections in an image from the independent set of 2D imagery, camera pose for the image in the coordinate system of the 3D rendering can be estimated if n≥3. The camera pose consists of 6 degrees-of-freedom (DoF) which includes 3 rotation parameters (roll, pitch, and yaw) and a 3D translation. The camera pose contains necessary alignment parameters and leads to the following equation for the projection model $$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix}$$

In yet a further example, the independent set of 2D imagery could be used to generate a 3D rendering that would be different from an already existing 3D rendering. Necessary alignment parameters could then be inferred from a transformation matrix that registers the new 3D rendering into the coordinate system of the already existing 3D rendering. This can be achieved using ICP algorithms which minimize the difference between two clouds of points. Considering its most generic form, at least 4-point correspondences need to be established to estimate a transformation. In a RANSAC-based approach, 4 random corresponding points (which could be as simple as using the closest point to a given 3D point in the other point cloud) are selected and a transformation matrix is calculated. Total distance error among the whole set of corresponding points is then calculated and after a number of iterations, the solution with the minimum error is selected.

Still further, 2D feature detection and matching algorithms such as SIFT, SURF, ORB, DAISY, Harris Corners, etc. could be used to establish correspondence among 2D features from the 2D image set that was used to generate the existing 3D rendering and the independent 2D image set. Each one of those correspondences indicates a 3D point cloud and mathematical models similar to the PnP algorithms can be used to estimate the alignment parameters.

In another example of a suitable registration technique, synthetic 2D images could be generated from the existing 3D rendering if no set of corresponding 2D images exist for the existing 3D rendering (e.g., when the 3D rendering is acquired from a laser scanning event with no accompanying RGB imagery). Once the synthetic 2D images are generated, an approach similar to the one that is explained in the previous paragraphs could be employed to estimate the alignment parameters.

In yet a further example, ground control points (GCPs) could be utilized to establish correspondences among different data sources corresponding to the base visualization and at least one additional visualization. GCPs are points on the ground, or any surface, with known coordinates in the spatial coordinate system. Their coordinates could be obtained using traditional surveying methods in the field or from other available sources. As long as at least three GCPs are visible among the given data sources, the registration parameters can be calculated automatically.

Still further, a user could manually establish correspondences among different data sources corresponding to the base viewport and one or more additional viewport. These correspondences are called "manual tie points." Once at least three manual tie points are provided for the given data sources, the registration parameters can be calculated automatically.

As indicated by the above sensor type and data source listing, the variety of data that can be utilized to provide, generate, or render viewports for display to the user are expansive. Using a specific example of a 3D rendering as the base viewport and 2D imagery as an at least one further viewport for concurrent display, a user can navigate and position a scene camera in and around a 3D rendering incorporating at least one object, feature, scene, or location of interest, where the 3D rendering is presented on his display. As the user navigates to and positions his scene camera vis-à-vis the 3D rendering, a sensor data source, such as a 2D image set from which the 3D rendering was derived, is automatically processed to identify one or more 2D images that are associated with this real time location for the scene camera. Such identified one or more 2D images are displayed to the user in real time and are presented having the duplicated or substantially duplicated perspective, orientation, or viewpoint to the base viewport.

In a further implementation, the system can dynamically generate a user display based on the positioning of the scene camera to provide the user with the ability to virtually travel through and among the 3D rendering irrespective of whether sensor data exists for the positioning of the scene camera at the selected areas. For example, the user can navigate and position a scene camera pointed at the corner of an HVAC unit on a roof at approximately 6 feet from the roof surface, a positioning that would approximate a person's vantage point while walking on the roof in real life. It is likely that no source imagery exists for this perspective because all imagery would have been acquired from drones at a position much higher than selected (e.g., 6 feet high) scene perspective. The system can generate a user display of the 3D rendering of the object or objects present in the scene or location even though there are no corresponding actual images at this high. The system is configurable to dynamically generate synthetic images from acquired image data in real time to provide the user with a seamless/real time ability to "virtually walk through" the roof scene on his display as though actual images at the selected perspective existed.

The methodology herein can continuously process the user's scene camera navigation and positioning substantially in real time to identify one or more 3D point(s), one or more 3D surfaces for an object (or components/features thereof), one or more combinations of connected 3D surfaces for an object (or components/features thereof), the whole of a 3D object, and/or one or more combinations of connected/nearby 3D objects. This is then used to infer the intent of the user in the context of his scene camera's positioning in relation to the object, feature, scene, or location of interest. To this end, any point or location at which the user places his scene camera relative to a displayed viewport will be mirrored on one or more dependent viewports. The processes herein therefore combine the real-time orientation, perspective, or viewpoint of the user's scene camera vis-à-vis a viewport selected by the user as he positions the scene camera. Such concurrent display of two or more viewport can provide improved context for the user when undertaking a user-task.

In a significant aspect of the present disclosure, it has been determined that user behavior as he navigates and positions his scene camera in and around the at least two concurrently displayed viewports associated with an object, feature, scene, or location of interest can provide guidance as to the activity that the user is performing in real time. The inventors herein have determined that this inferred user intent can, in turn, provide the user with a more robust and powerful analysis tool that can minimize the mental processing required by the user to maintain an understanding of the scene, objects therein and the specific measurements, geometry, topology, and semantic features therein during the user's real-time navigation around the viewports concurrently provided to him.

While it is not possible to "read the user's mind", the inventors herein have determined that, by leveraging available information about the user's behavior as indicated by the real time navigation and positioning of his scene camera relative to one or more objects, features, scene, or locations displayed to him as one or more viewports, likely user intent in relation to a user information goal or activity can be inferred, at least in part, to provide him with information that is more likely relevant to his user activity in context and any information goal associated therewith. For a better inference, this can be augmented by information about scene type, structure type, structure size, and location of the objects etc. that are presented on his display; this information can be automatically predicted using artificial intelligence, retrieved from an existing library, or provided by the user. When combined with information that is known or knowable about the objects, features, scene, or locations of interest, such as that available in a library of information relevant to the subject object, feature, scene, or location, more context-rich information can be provided to a user from the display, as well as being provided as information output for use. Moreover, in some implementations, this context-rich information can be provided to the user in real time as he is navigating and positioning his scene camera in and around one of the concurrently displayed viewports.

A user activity—that is, the reason or purpose that the user is viewing the viewports in the first order, and why he is navigating in and around the viewports on his display using his scene camera—can be one or more of the viewing, inspection, inventorying/identification of objects, lifecycle management, BIM, performance assessment, condition state monitoring, and/or performance of engineering activities related to an object or a collection of objects of interest. As described herein, such activities can comprise a user information goal that forms the basis of the described systems and processes.

In one aspect, a "user activity" can be inspection level detail associated with the sensor data relative to an object(s), feature(s), scene, or location(s) of interest, with a user information goal associated with such user activity being generation of appropriately detailed information of the object(s), feature(s), scene, or location(s). For instance, in a cell tower scenario as a non-limiting example, inspection level detail can mean that the information derived from sensor data acquired from a UAV flight could first enable identification of one or more objects of interest on the tower structure as one or more foundation, antenna, dish, transmission line, waveguide bridge, grounding, conduit, lighting, paint, galvanizing, fencing, vegetation, concrete, meter bank, labeling, ground components, ground transformer, H-frames, ground shelter, anchor bolt, or something other. Once identified via user observation on his display and, optionally, image analytics and machine learning, derived information for the object, feature, scene, or location of interest could then allow the user to obtain, via an up-close inspection process, an identification of the presence or absence of damage, such as corrosion, rust, erosion, a short hazard, drainage issues, discoloration, deformation, and the like. As the user navigates and positions his scene camera in and around one or more displayed viewports, for example a 3D point cloud of the subject tower as the base viewport, the system will select and, if necessary first perform processing on, one or more 2D images that are determined to best match the orientation, perspective, or viewpoint that is the inferred user intent, where the inferred user intent is inferred from the user's navigation and positioning of the scene camera in and around the 3D point cloud. As discussed elsewhere herein, such synchronized images will be substantially or precisely aligned with the specific cell tower orientation, perspective, or viewpoint that is the inferred user intent vis-à-vis the navigation of and positioning of the user's scene camera relative to the 3D point cloud.

As would be appreciated, the meaning of "inspection level detail" can vary according to the type of inspection being undertaken and the object, or feature, scene, or location (or collections thereof) of interest. For example, if the inspection being conducted is of the area around a potential cell site to determine whether that location is suitable for an installation, the inspection could be directed toward assessing the condition of the subject area in relation to the engineering requirements of the subject cell site. Thus, and as discussed in more detail herein, the information returned in relation to this, and other, inferred user intent can be associated with this user activity in context. If the inspection is being conducted to assess whether one or more components or features on the cell tower itself may need repair or replacement, the information returned in relation to an inferred user intent can be associated with this user activity in context. In summary, inspection level detail generates information about an object, feature, scene, or location of interest and areas proximate thereto that provides a user with actionable insights regarding condition, maintenance, repair, etc., where such actionable insights are associated with full or partial completion of the user activity. Moreover, such generated information relevant to the full or partial completion of a user activity can also be used to improve subsequent inspections of the subject object, feature, scene, or location by incorporation of such information into training sets for machine learning. Yet further, the information can be used to generate reports, in lifecycle management, in contract/payment etc.

In a further aspect, a "user activity" can be an inventory of an object, feature, scene, or location of interest. "Inventory" means a count, listing, etc. of features, elements, components that are present with or that are in a collection of objects of interest.

Still further, a "user activity" can be a performance assessment that characterizes attributes of an object or collection of objects, features thereon or related to, as well as any associated scene or locations informing a user, owner, operator, manager, regulator, etc. of how well the object(s) of interest carries out its functions. Categories of performance can comprise quality (e.g., how well an object fulfils its intended functions), resource expenditures (e.g., energy usage, water usage, etc.), and workload capacity (e.g., the amount of work the object is capable of doing). The performance of an object or collection of objects of interest can be influenced by the response of the object(s) to an external load or condition. Object performance assessment can be relevant in design, asset services engineering, regulation, compliance, asset management, etc.

In a further aspect, the "user activity" can be an assessment of a condition state of an object or collection of objects relating to the appearance, quality, age, working order, remaining useful life, etc. A condition state relates to how the asset exists in context.

Lifecycle management can also comprise a "user activity." "Lifecycle management" means assessment of a lifecycle of an object of interest, a collection of objects of interest, or features thereof from a first time, such as installation at a location, through use thereof by a user, to decommissioning of that asset or components thereon at one or more subsequent times.

Yet further, a "user activity" can be building information modeling (BIM). As would be appreciated, BIM is a digital representation of physical and functional characteristics of a facility, building, space, etc., which will necessarily incorporate information about objects present therein. BIM is associated with a shared knowledge resource for information about a facility forming a reliable basis for decisions during its lifecycle, defined as existing from earliest conception to demolition. BIM involves representing a design as combinations of "objects"—vague and undefined, generic, or product-specific, solid shapes or void-space oriented (like the shape of a cone or more), that carry their geometry, relations and attributes. BIM design tools allow extraction of different views from a building model for drawing production and other uses. These different views can be made automatically consistent, being based on a single definition of each object instance. BIM software also endeavors to define objects parametrically; that is, the objects are defined as parameters and relations to other objects, so that if a related object is amended, dependent ones will automatically also change. For the professionals involved in a project, BIM enables a virtual information model to be handed from the architect or design team to the main contractor and subcontractors and then on to the owner/operator; each professional adds discipline-specific information to the single shared model. This seeks to reduce information losses that traditionally occurred when a new team takes 'ownership' of the project and provides more extensive information to owners of complex structures.

In some implementations, a user activity can be associated with a user information goal. In this regard, a "user information goal" can be expansive and can comprise or be associated with one or more of user activities from which information is intended to be derived therefrom. For example, a user information goal can be to generate one or more of substantially accurate measurements, geometry, topography, topology, etc. Still further, a user information goal can comprise qualitative inspections that generate measurements, geometry, topography, topology, etc. having relative metrics that can be ascribed to the subject object, feature, scene, etc. Yet further, a user information goal can comprise one or more of inventory management, health monitoring, damage assessments and condition state determination, condition state progression over time, deficiency identification, technical performance (e.g., coverage area by antenna or load bearing capacity of a building), serviceability, progress monitoring, as-built vs. as-designed discrepancies, engineering drawings or specifications, Building Information Modeling (BIM), preventive maintenance reports, repair cost estimation, life-cycle modeling or reports, Geographical Information System (GIS) reports, 2D/3D/4D/5D visualization, emergency/disaster simulations, emergency/disaster response guidelines, geometry/topology/semantics modeling, etc.

In an implementation, the user can navigate and position his scene camera to select a location or area on the base viewport or one or more additional viewport presented on his display via clicking or otherwise activating a pointing device (e.g., mouse, pen, finger, etc.) that is itself being deployed by the user to navigate around the at least two viewports that comprise the object, feature, scene, or location of interest. Alternatively, the user's scene camera can locate the user in relation to the base viewport and any concurrently displayed at least one additional visualization, and a separate device (e.g., pen, finger) can be used to identify a location or area of interest on the viewport.

The systems and methods are configurable to allow the user to generate actionable insights that are relevant to and associated with the user activity in context. In this regard, the user has the flexibility of selecting one of the sensor data types as the basis for navigation and positioning of the scene camera in and around the at least two concurrently displayed viewports. As an illustrative example, a user might select a 2D orthomosaic image as the base sensor data type from which the base view port is provided, generated, or rendered. This 2D orthomosaic image will then comprise the base viewport upon and through which the user navigates and positions his scene camera. Moreover, he might want to concurrently inspect one or more of 2D RGB imagery, a 3D point cloud generated from the 2D RGB imagery, and 2D thermal imagery along with the base viewport, with the other listed types comprising additional viewport for s concurrent display. Such other sensor data viewports can be selected by the user, the computer, or a combination thereof. Any user interaction with the 2D orthomosaic image in this scenario (e.g., zoom, pan, rotation, etc.) can be translated into action taken on the other three sensor data types that are being provided, generated, or rendered as viewports and concurrently displayed to the user.

In some aspects, the user activity can be identified by the computer or the user prior to or during the navigation of the user's scene camera through and among the base viewport or the one or more viewports. With regard to user identification of a user activity, the user can select a user activity from a list of activities or input an activity separately. A workflow can be generated that is associated with the user activity expressly identified by the user, and the attendant sensor data viewport (e.g., 3D point clouds, 2D imagery, thermal imagery, semantic imagery etc.) can be provided to the user on his display that is appropriate for such identified user activity. Processing of the available sensor data prior to display to the user can be conducted to provide improved viewports and attendant information, as discussed elsewhere herein. When the computer identifies the user activity, the user intent can be inferred from characteristics associated with the user's navigation and positioning of his scene camera through and around the base viewport and the one or more additional viewports. In other words, the user activity can be identified, in whole or in part, with an inference of user intent.

In an exemplary implementation of the present disclosure associated with such inference of user intent, when a user locates, such as by positioning or pointing, his scene camera at a location on a base viewport presented on his display that is a 3D rendering of the object, feature, scene, or location of interest, a first set of one or more 2D images associated with a user intent inferred from the scene camera navigation and positioning can be identified and concurrently displayed to the user in real time. When the user navigates and positions his scene camera to a different location on the base viewport that is the 3D rendering in this example, a new set of one or more 2D images associated with an inferred user intent for that location can be automatically identified and provided to the user in real time. Yet further, for each new location to which the user navigates and positions his scene camera vis-à-vis the base viewport, a new set of one or more user 2D images can be provided to the user in real time on his display.

By way of explanation, the inference of user intent can be represented as a multi-objective optimization problem which intends to determine a vector of design variables x that are within the feasible region to optimize a vector of objective functions and can be mathematically illustrated as follows:

Optimize $F(x)=\{w_1 \times f_1(x), w_2 \times f_2(x), \ldots, w_m \times f_m(x)\}$ Subject to $w_i \geq 0$ and $g(x) \leq 0$ where $f_i(x)$ is the i-th objective function, $w_i$ is the weight for the i-th objective function, and $g(x)$ is the constraint vector. The list of objective functions includes, but is not limited to, one or a set of following functions: Euclidean distance between the scene camera and a candidate image; navigational distance between the scene camera and a candidate image; angle between the direction of scene camera viewpoint and direction of a candidate image; angle between the orientation of scene camera viewpoint and orientation of a candidate image; overlap between the area of the scene covered by the scene camera and a candidate image; angle between the viewpoint direction of a candidate image and normal vector to the primary object surface; ratio of the object surface area covered in a candidate image to the total object surface area; ratio of the occluded object surface area in a candidate image to the total object surface area; and ratio of the occluded object surface area in a candidate image to the object surface area covered in the candidate image.

Again using the non-limiting example of 2D images as one or more viewport along with a 3D rendering as the base viewport, once the user intent from a specific scene camera location relative to the displayed base visualization is inferred, processing steps can then be configured to derive intrinsic, extrinsic, visual, etc. properties of each and every image from an available 2D image set in order to identify a single image or a sorted list of 2D images that best represents the inferred user intent, that is, the specific user activity that is known or that can be inferred from the user's navigation and positioning of his scene camera vis-à-vis the 3D rendering. This returned 2D image set can be obtained from one or more of image processing steps that incorporate factors such as minimizing false positive instances, minimizing occluded areas images, maximizing the object/surface area visible in the image, minimizing surface-sample-distance, maximizing resolution, minimizing image artifacts, minimizing view-angle difference, minimizing illumination artifacts such as sunlight reflection, shades, overexposed pixels, etc., ensuring a perpendicular view to the intended surface, minimizing reprojection error, minimizing image blurriness, etc. Such one or more processing steps that can be performed on the subject 2D images that are provided as one or more additional visualizations for concurrent display with the base visualization—or, more broadly, sensor data that is provided as one or more dependent viewports with the base viewport—is a notable improvement with the disclosed systems and methods, at least because such processing can provide an optimum concurrent visualization for each base visualization provided, generated, or rendered on the user's display.

In this specific case of user navigation through a 3D rendering of a scene as the base visualization and a concurrent display of the best 2D RGB imagery associated with that 3D rendering in one or more windows on the user's display as the at least one additional visualization, viewpoint-centric and/or point-centric approaches exist as prior art. In notable differences from prior art vs. the systems and methods herein that provide concurrent 2D and 3D information display methodologies when the user navigates through a 3D rendering of a scene, the systems and methods herein are configurable to display 2D and 3D sensor-derived data that is generated via an object-centric approach that results from an inference of user intent derived from user navigation through and around the 3D rendering vis-à-vis his scene camera. As such, the generated user display incorporating the at least two viewports of the scene and any objects or features therein can be derived in the present disclosure from the context of the scene and/or the surface(s) and/or the object(s) as present in the 3D information, such as the nature and characteristics of the object(s) and the likely information that the user may be seeking from his navigation and positioning of his scene camera through and around the visualization of 3D information displayed to the user in real time. The likely information that the user may be seeking is associated with the inferred user intent, as discussed herein. The improved user observation and navigation in and around 2D and/or a 3D information concurrently displayed to him can, in turn, result in improved execution of the user activity and any information goal associated therewith, such as by providing enhanced information to the user, about the object, feature, scene, or location of interest.

In a non-limiting exemplary scenario, the user's scene camera navigation and positioning may indicate that the user is looking at a 3D rendering of a roof structure from a far-range viewpoint, as indicated by the boundaries of the building being visible at the boundaries of the user's display. In other words, by processing the location and positioning of the user's scene camera in relation to the 3D rendering and its field of view (FoV), the system can generate an inference that the user intent is to view the scene and object(s) from a distance which, in turn, would be associated with a user activity that is relevant to this farther range viewing event. In such a scenario, the user activity can be inferred as obtaining of an overall understanding of the building geometry, a rough inventory of the objects on the roof, and/or the relationship among those objects. In other words, the user intent is derivable at least from the user's real time navigation and positioning of his scene camera. The processing herein can therefore be configurable to recommend for concurrent display with the 3D rendering base viewport and one or more 2D images as dependent viewports that optimally represent that observational aspect likely to be associated with the inferred user intent, as well as the associated user activity and an appropriate information goal as determinable from the user's positioning of the scene camera relative to the object(s), feature(s), scenes(s), or location(s) in the overall scene vis-à-vis the 3D rendering on the user's display. The 2D image set from which the 3D rendering was generated in this non-limiting example can be automatically searched to identify and concurrently display images that are associated with the object(s), or feature/(s), scene, or location(s) of interest at the location of the user's scene camera vis-à-vis the real time navigation and position thereof. As the user moves around the object via the base viewport from this point of distance, the concurrently displayed 2D images as dependent viewports can change to deliver images that are associated with the real time positioning of the scene camera. However, as long as the user viewpoint remains distant from the object, the inferred user intent will not change, and the identified and concurrently displayed images will also incorporate such more distant viewpoints.

As a further illustrative example, a UAV equipped with a 2D image sensor might have been used to acquire a set of nadir, orthogonal and/or oblique imagery from a commercial roof structure in a scene during a sensor data acquisition event. Structure-from-Motion algorithms can be used to process the acquired 2D imagery to generate a dense 3D point cloud and/or 3D mesh rendering of the building and the surrounding scene. The 3D rendering can be displayed on the visualization and inspection software so that a user can navigate and position his scene camera in and around the 3D rendering of the scene and building on his device screen, where this 3D rendering comprises the base viewport. Concurrently with such navigation, the 2D image set from which the 3D rendering was derived can be processed to identify and concurrently display one or more 2D images that are determined to be associated with the inferred user intent.

As a further example, if thermal imagery exists for a subject object of interest, for example a building having features or components of interest thereon, such thermal imagery can be presented as a base viewport to the user concurrently with the at least one additional dependent viewport comprising both 3D point clouds and associated 2D imagery for concurrent display. As the user navigates through and among the base viewport, both the 2D imagery and the 3D point cloud imagery can be continuously and automatically updated to substantially duplicate the orientation, viewpoint, or perspective of the scene camera vis-à-vis the base viewport. This continuous and automatic updating can be associated with the inferred user intent. In this non-limiting example, such a use case can allow a user who is seeking to examine reasons for disparate thermal envelope behavior in the subject building to be able to visually observe more precisely the reasons for heat loss in certain areas, but not others, for example. The user can thus identify heat loss from a specific window area from the thermal imagery, while at the same time being presented with 2D RGB images of the window area at the same location(s) at which he has navigated his scene camera. The additional enrichment provided from the 3D rendering of that same location in a separate window on his display can allow him to generate insights at that location that can inform his user activity and potentially improve the information obtained therefrom.

In another exemplary scenario, the user might be looking at a surface of an object, such as a feature or component thereon, from a close-range viewpoint as indicated by the navigation and position of his scene camera relative to a subject object in a 3D rendering that comprises the base viewport. In such an example, it can be inferred that the user intends to obtain information associated with a close-up visual inspection of the object surface for potential deficiencies, to identify the maker and model of equipment, read a serial number of equipment, inspect pipes connected to equipment, or any other task that would be associated with a close up-review of an object that is present in the overall scene. In such an inferred user intent, it can be expected that the user would need to review a high resolution 2D image having minimum occlusion and maximum sharpness because such small details of the scene would need to be visible in the image for the desired information goal to be achieved. The processing methodology herein can then be configurable to search an available 2D image set to identify one or more 2D images for concurrent display to the user that incorporate features that can optimally provide suitable detail for the selected object as indicated by the position of the user's scene camera vis-à-vis the 3D rendering substantially in real-time.

As another exemplary scenario, the user's scene camera position may indicate that the user is viewing his display at or near a region in the 3D scene rendering that is the base viewport that primarily contains the surfaces of an HVAC unit on a commercial roof. In such a situation, it can be inferred that the user intends to obtain an overall understanding of the geometry, topology, semantics, and health of the subject object of interest, here the HVAC unit. In this case, it can be inferred from the orientation of the user's scene camera around the 3D scene rendering—namely, the object itself—that the user wishes to obtain specific, but non-detailed, information about the HVAC unit, as compared to the close up information in the prior example. The context of the user's behavior relative to the base viewport on his display can be derived from the navigation and positioning of his scene camera in real-time vis-à-vis the 3D rendering which can, in turn, be used to infer the information goal that he seeks to complete from such scene camera positioning. The processing of the 2D image set in this scenario might then identify for concurrent display a 2D image or a set of 2D images that provides visual data to the user on his display that maximizes the number of visible surfaces of the HVAC unit while still maintaining an optimal resolution of the overall HVAC unit itself.

In another exemplary scenario, the user might be looking at a surface of an object, such as a feature or component thereon, from a close-range viewpoint as indicated by the position of his scene camera relative to the subject object. In such a scenario, it can be inferred that the user intends to obtain information associated with a visual inspection of the object surface for potential deficiencies, identify the maker and model of equipment, read serial number of equipment, inspect pipes connected to equipment, or any other task that would be associated with a close up review of the object. In such an inferred user intent, it can be expected that the user would also need to review one or more high resolution 2D images having minimum occlusion and maximum sharpness because such small details of the scene would need to be visible in the image for the desired user activity and associated information goal to be achieved. The processing methodology herein can then be configured to search the available 2D image set to identify one or more 2D images for concurrent display to the user that incorporate features that can optimally present for observation in close-up detail. If such close up detail of the object of interest is not available in the native images (or other sensor data from which a concurrently displayed viewport may be provided), a processing step can be performed to generate the appropriate detail, such as by performing a magnification, rotation, cropping, stitching, blending step or the like.

In a further aspect of the present disclosure, the systems and methods herein can provide an intuitive algorithmic adjustment of 2D images (or any other sensor data type that can be used as a viewport) prior to display thereof to the user. In this regard, prior to display of one or more of the object, feature, scene, or location viewport to the user on his display, the present methodology can incorporate an additional processing step that improves the native characteristics of the processed sensor data that forms the basis of the subject viewport. Exemplary one or more intuitive processing steps are listed herein.

To this end, when user intent as shown by the scene camera positioning and navigation vis-à-vis the base viewport or a dependent viewport indicates that the user seeks to obtain a view or perspective that is not actually available in the sensor data, the system can process the sensor data to provide object information that better conforms to the inferred user intent. This is a notable improvement over existing approaches that, generally, show one or a set of existing images, for example, to the user in the original format and setting, even though those images may not actually convey the information sought by the user in a particular instance. Because it has been found by the inventors herein that user intent can be derived from the navigation and positioning of the user's scene camera, it has been determined that, in some cases, processing of the original sensor data can make any viewports thereof better suited to match the user activity and the attendant information goal.

In some circumstances, the sensor data that would optimally satisfy the inferred user intent relative to user's scene camera positioning and navigation may not be available in native form. In a non-limiting example, when the 2D images present in the 2D image library are not able to provide a viewport that directly matches the inferred user intent derived from the user's navigation and positioning of the scene camera, the available 2D image set can be processed to generate a synthetic image for concurrent display to the user with the 3D point cloud information in real time. An example for this use case is when user is trying to look at a water ponding on a commercial roof. If the water ponding area is large, the entire water ponding area will not be visible in any of the original imagery. The 2D image processing can be configured to merge multiple images to create an image with higher resolution that covers the entire area of interest to allow the user to obtain a more comprehensive view of the total area of ponding, which can be inferred as the user intent from the scene camera positioning.

For example, in the non-limiting example of images as one or more dependent viewports for concurrent display presented along with a 3D rendering, an image processing step can be performed prior to generating viewports therefrom. Such image processing can be configurable to modify or adjust one or more images in the form of zoom, rotate, orient, crop, blend, correct/normalize illumination, remove shadows, magnify a portion, change contrast and brightness, sharpening, detect and remove blur (i.e., deblurring), restoration of defocused and blurred images, noise removal, motion deblurring, rolling shutter removal, etc., or any other of the intuitive processing steps mentioned herein.

As a further non-limiting example of a processing step that may be performed prior to providing, generating, or rendering of a viewport for concurrent display, consider the situation where the user seeks to obtain information in an area where the available imagery (or other acquired sensor data) includes occluded areas. Such occluded areas often result from the incomplete capture of data during the sensor data acquisition event, for example, in the acquisition of imagery via multiple passes of an UAV over a scene that includes one or more objects of interest. In prior art methodologies that display information to the user, if the imagery includes occluded areas, that imagery will be presented to the user as-is, that is, including with the occlusions which will, of course, be missing information in those locations. In contrast, the present methodology can perform a processing step prior to display of the subject imagery on the user display to remove or reduce such occluded areas. Such processing can utilize AI methods, for example, to allow the missing areas to be inferred from library information or from other locations in an image(s) and filled in for viewport generation. Yet further, areas that are too dark can be automatically adjusted to lighten or improve contrast for user display review, for example.

In a further example, when the acquired sensor data is thermal imagery, for example, missing areas of thermal information in the subject dataset can be inferred via AI methodology or other processing methods to provide the user with a more complete viewport generation for the subject object, feature, scene, or location. In this regard, thermal imagery of a building where some of the areas of the building were not adequately covered when the sensor data was acquired can be filled in via processing of the thermal imagery to provide the user with more complete thermal information for the subject building.

The inventors herein have determined that by selecting the information for display to the user—including the additional step of processing the sensor data prior to display of a viewport to the user if appropriate—the display content provided to the user can provide enhanced and enriched information that is more likely to be associated with the user activity and any associated information goal in context.

In this regard, the features shown in the Figures hereinafter have the benefit of creating for the user a visual perspective of more dimensionally and context-rich 2D and/or 3D information by alignment of different types of viewports having substantially the same perspective, orientation, or viewpoints with respect to the object, feature, scene, or location of interest in the scene as presented on the user display. This methodology can generate a user experience that replicates or simulates the experience a person will have when visiting the object, feature, scene, or location in person in real-life. In other words, the user can be provided with a virtual experience via navigation and positioning of his scene camera in and around a sensor data viewport display, such as a 3D scene rendering, of the object, feature, scene, or location of interest as if he is himself the camera that is generating the information about the object, feature, scene, or location of interest. As noted herein, the systems and methods disclosed are applicable to a wide variety of sensor data that can be presented on a user display.

Moreover, the methodology can incorporate a processing step for the sensor data that can mirror or simulate the user positioning relative to the base viewport, even though the available sensor data may not actually incorporate such positioning. For example, if the user zooms, pans, rotates etc. vis-à-vis the base viewport, the sensor data processing step can be configured to modify the available images or other applicable sensor data to provide a viewport that more closely aligns with the inferred user intent.

In a further implementation, the user can have the option to manually identify a specific user activity or a broader category of user activities that could be used in the identification of the intent as the user's scene camera moves through and around a viewport. Prior to or during the performance of the user activity, the user can identify the object(s) of interest that are relevant to the user activity, components or features relevant thereto, and information of interest to be derived therefrom. The user can also optionally identify a user information goal associated with the user activity. For example, the user can identify whether the user information goal is directed toward accurate measurements, and if so, the percent error of the measurements. Such manually identified user activity can be used in combination with the user inference techniques herein.

Manual identification of a user activity and/or an information goal as a baseline can facilitate the identification of user intent in relation to the navigation and positioning of the user's scene camera through and around the base viewport on the user's display. For example, prior to navigation by the user of his scene camera around a 3D rendering on his display, the user can indicate that the user activity to follow is an inspection of one or more objects, or components or features thereof. As would be appreciated, for an inspection, visual features of an object would be of interest because an inspection, by definition, involves observation of the subject object, for example. Using the example of a 3D rendering as a base viewport and one or more viewports as one or more dependent viewports, when a user indicates the activity for which he will be navigating through and around a 3D scene rendering, the navigation and positioning of the scene camera relative to a viewport therein can allow the inference that the user is interested in inspecting the object proximal to the scene camera positioning. The 2D images identified and concurrently displayed can incorporate aspects of the object etc. that are relevant to inspection information thereof. If the user indicates that the user information goal is to determine whether a feature or component on the object of interest is in working order, the system can be configurable to not only identify and concurrently display 2D images of the object(s), the number of 2D images relevant for identification can be limited to only those that are associated with the subject components or features of interest. In other words, the use of a manually identified user activity and/or information goal along with the methods herein to infer user intent vis-à-vis the navigation and positioning of the scene camera can improve the delivery of viewports to the user, at least because the delivered viewports can effectively be "fine-tuned" to better address why the user is performing the activity in the first order.

For example, for a commercial roof, inspection as a user activity can be associated with identification of changes in coloration of objects or surfaces (e.g., from rust, standing water mold/mildew), areas that can be indicative of maintenance concern (wiring, plumbing), and the like. For a cell tower, inspection as a user task will likely be associated with review of the various equipment to assess functionality, attachment, and the like. As the user is navigating through and around the concurrently displayed viewports for which the user has identified an activity, the information provided to the user can be associated with the information relevant to such activities, with the specific information so provided can be, at least in part, determined by the information typically associated with the identified user activity.

Yet further, the system can be configurable to assist or restrict the user's navigation and positioning of the scene camera based upon a determination of inferred user intent. The system can thus be configured to identify an inferred user intent and to prevent one or more positionings of the user's scene camera, where such one or more positionings are determined to not provide relevant information about the object, feature, scene, or location of interest that is associated with the inferred user intent. For example, if the inferred user intent shows that the user seeks to examine the interior portion of a parapet wall, the system can be configurable to restrict the user's movement in relation to the object, feature, scene, or location of interest that is associated with the inferred user intent of the user to view the parapet wall. In an implementation, the system can be configured to identify one or more occluded areas associated with the object, feature, scene, or location of interest. The system can then restrict or prevent rotation or movement of the user's scene camera to the location where there is no data associated therewith. For example, since a parapet wall is, by definition, associated with an interior surface of a roof, any information exterior to the parapet wall would not be relevant to the parapet wall. As such, the rotation of the scene camera can be prevented because the exterior of the parapet wall is not relevant to an examination of a parapet wall. If the base viewport comprises dimension, geometry, topography, user activity can be restricted to prevent changes to the object that are out of bounds.

In an implementation, viewports for the object, feature, scene, or location of interest can be generated from the same acquired sensor data, where the acquired data is processed to provide different type of visual representations. For example, 3D point clouds or 3D meshes can be derived from a plurality of overlapping 2D images acquired of an object, feature, scene, or location using known photogrammetry techniques, where the 3D point clouds or meshes can comprise the base viewport. Such 2D and 3D information generated from the same sensor data will inherently be registered for generation and display of two or more viewports on a user display by virtue of being derived from the same sensor data such that it will comprise the same image metadata in the first order.

Alternatively, sensor data can be acquired from different sensors operational in the same sensor data acquisition event. For example, a UAV can be outfitted with a first sensor such as a 2D image camera and a second sensor such as a 3D depth sensor or LIDAR. If, prior to generation of a concurrent display of a base viewport and one or more dependent viewports, it is found that the acquired sensor data from which the viewports will be obtained, generated, or rendered is not at least partially registered with respect to each other, a registration step can be performed prior to obtaining, generating, or rendering of the viewports on the user display using the metadata generated by each sensor during the sensor data acquisition event, or via any one of the registration methods described hereinabove.

Yet further, two or more viewports for the object, feature, scene, or location of interest can be obtained, generated, or rendered from sensor data acquired in different sensor data acquisition events that has been synchronized, such as by registering the data in the same coordinate system. For example, where a first set of sensor data for an object of interest and the associated scene is acquired in a first imaging event and the second set of sensor data is derived from a dataset generated in a second sensor data acquisition event. An example of such separately generated sensor data can be when a sensor data acquisition event is conducted for an object of interest and a second sensor dataset was acquired at a different time for that same object of interest, for example sensor data available from an image library that includes sensor data for the object of interest, such as that available from the NearMap® library, Google Maps®, or a GIS library. First and second sensor data acquisition events for the objects of interest can be used to generate raw and/or processed 2D and/or 3D information for concurrent display of at least two viewports to the user even though the sensor data was acquired at different times, as long as the respective datasets can be appropriately registered for generation of the raw and/or processed 2D and/or 3D display information as disclosed herein. To this end, such separately generated data can be registered using metadata associated with the sensor data, (e.g., camera data, vehicle information, image acquisition information, etc.) that is incorporated in each of the respective datasets or via any of the other registration methods discussed herein. Synchronization can also be generated from performing of one or more transformations on the sensor data, such as when the data comprises different data types generated in a single sensor data acquisition event and/or in different sensor data acquisition events. Transformations are discussed elsewhere herein.

Still further, data from which viewports are provided, generated, or rendered can be derived from a synthetic image (or more broadly, synthetically derived sensor data) which is display information that is generated from synthetically derived sensor data generated from a collection of sensor data acquired in a sensor data acquisition event. Synthetic images can be generated from one or a combination of sensor data types. For example, a synthetic image can be generated only from a 3D point cloud, or only from a set of 2D RGB imagery, or from a combination of a 3D point cloud and one or more 2D RGB imagery, or from a 3D mesh, and so on. In a generic representation, a synthetic image is a rendered image of a real scene as it would appear from a certain camera viewpoint, considering certain parameters such as location, orientation, focal length, projection type, principal point, distortion, field of view, etc. In a specific non-limiting example of a synthetic image that is described in U.S. Pat. No. 9,904,867 (referred to as a "synthetic image" therein), the disclosure of which is incorporated herein in its entirety by this reference, a synthetic image is defined as a 2D representation of 3D information such as a grayscale or RGB 3D point cloud that is either already provided from for example a 3D laser scanning data acquisition event or derived from a set of 2D images using photogrammetry techniques. The synthetic image (i.e., 2D representation) provides a virtual—or synthetic—snapshot of the data from a certain location and direction; it could be presented as a depth, grayscale, or color (e.g., RGB) image. Synthetic images can be generated, for example, through the use of projective or orthographic modeling that has been estimated from the various other views provided, creating new vantage points and thus new representations for the object or objects in the scene etc., which can result in an increase in the quality of the extracted information. As with 2D and 3D sensor data derived from the same sensor data dataset, 2D data generated as a synthetic image will be precisely registered with the 3D information because each originates from the same dataset.

Yet further, one or more additional datasets can be registered with each of the 2D and 3D information datasets, for example to generate time or cost information that can be useful in various user contexts such as inspection, BIM applications, condition scoping or the like.

As noted previously, the sensor data can be acquired in sensor data acquisition events as described in the '735 and '104 applications, previously incorporated herein, as well as in any other suitable methodology. The sensor data acquisition event occurred at a prior time and, therefore, the sensor data and associated sensor data processing is not generated in a livestream event. Yet further, at least one of the objects of interest or the sensor is not moving in the scene during the sensor data acquisition event. Still further, the object of interest is not moving in the scene when the sensor data is being acquired.

As would be appreciated, in engaging in a user activity, it can be beneficial for the user to be able to navigate quickly and seamlessly and position his scene camera from and between one or more locations or positions on the base viewport and/or the one or more dependent viewports of an object, feature, scene, or location of interest and between each of the one or more further sensor data viewports that are concurrently displayed for a same location or areas on the object, feature, scene, or location. In a non-limiting example, it can be beneficial for a user to be able to quickly and seamlessly move back and forth between a 3D rendering as the base viewport and one or more 2D images as the one or more additional viewports from which the 3D rendering was derived or is associated. In this regard, the methodology herein provides processes to allow a user to quickly and seamlessly navigate and position a scene camera to a selected point on an object, feature, scene, or location of interest along with a real-time concurrent display of one or more sensor data viewports that are precisely aligned with the base viewport.

For the user to be able to visualize available 2D image information but through the lens of the scene camera focused on a 3D scene, the user can zoom in on the 2D image to gain a more detailed view of a selected location on the subject object. As noted previously, such positioning of his scene camera can allow the user intent as the provided object and scene display at any given time to be inferred, which will, in turn, result in processing of the associated 2D image set to identify and concurrently display one or more images associated with the scene camera positioning. The user can thus navigate his scene camera to a location on the object that is close to a surface of the displayed 3D object/scene rendering to gather information of interest about the subject object in more detail than is visible from the point cloud itself by simultaneous viewport of one or more 2D images precisely overlaid on the 3D point cloud.

Still further, the system herein can provide the user with one or more 2D image views that are associated with a location or area on the object, feature, scene, or location of interest on a 3D rendering displayed to the user, and are the best options among existing 2D image dataset for the user task goal of visual triangulation. Visual triangulation refers to the process of determining the coordinates of a point in 3D space given its projection onto two or more images. To this end, the user display can be provided with one or more images that are associated with a location or area of interest on a displayed 3D rendering and could lead to the most accurate and confident visual triangulation process. In an implementation for visual triangulation, the system can be configured to recommend the best 2D image option for a first selected area or location and then interactively provide the user with the next best 2D image that is associated with the area or location in response to all previous and current user action.

Figure 5A:
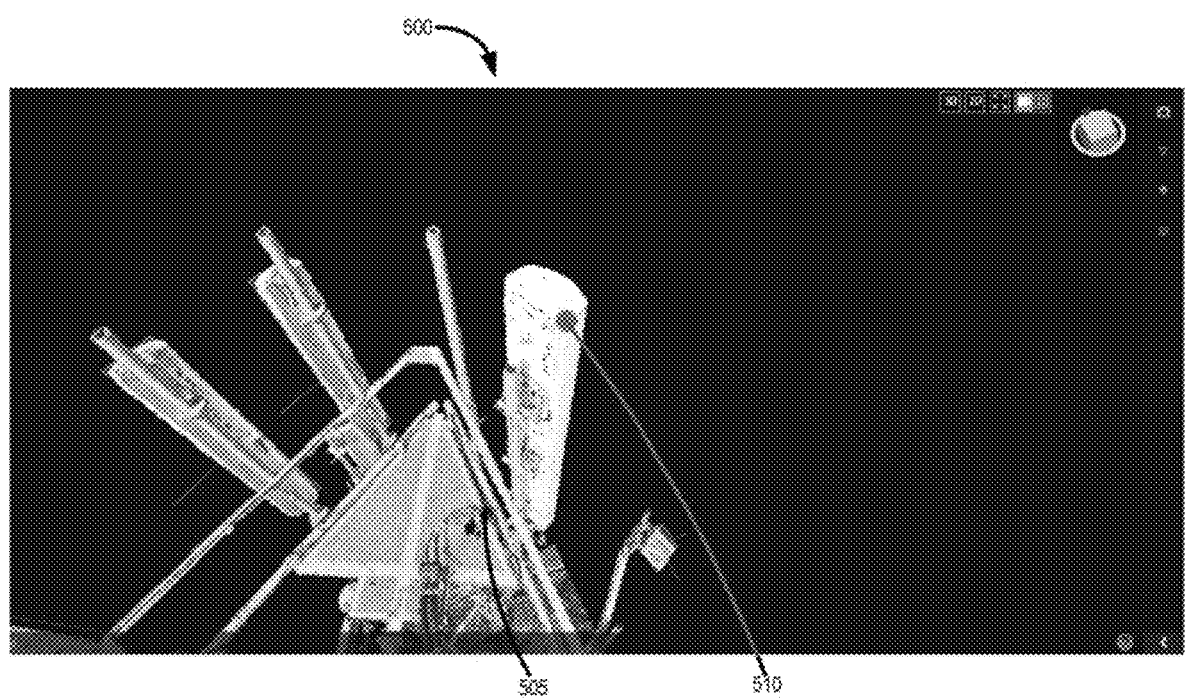
Figure 5B:
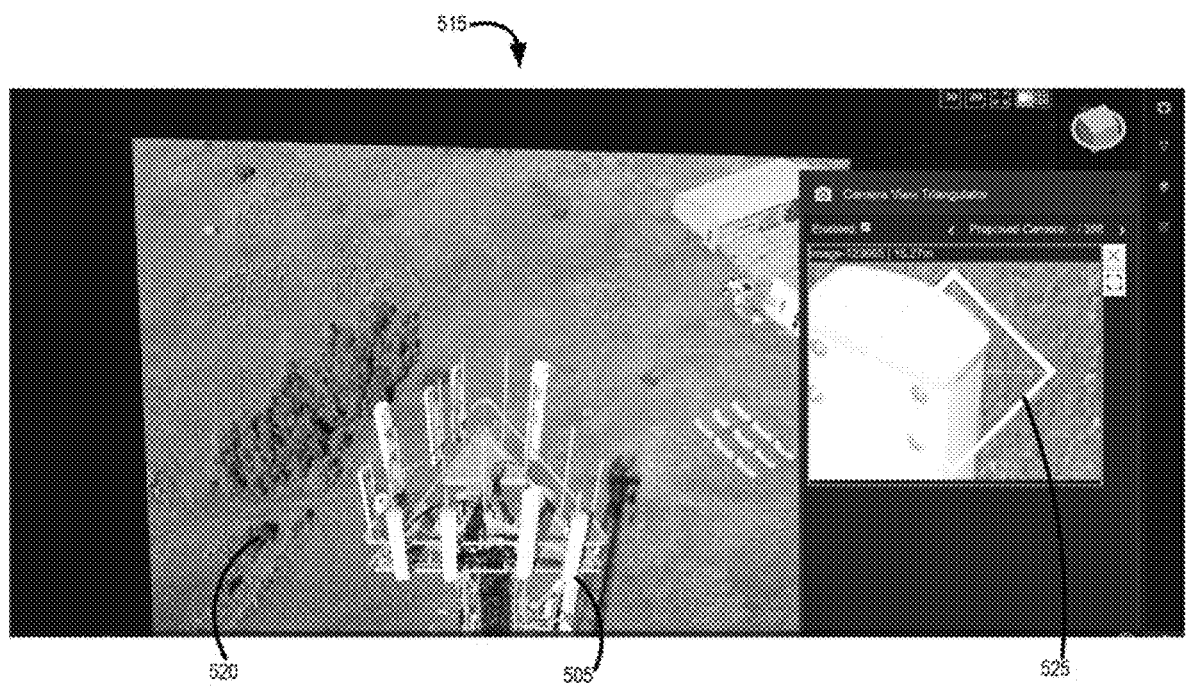
Figure 5C:
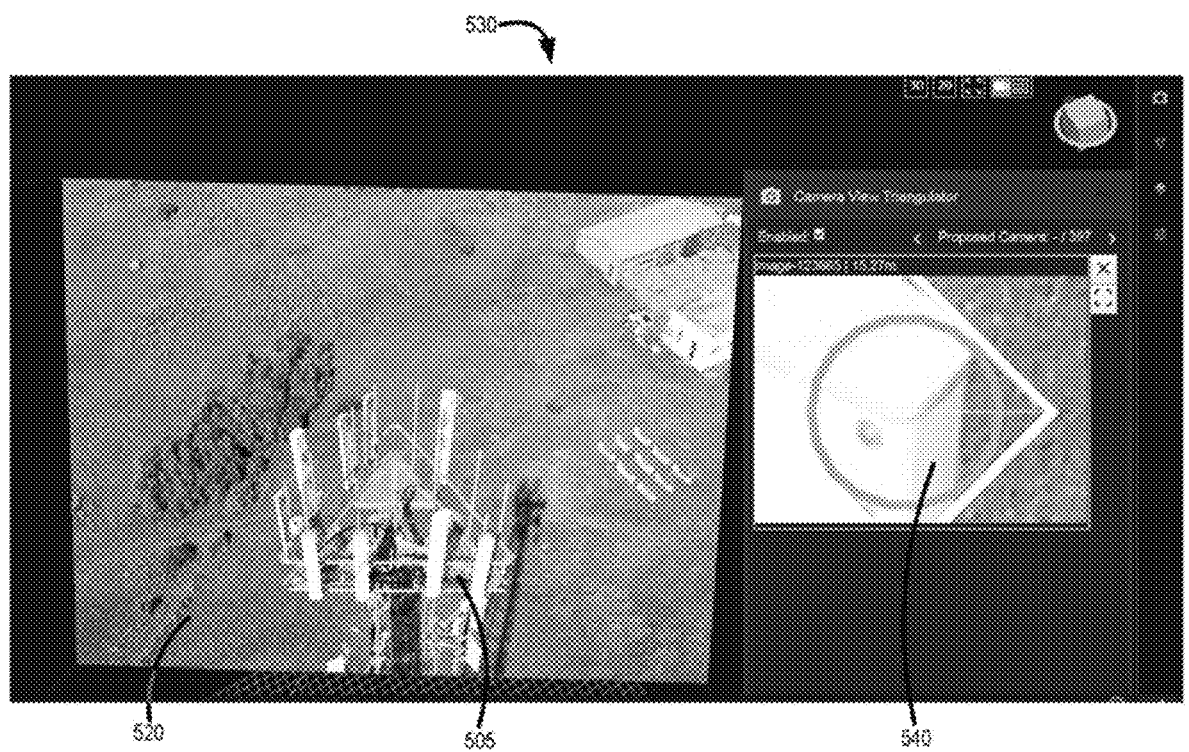
Figure 5D:
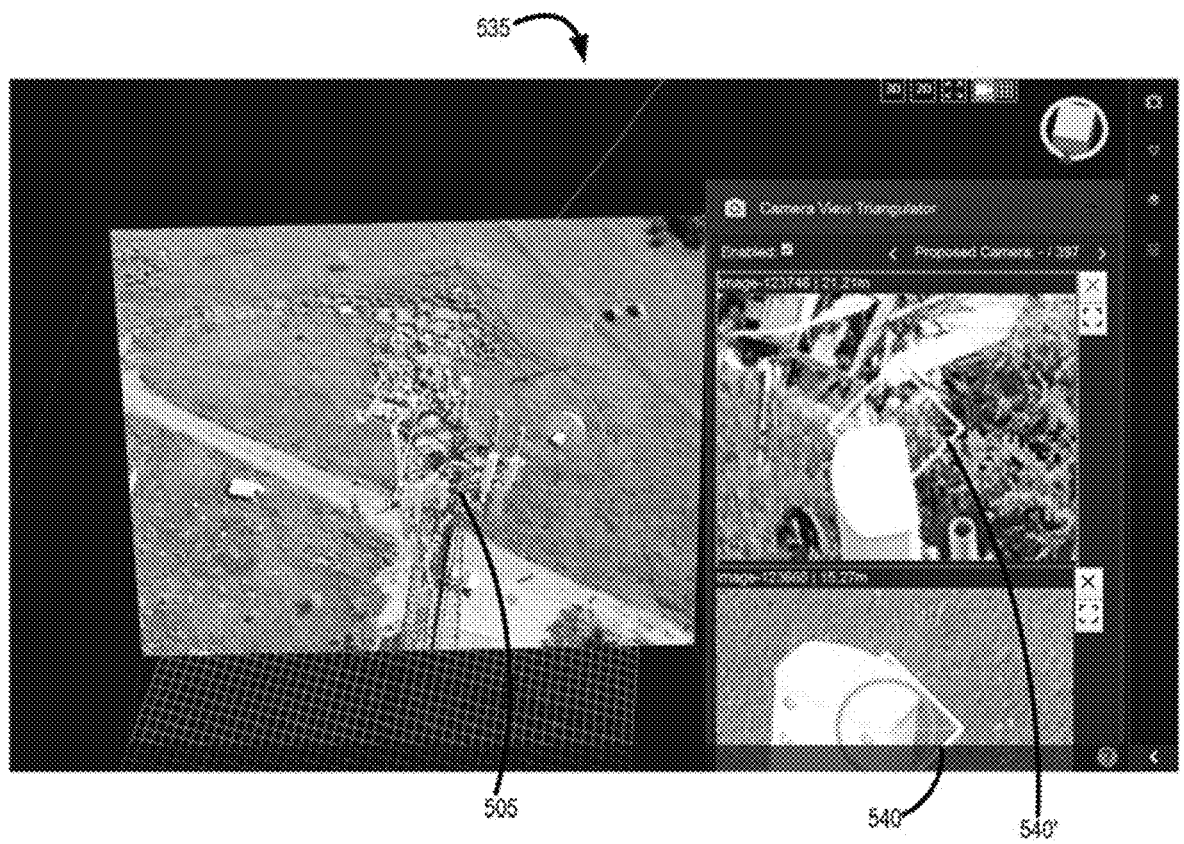
Figure 5E:
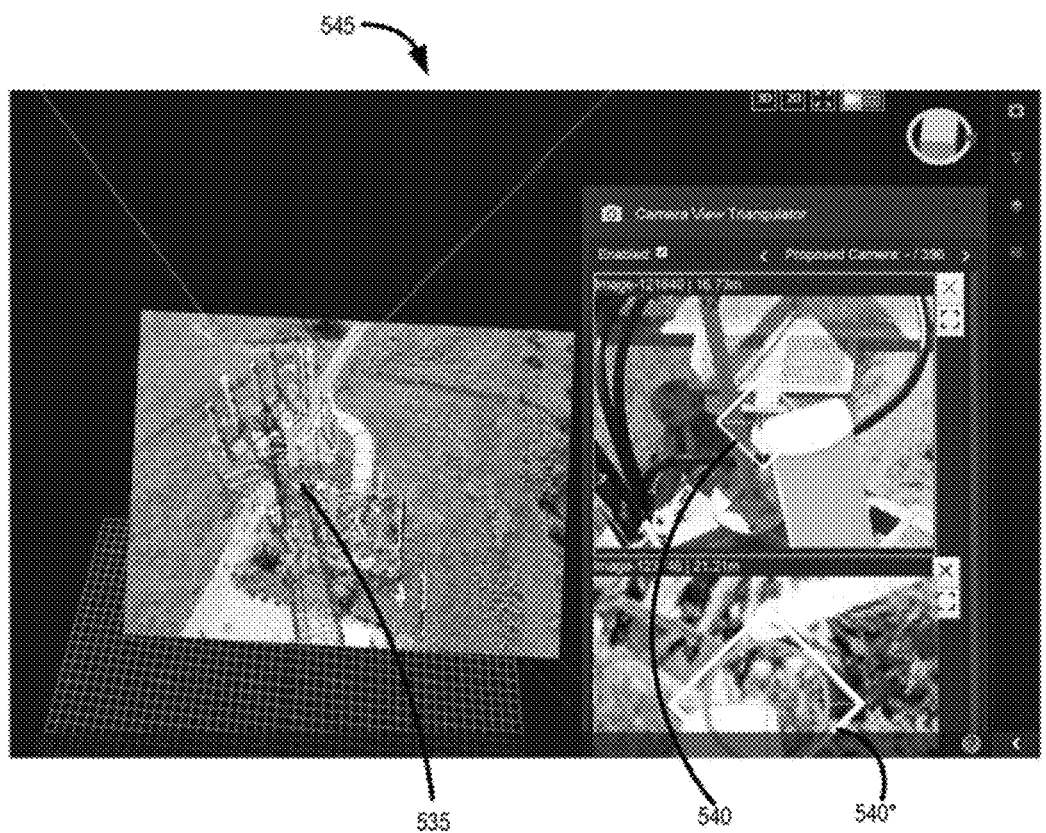

For example, and as shown in FIGS. 5A-5E, the user can select an area or location on the object, feature, scene, or location of interest as represented by the 3D rendering and query the system to provide one or more 2D images for the purpose of visual triangulation that can also provide information about the selected area or location. For example, in FIG. 5A, cell tower scene or location rendering 500 is shown having cell tower point cloud 505 and identified cell tower antenna 510. Cell tower location rendering 515 (FIG. 5B) shows 2D image overlay 520, and closeup of identified cell tower antenna 525 having the 2D image overlay. When the user selects one or more target points, such as cell tower antenna 510, the system can be configured to automatically recommend and provide for display a sorted list of 2D images that would result in the most accurate and confident visual triangulation outcome according to all previous user interaction with the recommended list of 2D imagery. In FIG. 5C, rendering 530 shows imagery 540 of cell tower antenna 510 that is selected to provide a further view of 510, where imagery of cell tower location 540 may have been processed to magnify, remove distortions etc. before presentation on 530. In FIGS. 5D and 5E, renderings 535 and 545 show triangulation of cell tower antenna location imagery 540 as image triangulations 540' and 540", each of which provide the user with differing vantage points of cell tower antenna location 510.

As can be inferred, the system interactively updates the content of the sorted list of recommended 2D imagery based on every user action vis-à-vis navigation and positioning of his scene camera relative to an object, feature, scene, or location of interest, here cell tower location 510. Image selection and sorting criteria includes, but is not limited to, angle of triangulation, angle of the image with respect to the surface normal vector, re-projection error, reconstruction accuracy of the image, and surface sample distance. Such 2D images are identified via searching of the 2D image set. Such implementation can allow a user to visualize, via his scene camera, a plurality of locations or areas that are associated with a single location or area selected by the user via triangulation of a single point in the relevant 3D space for the 3D rendering.

Figure 6:
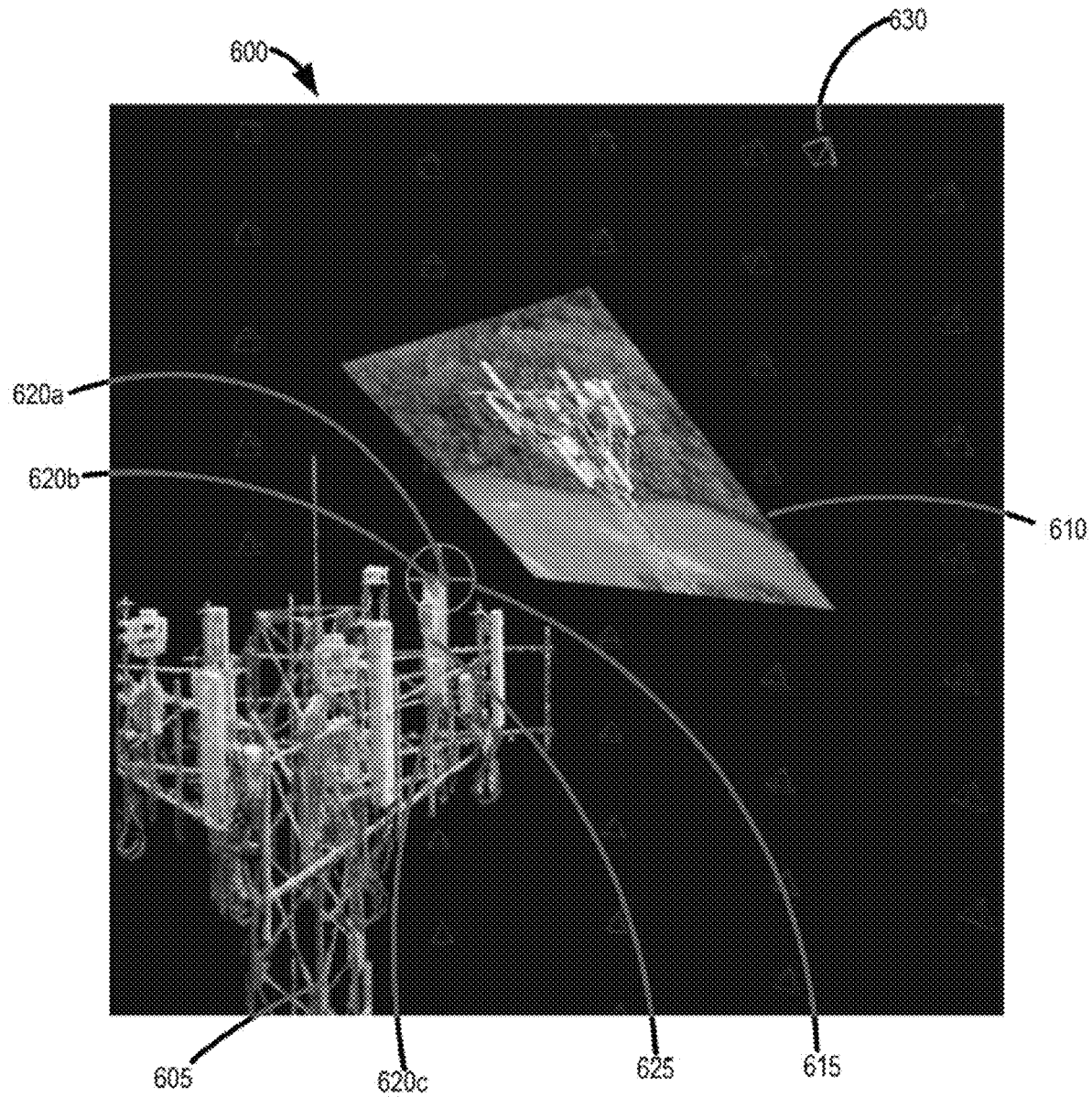

In general, this can be referred to as an "intelligent and interactive recommendation engine" which could recommend a sorted list of options from an at least one additional sensor dataset based on the user interaction history with a base sensor dataset such that the best outcome could be achieved for a user task event. The "best outcome" could refer to the solution with the maximum confidence, minimum error (in terms of distance, linear measurement, surface measurement, volume measurement, geo-localization, angle, orientation, direction, location, coordinates of 2D/3D point, line, polygon, or a volumetric shape), highest accuracy and recall in predictions, minimum number of user input data, minimum occlusion, or optimum geometry, topology, and semantics. In an implementation, at least some of the sensor locations and orientations from which the sensor data were generated during sensor data acquisition can be identified for the user. In this regard, information can be provided that incorporates location and orientation information for the sensor relative to the subject object, feature, scene, or location of interest, relative to the other information such as the ground, the sensor position relative to the ground when base viewport was generated, among other things. Such additional data can be included in libraries used during processes of the sensor data in subsequent processes. By way of example shown in FIG. 6, cell tower point cloud rendering 600 is shown with cell tower 605 and serves as the base viewport in this case. A 2D image 610 as an one or more dependent viewports is a representative image of user target location 615 is shown that is indicated by user selected corners 620a, 620b, and 620c. A sensor data overlay feature is shown as 625 over the antenna. A use case for this illustration can be when the user selected location 615 on point cloud rendering 600 as the base viewport in this scenario. The system can be configured to display 2D image 610 in the sensor location and orientation at which the image was captured in the first order. Such sensor locations and orientations, of which 630 is one of a plurality, can be shown in cell tower 3D rendering 600 by the cone-shaped elements above cell tower point cloud 605. As shown, each of these cone-shaped icons, such as 630, illustrates a location and a direction that at least one 2D image was taken in the scene in which the object, feature, scene, or location of interest—again, here a cell tower—is located. 2D image 610 illustrates a sample image taken of the real-life cell tower from which cell tower point cloud 605 was generated. Taking a single cone-shaped icon 630 as an example, the location and direction that 630 is pointing indicates the location and direction from which 2D image 610 was acquired, with icon 630 indicating the location and orientation of image 610 to the object, ground, scene, etc. taken at selected location 615. Center point of icon 630 indicates where the camera was located relative to cell tower 605 when the identified and concurrently displayed 2D image 610 as the one or more dependent viewports was acquired by the sensor positioned on a UAV. In the generic form, camera location and direction (shown as a cone) is another type of sensor data type that can be overlaid on top of other data types or shown in a separate window As shown in FIG. 6 in the form of a specific example, the camera locations associated with a selected location on user's display can be made visible to a user by selecting such visibility as an option in a user workflow operational with the display, however, as would be appreciated the information associated with such camera locations is present in, and therefore is derivable, from the image, camera, and other information. As can be observed from FIG. 6, a camera (or any other type of sensor device) location and direction at the time that the subject image (or other sensor dataset viewport type) is another type of sensor data type that can be overlaid on top of other data types or shown in a separate window.

In a further implementation, the methodology herein can be associated with a user's interest in generating contextual information for one or more locations on the object, feature, scene, or location of interest by allowing the user to navigate and position his scene camera, at least on a virtual level, between a base viewport, for example a 3D rendering of the object, feature, scene, or location of interest, and at least one or more additional viewports, for example specific 2D images of the selected area or location on the object, feature, scene, or location. The user can use his scene camera to navigate to a specific location or from a location to another location on his display, and one or more dependent viewports for each selected location can be concurrently displayed to the user in real time. The methodology herein therefore allows the relationships between the base viewport of a scene incorporating an object, feature, scene, or location of interest (in the form of point clouds, for example) and the one more additional viewports that are precisely or substantially aligned therewith to be assessed by the user in real-time as he moves through the base viewport with his scene camera.

In some implementations, the methodology herein comprises the user's selection of an area or location for review on the object, feature, scene, or location of interest, after which he navigates to the selected location with his scene camera. During such navigation, the methodology modifies the orientation, perspective, or viewpoint of the base viewport vis-à-vis the real time positioning of the scene camera. In other words, as the user navigates in and around the base viewport, the display of the object, feature, scene, or location is also modified to align or substantially align with the user's scene camera. Moreover, as the base viewport changes, the systems and methods also identify and concurrently display during such real time navigation and position of the scene camera one or more additional viewports associated with the real-time location of his scene camera along the navigation path. While visualizing a base viewport, such as a 3D rendering on his display, the user can zoom in to view a location of interest on the base viewport, and he will be automatically presented with a concurrent display of one or more dependent viewports, for example, one or more 2D high resolution images associated with the selected area or location of interest, can be displayed to the user via the processing methodology discussed herein. Close up review, as provided by the user's navigation and positioning with his scene camera, can allow relatively small issues to be visualized from vantage points that would be exceedingly hard to identify using prior art methodology.

Figure 7A:
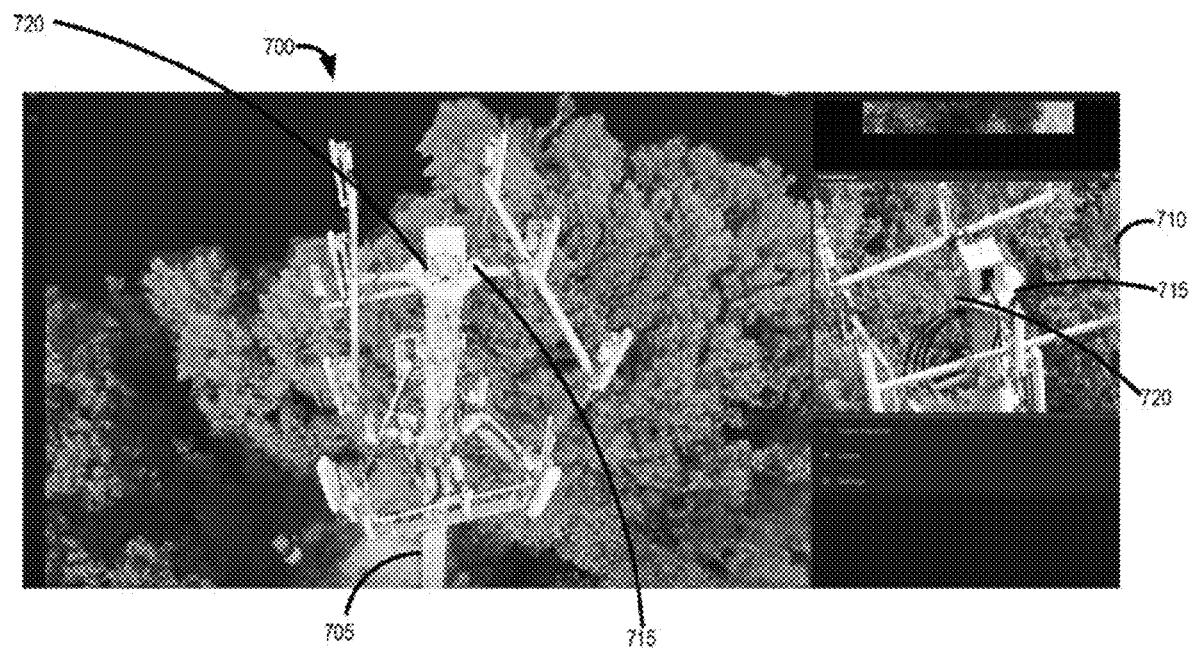
Figure 7B:
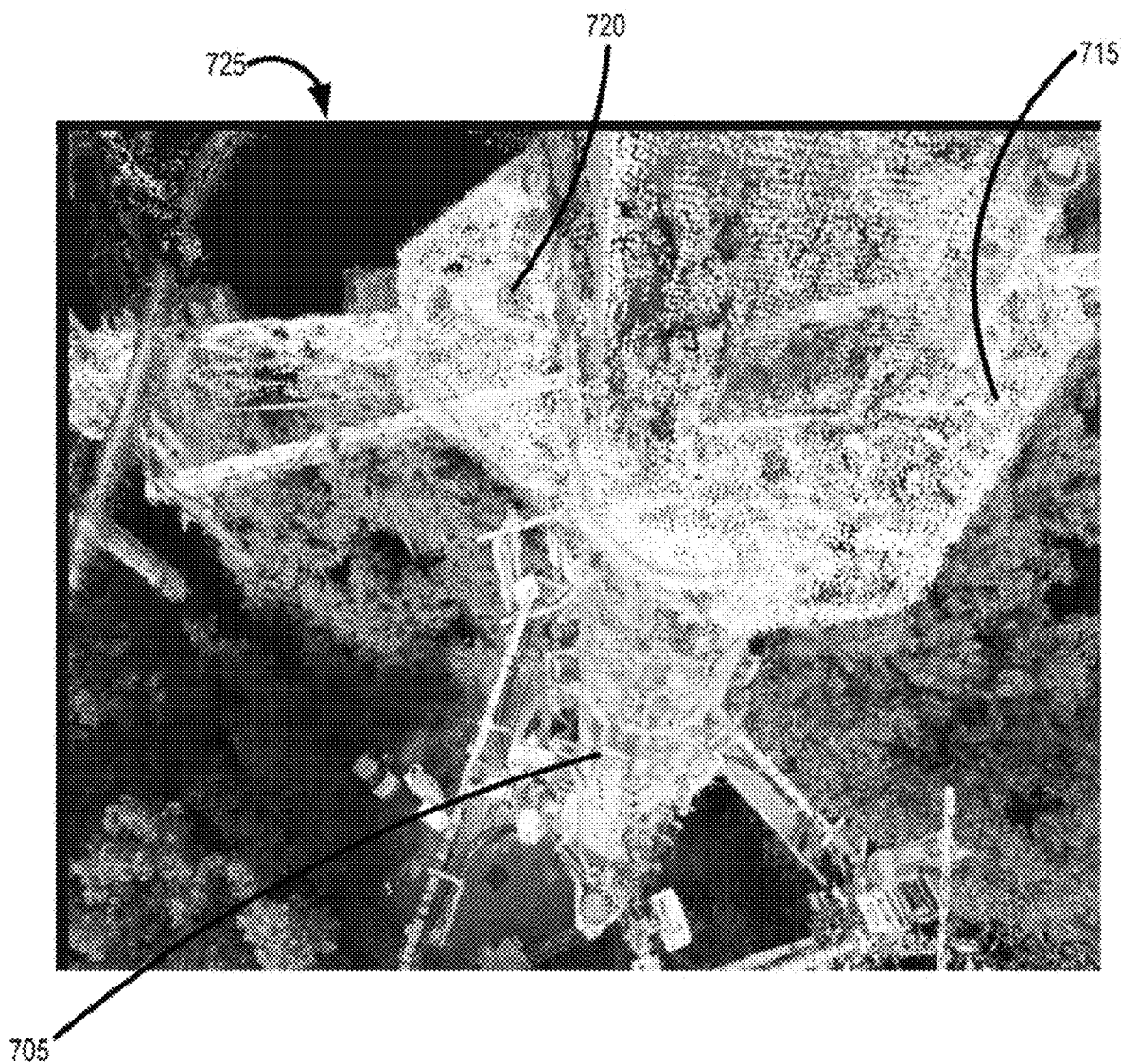

For example, referring to FIG. 7A, which is a display 700 of cell tower point cloud rendering 705 as the base viewport with a concurrently displayed 2D image 710 as the at least one further viewport, if the user was interested in visualizing whether cell tower platform area 715 with an indication of holes on area 720 therein was a result of missing bolts, for example, the point cloud itself would not allow such information to be derived therefrom, at least because the generated point cloud is too lossy to allow that level of detail to be visually derived. This is illustrated with FIG. 7B, where cell tower platform area 715 is shown with platform area 720 with point cloud rendering 725. Still further, the present methodology allows a user to zoom in on the area of interest on the point cloud as the base viewport and the associated 2D high resolution image as the one or more dependent viewports will be concurrently displayed in real-time or substantially in real-time along with the degree of detail needed for a user to visually observe the area of interest in suitable detail. Although not shown, as the user navigates his scene camera closer to platform area 720, one or more high resolution 2D images of that location will be identified and concurrently displayed to him in real-time. By comparing the level of information available from close up views of virtually any location on the object, feature, scene, or location of interest, it would be appreciated that one seeking to identify problems (e.g., condition, damage, etc.) in areas or parts thereof—here a cell tower—would find such 2D image detail available of value, especially when the 2D image is identified and displayed concurrently and in precise or substantially precise alignment with the selected 3D point cloud or location thereon.

In an implementation, after identification and prior to display to the user, at least some of the available sensor data that can be used to generate either or both of the base viewport and the one or more dependent viewports for concurrent display can automatically be evaluated to determine whether a post-processing step can be performed to improve or enhance any display of such sensor data to the user. In a non-limiting example, such post-processing to remove distortions, improve contrast/brightness, edge enhancement, etc. can facilitate the display of 2D images to the user that can allow details to be resolved for the object, feature, scene, or location that may not be visible in a viewport that is generated directly from the available sensor data, that is without the performance of a post-processing step prior to generation of the subject display of that sensor data.

Still further, the one or more additional viewports, such as 2D images identified and selected for concurrent display to the user along with a base viewport, such as a 3D rendering of the object, feature scene, or location of interest can be processed to remove any distortions or other issues that may exist as an artifact of the image acquisition process. More generally, any sensor data type can be post-processed according to the methodology herein prior to providing, generating, or rendering a viewport from that data. In this regard, each of the one or more dependent viewports can be automatically evaluated to determine whether processing could be performed so as to improve the resulting user display. As non-limiting examples, the sensor data from which the at least one viewport is obtained, provided, or rendered can be processed to remove or reduce the appearance of distortions, brightness, contrast, etc. If such images are found to include elements or artifacts that could reduce the quality of the display thereof, the sensor data can be processed to improve the display to the user. As a non-limiting example, any 2D images included in a library of images of the object, feature, scene, or location of interest can be automatically corrected, enhanced, etc., if needed, to remove the characteristics of distortion prior, as well as to increase brightness, contrast, etc., for concurrent display to the user in conjunction with the user's navigation through and around a 3D rendering of the object on his display. Such intuitive processing steps are discussed, at least in part, herein or would be well-known to one of ordinary skill in the art (e.g., distortion, contrast, brightness correction etc.)

With regard to 2D images as the one or more dependent viewports, while prior art methodologies can associate via concurrent display of at least some 2D images with a 3D rendering in what may be real-time or substantially in real-time, such processes can exhibit limitations in allowing rich and insightful information to be generated. In this regard, the removal of distortion from imagery can be significant when using fisheye lenses or omnidirectional cameras, for example. Such prior art methodologies do not automatically correct distortions that are present in the associated 2D images and, as such, cannot provide 2D images that are free of distortions that are typically present in some 2D image data. That is, while 2D images incorporating distortions can suitably be used to generate a point cloud of the object of interest—for example, at least some 3D information about the object of interest can be derived for use in the point cloud rendering—such images presented concurrently may nonetheless include distortions in one or more locations when they are included as part of a concurrent display. These distortions may be such that necessary visual detail to perform a user activity cannot be resolved from a displayed 2D image if the image is needed to provide the user with more detail about a location on the subject object as indicated by his scene camera positioning.

In a further implementation, the 3D scene orientation can be modified when the user navigates his scene camera from a first location to a second location, such as by a 180 degree rotation (or any other discrete set of potential options that could be pre-calculated based on the user activity category) around the subject object, feature, scene, or location. These options can be provided to the user according to scope of the task being performed through this viewport event. The user can select a first location as a focal point, with one or more 2D images being identified and displayed to him at such selection. Once the focal point is selected, the user can select or be automatically provided with either or both of two options: 1) the user is free to move and rotate the scene camera with respect to the focal point; or 2) the user can be restricted to rotation of his scene camera with respect to the focal point (i.e., camera movement is locked). The concept of focal point can be expanded or applied to a focal surface or a focal object. In these cases, the user can be permitted to only rotate the camera, to move the camera freely, or a combination of the two.

In a further broad construct, the present disclosure provides systems and methods for navigation by a user through a base viewport on a user's device display. In this regard, the methodology herein allows a user to navigate within and around a visualized scene display depicted in a base viewport generated, obtained, or rendered from sensor data. In a non-limiting example, the visualized scene display can comprise a plurality of 3D renderings of an object, features, scene, or locations of interest thereon. For example, an object of interest can be a commercial roof, and the plurality of features or components can be HVAC equipment and associated componentry, roof surface materials/membranes, parapet walls, etc. Yet further, the object of interest can be a cellular tower, and the plurality of features or components can be the various structural and functional features thereon, as well as any surrounding elements that might affect the operation of the cell tower for the intended use. Yet further, the object of interest can be a location or scene and the components or features can be infrastructure elements (power lines, roads, buildings etc.) present therein.

The methodology allows a user to virtually navigate around a base viewport and/or an one or more dependent viewports generated, provided, or rendered from sensor data acquired from a scene or location of interest to visualize, via his scene camera, the 3D geometry of the object, feature, scene, or location of interest and the features or componentry relevant thereto. During this navigation, the user can select a location or aspect of the scene, for example, an object, feature, scene, or location of interest, and an aligned 2D image or other displayed sensor data type of that selected object will be automatically selected for concurrent display to the user, optionally after first being subjected to a preprocessing step.

Figure 8:
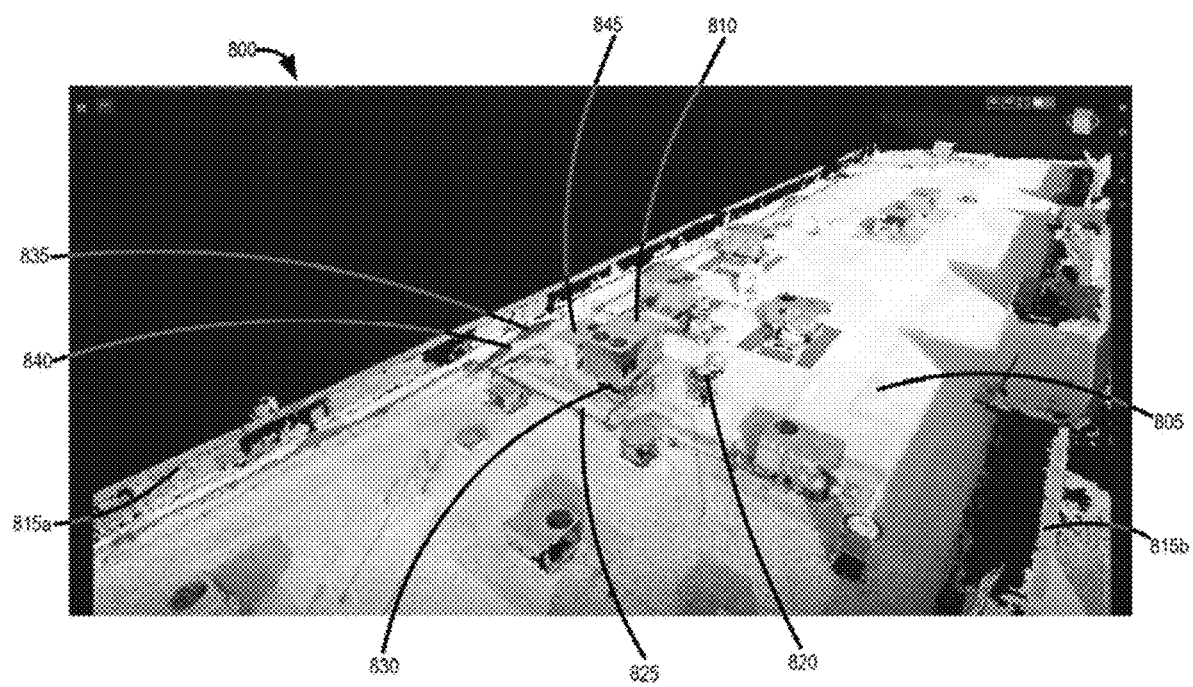

Referring to FIG. 8, a 3D scene rendering 800 of commercial roof 805 as the base viewport is pictured. As would be appreciated, the 3D scene rendering is a point cloud generated from 2D images from an image acquisition event where the images were captured by a UAV. A "virtual commercial roof scene" is thus pictured in 800.

In operation, a user can navigate around the rendered virtual roof scene 800 via his scene camera. As shown in FIG. 8, such navigation can provide visibility to the various features and components on the roof as shown in the base viewport, such as that of HVAC unit 810, vent 820, and conduit 825, as shown on commercial roof 805 that is the subject of the viewport event. Commercial roof parapet walls 815a and 815b are also shown. The base viewport, here virtual roof scene 800, can allow features that may be indicative of condition of interest for the roof to be identified, at least preliminarily. For example, some shadowing 830 that may be associated with roof damage on commercial roof 805 may be visualized.

Figure 9:
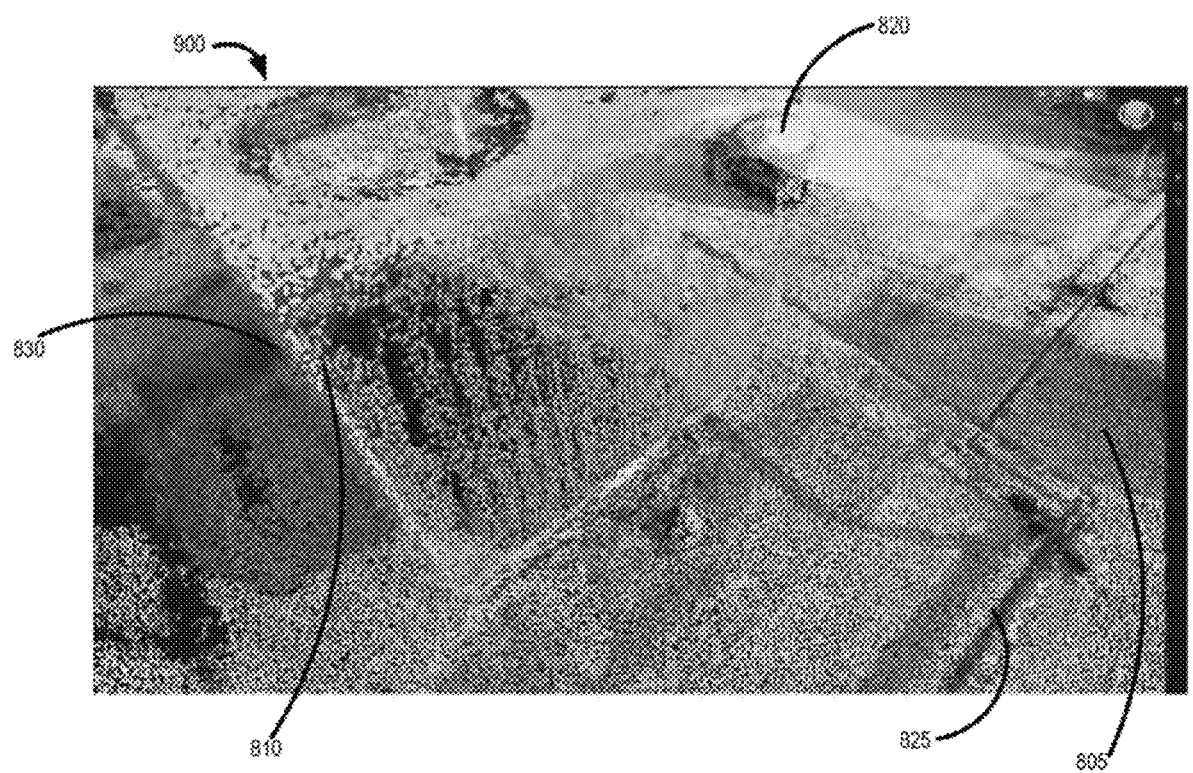

As indicated by FIG. 9, the user can navigate to HVAC 810 as shown on 3D rendering view 900. However, when viewed from a closer vantage point, HVAC 810, vent 820 and conduit 825 are not clearly visible from virtual roof scene 800, at least because scene rendering 800 are missing the necessary image/continuous data to allow viewport of the detail for these components or features on commercial roof 805. Moreover, as shown by the pixelated lines, 3D rendering is missing all detail for shadowing 830 that was visible in FIG. 8.

To generate suitable resolution to allow the user to view commercial roof 805 and any components or features therein at the level of detail needed to generate actionable insights about one or more selected areas, the methodology herein allows identification and concurrent display of the 2D image(s) associated with selected locations on commercial roof 805, with such images being processed to improve the match thereof vis-à-vis to the inferred user intent. This is illustrated, for example, in FIGS. 10A and 10B, which is a point cloud rendering 1000 of a commercial roof scene and an associated 2D image 1005 of the subject commercial roof. To this end, FIGS. 10A and 10B, HVAC 810, vent 820 and conduit 825 in close up 3D rendering form and in 2D images, respectively. As can be seen, FIGS. 10A and 10B, of 1000 and 1005 each present the subject commercial roof scene in the same orientation. Such same orientation is imparted to the imagery by processing the available imagery to rotate it to match the viewpoint in the 3D rendering as indicated by the scene camera positioning relative to the base 3D rendering so as to provide images that "best" match the inferred user intent. Put in the context of the navigation and positioning the scene camera within a scene incorporating an object, feature, scene, or location of interest, the user can perform an actual inspection of the subject roof scene by navigating via his scene camera through and around 3D roof scene rendering 1000, with one or more 2D images, such as 1005, for each location selected by the user being identified and displayed in real-time.

In accordance with the disclosed methodology, a simulated actual inspection of the object, feature, scene, or location of interest, and any components or features therein, can be generated from the user navigation that results from the concurrent display of acquired sensor data for the object, feature, scene, or location of interest as the base viewport and one or more additional viewports for concurrent display. In this regard, prior to generation of the concurrent display of each viewport, the sensor data is at least partially registered, if it is not already registered so as to allow the precise alignment of each type of data relative to a location or area of interest to the user in real time. The location or area of interest to the user can comprise the real time inferred user intent as derived from the navigation and positioning of his scene camera through and around base viewport that incorporates the object, feature, scene, or location of interest. In short, the user experiences a simulated in-person experience by providing viewport of the object, feature, scene, or location of interest as a close approximation of an in-person visit because the person navigating and positioning the scene camera is driving the viewport content so obtained. In other words, the user's intent as inferred from the navigation and positioning of his scene camera is defining the sensor data viewports displayed to him in real time.

In the context of 2D and 3D data, the user can obtain an experience that is akin to what a human would see in real life. Moreover, the user can visualize areas of an object, feature, or location of interest in a manner to provide an inspection etc. that may be more robust than possible in real life, at least some of the locations viewable using this methodology would be inaccessible in real life. Moreover, a user can obtain enhanced viewport of the object, feature, scene, or location of interest because a wide variety of sensor data in addition to image and processed image data can be viewed on his display.

As would be appreciated, the ability of a person to view previously acquired sensor data can provide a more enriched viewport process as the user task event having an information goal than can be generated by a real-time examination, such as in an inspection conducted via in-person viewport of a display including a scene and/or an object of interest. In this regard, the user can associate various aspects of the scene and object to derive information that may be hard to discern in a real-time inspection, be it by on-site inspection by a person or via remote viewport of a live video stream generated by a UAV. The system and methods can be configured to identify for the user areas or locations where he may wish to more closely inspect at a later time, such as by highlighting information about discolorations, unexpected patterns, etc. Thus, subsequent in person inspections of an object, feature, scene, or location of interest can be enhanced and improved by allowing the person or subsequent sensor data acquisition event to more closely focus on areas that may need attention in a larger area.

In a further implementation, instructions can be provided to direct a subsequent in-person inspections for the location of interest and any objects therein. For example, a person can be directed to acquire additional sensor data (e.g. capturing a close-up image of a deficiency with a mobile phone, along with any depth information (mobile UDAR), GPS, directional, rotational, or scale information provided by the device) at the location. This subsequently generated sensor data is can then be incorporated into the previously acquired sensor data for that location. Any deficiencies in the first data capture for the location can be identified for inclusion in subsequent capture plan instructions for similar locations.

As illustrated in FIGS. 8, 9, 10A, and 10B area 830 shown on various views for each respective 3D rendering as the base viewport for which suitable detail is not visible can be enhanced by concurrent display of an associated 2D image as the at least one further viewport for a location of interest on an object of interest, as shown for 2D image at 830. For example, in point cloud renderings 800, 900, and 1000 area 830 has a coloration that is different from the surrounding area, however, the reasons for the coloration are not readily discernible from any of these point cloud renderings. In contrast, area 830 as shown in 2D image 1005 provides detail that could be inferred to be leakage or another condition that may require maintenance on HVAC unit 810. Such detail can be observable from different vantage points, both from different angles/perspectives and distances, as the user continues to navigate around the 3D point cloud via navigation around HVAC unit 810 using his scene camera.

Figure 11A:
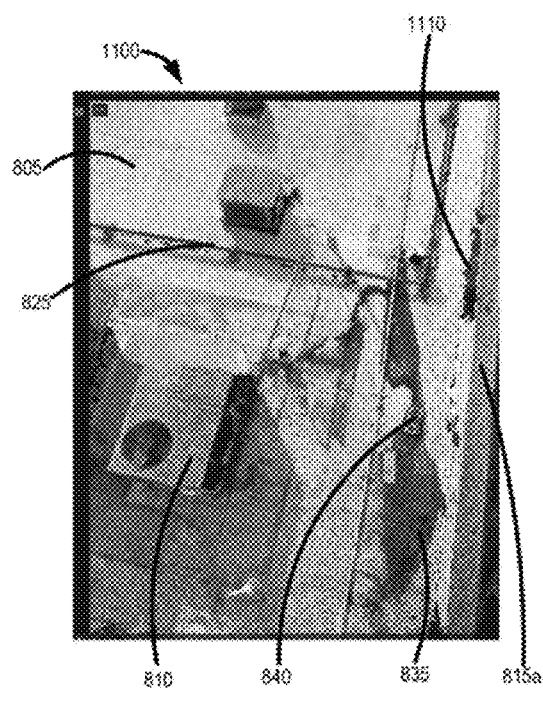
Figure 11B:
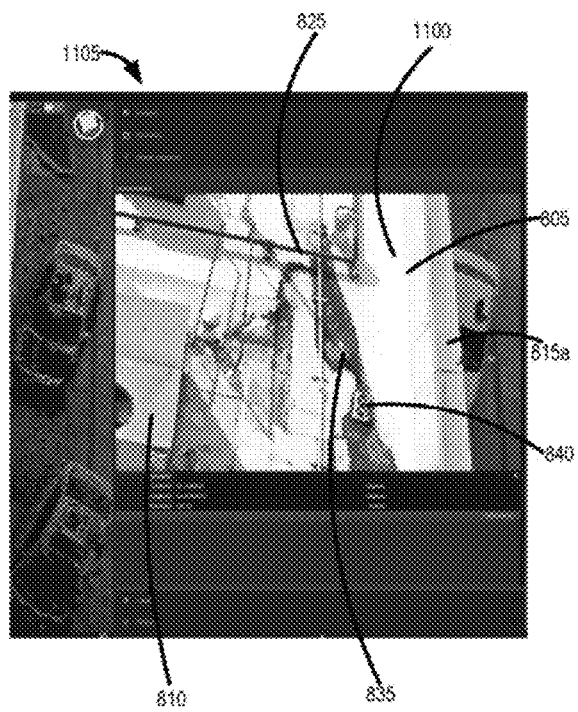

The ability to discern details, such as features of interest, that might not be visible from a 3D rendering alone is further illustrated in FIGS. 11A and 11B. Point cloud 1100 depicts an area on commercial roof 805 that includes HVAC unit 810, with conduit 825, area of (dis)coloration 1110 and drain 840. The identified and concurrently displayed 2D image 1105 of commercial roof 805 provides detail about components and features thereon that are not clearly depicted on 1100. For example, area of (dis)coloration 835 around drain 840 in point cloud rendering 1100 appears as a real area of (dis)coloration in 2D image 1105. It can then be inferred by the user that area of (dis)coloration 835 may be due to standing water that is currently present (or that was previously present) on commercial roof 805. Such standing water would be an area of concern for maintenance or repair, and such information can be provided to a user when the information goal for a user activity is an inspection and identification of areas of concern in a roof inspection. The identification of such an area of concern can be submitted in a report that is used to deliver an in-person inspection to the location with focus on the area. Such an identification can also be incorporated in a sensor data acquisition plan to better ensure that the area of concern is appropriately examined, such as by suitable image coverage in a subsequent data capture event, so that the area can be appropriately monitored over time.

The ability to discern details from the concurrent display of one or more 2D images with a 3D rendering of a scene of interest can be seen on point cloud rendering 1100 at area of (dis)coloration 1110 which appears as a black area alongside of parapet wall 815a. Such black area could indicate that there was a problem with that area of commercial roof 805, at least because of the difference in coloration at that location. However, as shown by 2D image 1105, area of (dis)coloration 1110 is absent when viewed in 2D image form. It follows that area of (dis)coloration was an artifact of missing data in point cloud rendering 1100. If a user made a determination that area of (dis)coloration 1110 was an area of concern on commercial roof 805, such a determination would have been wrong. To this end, if a roof repair was scheduled, that scheduled repair would have been unneeded. Instead, the Figures likely indicate that HVAC and plumbing repair is indicated on commercial roof 805.

As a further example of the ability to visualize areas, in FIGS. 12A and 12B 3D scene rendering 1200 is provided that shows a section of commercial roof 805, which is shown as a concurrently displayed 2D image 1205. Parapet wall front side 1210, backside 1215 (not shown), and top portion 1220 is elevated from roof 805. As indicated by the 3D point cloud rendering, it can be difficult to see features or components associated with parapet wall areas 1210, 1215 (not shown), and 1220 from the 3D rendering, especially at locations such as corner portion 1230. However, areas 1210, 1215 (not shown), 1220 and 1225 are visible in clearer detail in 2D image 1205. Moreover, while not shown, as the user navigates around 1230 via his scene camera, he will be able to observe detail about this area from the 2D image because an associated 2D image will be identified and concurrently displayed to the user. It can be said that this can allow the user to effectively "see around corners" by navigation of the scene camera around parapet wall portions 1210, 1215 (not shown), 1220, 1225, and at 1230 to an opposite side thereof. Parapet wall area 1225 is also more visible in 1205 than it is in 1200. Put another way, the user can virtually walk around the perimeter of commercial roof 805 via his scene camera as if he was physically present thereon. As he virtually "walks" around the roof, the concurrently displayed 2D images will be automatically identified and displayed to him in real time. The methodology herein therefore can simulate an actual roof inspection conducted by a person on-site. Areas of concern on the roof or relevant to features and components thereon can thus be viewed by a user remotely on his display as if he was present in real life. HVAC unit 1235, conduit 1240, and piping 1245 are also more clearly visible in 1205. Notably, piping 1245 can be seen as having a color indicative of rusting in both 1200 and 1205, but the coloration detail is much more noticeable in 2D image 1205. As would be appreciated, coloration such as that of 1245 would be indicative of a potential area of concern for commercial roof 805, and such potential area of concern is more visible in 1205. As noted previously, when the inferred user intent is to review the parapet wall, the user's navigation and positioning of the scene camera can be locked or restricted to this location, for example. It should be noted, that the ability to visualize a vertical element such as a wall relative to the other areas or elements one a roof is a significant element of inspection activities, and is not possible in prior art methods that purport to enable virtual inspections. Such 3D perspective would be an element of a human inspection in real life, and the ability to substantially replicate this functionality with the methodology herein is a notable improvement.

In a further broad construct, synchronization of 2D and 3D information for a scene incorporating an object allows identification of an optimum 2D image to be displayed for a perspective of the user at a specific time during the user's navigation through a 3D scene rendering. The identification of optimum 2D images (or other sensor data) can also enable the aligned images (or other sensor data) to be overlaid on the associated 3D rendering (or other sensor data) to provide a viewport overlay of a specific feature or component or the object of interest in the scene. In this regard, the methodology herein can allow the user to modify the geometry of a 3D rendering of an object by modifying the dimensions of a 2D image that is precisely aligned with that 3D object rendering, with the output thereof being a change in the size of the object rendering in 3D. As would be appreciated, being able to adjust objects, components, or features in the 3D scene and see them update in the most appropriate 2D image can provide notable benefits. For example, the appearance and fitting of new features or components on an existing object of interest can be evaluated in advance of making a selection of new equipment or starting aesthetic changes. Further, as discussed above, the system can be configured to restrict or prevent motion of the user's scene camera if a rotation or positioning of the scene camera vis-à-vis the object, feature, scene, or location of interest will not provide any relevant information associated therewith. In other words, the inferred user intent will define and drive the operation of not only the displayed viewports, but also the navigation and positioning of the user's scene camera in some implementations.

Figure 13A:
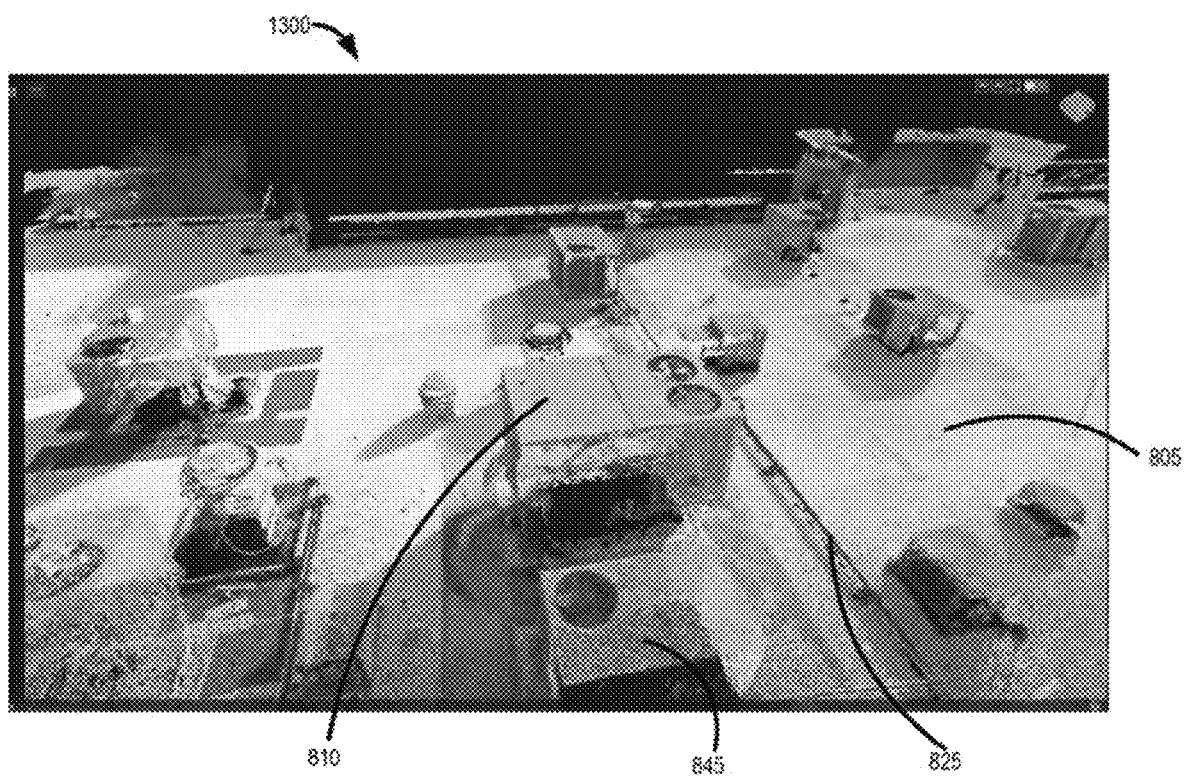

Once the 3D rendering is overlaid with an at least partially registered 2D image of the same object, feature, scene, or location, the user can modify the overlaid 2D/3D rendering to make it useful for user activities and information goals associated therewith. For example, as shown in FIG. 13A in point cloud rendering 1300, HVAC unit 810 is shown on commercial roof 805. When viewed from this angle, HVAC unit 810 is missing considerable detail in the point cloud rendering, perhaps because the positioning of adjacent HVAC unit 845 did not allow clear imaging of all of the sides of HVAC unit 810. As shown in FIG. 13B as to point cloud rendering 1305, the methodology herein allows an AR feature, such as a cuboid (shown in red) to be added to point cloud rendering of HVAC unit 810. Such cuboid can be provided from the general shape and size of an HVAC, even though an underlying point cloud of the HVAC may have included areas of missing data. The system can thus be configured to derive a suitable shape from a partially complete point cloud rendering for an object, feature, scene, or location of interest by processing of the incomplete sensor data along with the library of information. For example, a cylindrical or other relevant shape could be overlaid on exhaust fan 820, where the relevant shape is determined by processing of the subject point cloud information and/or 2D image information, for example 810 or 820. As shown in FIG. 13C for identified and concurrently displayed 2D image 1315, the added cuboid can be superimposed over HVAC unit 810 as it appears in 2D image 1315 to provide additional clarity to the 2D images.

Yet further, the cuboid (or other added AR feature derivable for the object, feature, scene, or location of interest) can be modified by the user. The user can thus change the size of the selected object, component, or feature of interest in either the 2D image or the 3D rendering. For example, HVAC unit 810 can be made taller by selecting and moving corner 1320 to a different location on the display, with the other components and features on each of the point cloud rendering and the concurrently displayed 2D images remaining consistent (i.e., with each changing in size). Other 2D and 3D features on the 2D and 3D sensor data can remain the same while the subject object, feature, scene, or location size is being modified.

To illustrate, the difference in height for HVAC unit 810 resulting from selection and movement of corner 1320 is shown at 1325. Such ability to modify the size and shape of objects, components, or features using AR functionalities can have the benefit of allowing a user to visualize the appearance or fitting of new equipment on the commercial roof 805, for example.

In further aspects, the methodology herein can be used to not only detect/identify the existence and type of a damage signal on an object, feature, scene, or location of interest but also to isolate the accurate boundaries of such actual or potential damage in the sensor data so its size/location could be measured with respect to a local/global coordinate system. The systems and methods herein can therefore be configured to allow a portion of a 3D scene rendering (or any other visualized sensor data type) to be highlighted on the user's display, such as by incorporating coloration or other type of marking via AR capabilities. This can allow an onsite inspector or repair contractor be able to find the exact location of a damage signal observable from the inspection information, thus reducing the time and effort needed to perform a repair on the object, feature, scene, or location of interest. Referring to FIGS. 14A and 14B, HVAC unit 810 on commercial roof 805 is selected by the user. The user's selection incorporated a coloration as marking for HVAC unit 810, with the highlighting serving to enhance visibility thereof during the user's navigation around commercial roof scene 1400 (FIG. 14A). In FIG. 14B, the system is configured to impart the same highlighting to HVAC unit 810 as it appears in identified and concurrently displayed 2D image 1405. Notably, such highlighting can facilitate the review of potential areas of concern on the object of interest, and any components or features thereon. To this end, the user can identify a potential area of concern, such as 1410 on scene rendering 1400 so as to facilitate review of the same area on an identified and concurrently displayed 2D image. An adjacent component or feature can be highlighted via AR functionality, here HVAC 810. The selection can also be configured to present other portions of HVAC unit 810 as the 2D images identified and concurrently displayed, as shown with 1415 and 1420 on FIG. 14B. This can provide the user with specific insights into an overall condition, as well as a source of the area of concern, in relation to other components or features on the subject commercial roof 805, as well as specific detail about selected components or features thereon. When the user activity comprises an inspection or condition assessment, for example, the availability of such information can provide actionable insights about the roof and features or components thereon from a review of generated sensor data remotely so as to improve the effectiveness and efficiency of such processes.

Yet further, while a 2D image that incorporates only a small portion of the subject objects, features, scene, or locations may have been used to generate the subject 3D rendering, the actual image may nonetheless not provide rich information to the user. Such partial image can thus not be displayed to the user as a "best" image from which to generate a report or the like. In other words, the set of 2D images associated with a 3D rendering of an objects, features, scene, or locations of interest can be selected by a user, the computer, or both for the overall content and quality that each of the subject 2D images will provide to the user when concurrently displayed with the subject 3D rendering. The methodology therefore comprises an identification of second image that incorporates more of the object, feature, scene, or location selected by the user, or alternatively, automatically selected by algorithms based on viewpoint, focus, and field of view where the second image is displayed to the user. In other words, a "best" image (or other sensor data viewport) can be synthetically generated from the available sensor data to as to provide the user with a rich viewport of the subject object, feature, scene, or location of interest. Yet further, available sensor data can be enhanced using machine learning libraries to fill in missing information that might be missing from the acquired sensor data in the first order.

In yet a further implementation, a report that incorporates information generated by the user during navigation through a scene incorporating an object of interest can be provided, as well as components and features thereof. This report can incorporate all or part of the information goal from the user activity. As a non-limiting example, a set of 2D images can be identified and selected for use in a report about an HVAC unit on a roof—or any other objects, features, scene, or locations of interest—where each of the 2D images provide a view of the unit that are relevant to the information incorporated in the report. Still further, a report can automatically be generated for the objects, features, scene, or locations of interest. A workflow that directs the user to select specific types and locations of 2D images displayed to him can also be used to populate a report associated with the objects, features, scene, or locations of interest. Put differently, the methodology herein has utility in not just providing output from the various viewport processes herein. Rather, the systems and methods herein can be configured to direct or enhance the user's navigation and positioning vis-à-vis the provided viewports to improve not only the available output, but also the content and quality of the information acquired during the user activity.

In a further implementation, the instructions associated with the report generation can be configured to allow automatic identification and selection of specific aspects of the objects, features, scene, or locations of interest. For example, the instructions can be configured to automatically identify and select for inclusion into the report the most complete top and all four side views of an object of interest.

Yet further, a virtual orbit around can be generated for the user on his display from a plurality of synthetic images. Generation of such a 360-degree view around an object of interest are known, such as in U.S. Pat. No. 10,659,686, the disclosure of which is incorporated herein in its entirety. The present disclosure can allow such a 360-degree view of an object of interest to be generated in part or in total from a plurality of synthetic images of the object of interest. In this regard, a 3D rendering of an object of an object of interest in the scene can be generated from acquired images data, wherein at least some of the image data from which the 3D object rendering is derived from the acquired image data such that an image from which the data is derived does not correspond to an actual image acquired in the imaging event. The present disclosure enables a user to select an object of interest in a scene or location in acquired image data for examination or investigation of one or more aspects thereof even though the acquired image set does not include an actual image that would correspond to the location of interest in the object. Moreover, relationships between objects of interest in a scene or location can be examined or investigated.

An implementation of the 360-degree view/virtual orbit aspect, a zoom distance and angle as seen by/presented to the user on his display can be recorded and displayed as a single thumbnail for each display. As the user moves his scene camera over the object of interest, the horizontal position of the scene camera determines the position in a 360-degree viewing/virtual orbit for display. As his scene camera hovers from left to right, an actual or synthetic image for that location can be displayed as he rotates around the object of interest that is the 3D rendering. When the scene camera is removed, the original image of the object of interest will be again displayed.

As would be appreciated, the ability of a user exact information of interest to him in the context of a real time examination or viewing of the previously acquired image data is a notable improvement over the prior art that only allowed a user to review the acquired image data for the information that was actually contained therein. In other words, a user reviewing acquired image data was effectively stuck with the image data as it was acquired. If he needed image data from a different vantage point vis a vis the one or more objects of interest, either or both of a second image acquisition event or an in-person visit to the location to acquire better/different image data would be needed. In some cases, the needed vantage point would not even be possible to acquire.

In further implementations, the user can be presented with a plurality of pre-determined views of an object of interest in a scene or location. The pre-determined views can be associated with the user task or activity. If the user task or activity is an inspection of a cellular tower, for example, the system can be configured to display a plurality of views for the cellular tower as relevant for the inspection, such as the various antennae, structure, surrounding location etc. The pre-determined views can be generated from actual image data or from synthetically generated views.

Yet further, the systems and methods herein simplify the workflow for accepting input data from a user via a common application-design pattern such as "wizards," "assistants" and/or "forms." As non-limiting examples, a wizard, assistant, or form interface can be used to accept input information from a user for the object, feature, scene, or location of interest such cell tower metrics (e.g., center of tower, top of steel, tallest appurtenance, bottom of steel, etc.) or building envelope health monitoring metrics (e.g., remaining life/serviceability expectancy, repair cost predictions, repair schedule, etc.). This can enable a user in a step-by-step process to input information in a prescribed order and in which subsequent steps may depend on information entered in previous ones. The process can be even more simplified by defining data viewport configurations that allow optimum user involvement and cognitive understanding from the scene at a specific step. For example, at the step for determining the center of the tower, the user can be presented with only a locked top-down view of the cell tower point cloud and be asked to pick the center point in the 2D display format; this reduces the complexity of the scene/data.

In yet a further implementation, a new data type can be generated, augmented, visualized, and saved in real-time while a user is interacting with the scene display. This includes, but not limited to, taking measurements from scene elements, defining the geometry of scene elements, defining topology or relationship among two or more scene elements, etc. A non-limiting example for such a scenario is measuring curb height under a HVAC unit on top of a commercial roof structure. A user can benefit from all viewport functionalities presented in this disclosure (e.g., concurrent display of two more raw/processed sensor data types, overlaying or superimposing sensor data types, data trimming and summarization, recommending best data points from a set of available data points for a specific task, workflow management via wizards and forms, etc.) to efficiently perform such a task. The user might select the 3D point cloud as the base viewport, trim the data via a rough/fine-tuned 3D volume representing a specific HVAC unit of interest, superimpose the trimmed point cloud view of the scene with relevant 2D RGB imagery, and use a wizard to simplify the process by for example displaying the data from certain viewpoints, determine two endpoints of a line representing the measurement of interest, and fine-tuning the endpoint coordinates via the intelligent visual triangulation process presented herein. The new data type (i.e., curb height measurement in this example) did not exist as a result of sensor data capture event(s) or any processing steps prior to the current viewport event. However, once the user creates such a data/information (manually or automatically), the systems and methods herein automatically generate a new data type category and save all relevant data accordingly for current and future display/use. It needs to be noted that each step for creating such a new data type (e.g., identifying the region of interest, identifying the optimum viewpoint, identifying the first rough endpoint, identifying the second rough endpoint, connecting the first and second rough endpoints, fine-tuning the first endpoint, fine-tuning the second endpoint) can be automatically propagated in real-time into all available sensor data types and their corresponding viewport. For example, once the first endpoint is identified, the point can be overlaid or superimposed onto the 3D point cloud, 2D RGB imagery, etc.

As indicated, at least some of the information associated with substantial completion of a user activity comprises 2D and/or 3D information derived, at least in part, from sensor data. In some implementations, such 2D and/or 3D sensor data can comprise image information. Such image information can be acquired during an imaging event associated with a generated data acquisition plan. Methods of acquiring images from a single passive image acquisition device and processing of such images to generate 3D information therefrom are described in U.S. Pat. No. 9,886,774, the disclosure of which is incorporated in its entirety by this reference. Yet further, 2D and 3D sensor data for an object of interest, here a physical asset of interest, can be generated from a variety of imaging devices using the processing methodology in U.S. Pat. No. 9,904,867, the disclosure of which is incorporated herein in its entirety by this reference. Methods to acquire images from which 2D and 3D image information include, for example, manned and unmanned aerial vehicles, manned and unmanned ground vehicles, and hand-held devices. A suitable methodology for automatic processing of the 2D and 3D images is described in detail in U.S. Pat. No. 9,904,867, previously incorporated by reference. To summarize that methodology, the approach is to connect object elements (e.g., features, parts, and contours) across views so as to form a unique and coherent model for an object category. Compact models of object categories are obtained by linking together diagnostic parts (i.e., canonical parts) of the objects from different viewing points. This linkage structure can be interpreted as a generalization scheme and will be based on linking the features from each pair of views, where those features are connected by a 2D translational relationship. The image feature location is denoted by X and appearance by Y following a Gaussian and multinomial distribution, respectively. Viewpoint parameters are also represented by T and S. Putting all the observable variables $\{X, Y, T, S\}$, latent/hidden variables $\{K, \pi\}$, and part parameters $\{\theta, \eta, \alpha\}$ together, the joint probability function of the model is $$P(X,Y,T,S,K,\pi)=P(T)\cdot P(\pi|\alpha_T)\cdot P(S)\cdot \Pi_n^N\{P(x_n|\hat{\theta},K_n,T,S,A)\cdot P(y_n|\eta,K_n,T,S,A)\cdot P(K_n|\pi)\}$$

It should be mentioned that computing the exact marginal distribution is intractable. Hence, the learning problem is formulated as an optimization problem and solved using a variational expectation maximization algorithm.

Machine learning-based object identification, segmentation, and/or labeling algorithms can be used to identify the 2D/3D boundaries, geometry, type and health of objects, components, and scene or locations of interest so that it can be replaced by an object representing a physical asset or elements thereof with corresponding semantic data from an existing 3D model library of a subject object, feature, scene, or location of interest, such as, for example, by providing recognition of components and identification of aspects on or associated with a physical asset. In this regard, Deep Convolutional Neural Networks (DCNNs) can be used to assigning a label to one or more portions of an image (e.g., bounding box, region enclosed by a contour, or a set of pixels creating a regular or irregular shape) that include a given object, feature, scene, or location of interest, a collection of the physical assets of interest, or components or features on or relevant to the asset(s). An object mask can also indicate which portions of the image include the asset(s). A directed graph can be used to build the neural networks. Each unit can be represented by a node labeled according to its output and the units are interconnected by directed edges. Once the multiple bounded views or enclosed free-shape regions and directed graphs are built, a model can be used to assign labels based on resemblance and statistics. Labeling can be completed as a product of an iterative process involving the object classification or segmentation using visual and spatial data features and 3D surface generation. The iterative process can be attributed to the fact that state-of-the-art deep learning architectures such as Convolutional Neural Networks, Recurrent Neural Networks, Autoencoders, Generative Adversarial Networks, and ResNets (i.e., Deep Residual Networks) which could be implemented using libraries for dataflow and differentiable programming such as TensorFlow only accept a bounding box in an image and hence are restricted in handling multiple bounded views. The inventive iterative process may run the model on each bounded view. The outcome can be validated and merged based on the semantic labels given to the objects (e.g., general or specific object identifications) and available templates in the database. As a result, the output can progress from an abstract definition of the objects, components, or features of interest to an output that provides a definition that more closely conforms to the asset(s) in real-life.

The methodology herein presents a novel 2D-3D artificial intelligence (AI) platform which can be used to not only detect/identify the existence and type of an object, component, or feature of interest but also highlight any potential damage/deficiency therein. Additionally, the platform is able to isolate the accurate boundaries of such actual or potential damage in the sensor data so its size and location could be measured with respect to a local/global coordinate system. This allows simultaneously extracting geometry, topology, and semantics for an object, component, or feature of interest or a collection of objects, components, or features of interest from the scene data. This AI platform achieves superior results compared to the state-of-the-art 2D or 3D machine learning systems in terms of: a) model training efficiency and convergence speed/accuracy; and b) prediction precision and recall. This is due to the combined use of 2D and 3D data for narrowing down the search space and cross-referencing any annotation, detection, segmentation, identification, and labeling in multiple overlapping sensor data types through optimizing a joint probability distribution function. Moreover, multiple machine learning models, each optimally trained for specific input data types (e.g., RGB imagery, thermal imagery, depth imagery, LiDAR point cloud, RGB point cloud, etc.) and specific range of parameters (e.g., view angle, distance, ground sample distance, surface sample distance, number of observations, quality/confidence of each observation, reprojection error, etc.), are used in parallel and/or sequentially to maximize the probability of a confident prediction both in terms of accuracy and recall. The architecture of such a system can be designed based on the application type and expected output data types. In some implementations, for example, and for the purpose of detecting a damaged lead jack on a commercial roof structure, it is determined that the most confident predictions could be achieved via training models and predicting on orthographic and/or nadir images rather than oblique imagery given the cylindrical shape of the object which would typically be oriented in a perpendicular direction to the roof surface. This is followed by a model that is trained on DEM (Digital Elevation Model) imagery and could predict any obstructions on a roof surface with a particular shape. The prediction can then be augmented via a model that predicts/calculates height of roof obstructions from oblique imagery. The combination of all these steps, each with a different goal but complementary to each other, would maximizes the probability of a confident detection, identification, segmentation, and modeling while also minimizing the probability of missing the intended object in the dataset.

The raw/processed data that is going to be used for training and consequently prediction can be categorized based on features and parameters that are calculated according to the content of the sensor data types and patterns that could automatically be detected in a pre-processing step. In some implementations, the AI training data could be partitioned into multiple groups according to parameters such as ground sample distance, surface sample distance, angle between an image plane and a 2D/3D surface of interest, angle between an image view direction and a 2D/3D surface of interest, Euclidean distance between a camera center and a 2D/3D surface/point of interest, percentage of occlusion in an image, material type, etc. In such a scenario, a separate AI prediction model can be trained for any combination of the aforementioned parameters. A pre-processing step, on an image or a set of overlapping images that require AI predictions, determines the best model among the existing models. For example, if the goal is to identify the location of open pipes on a commercial roof structure, the 2D-3D AI platform performs a pre-processing step on the available data (e.g., 2D imagery, 3D point cloud, 3D wireframe, etc.) to determine a combination of parameters that has the maximum probability of achieving 100% accuracy and recall. This combination could be a certain range for surface sample distance, view angle, and camera distance. A proper AI model is selected accordingly, and predictions are provided to the user. Partitioning process of the training and prediction data through pre- and post-processing steps presented herein minimizes noise and randomness in the data, ensures well-defined boundaries for the search space, minimizes the probability of converging into a suboptimal solution, etc. which in turn will lead to faster convergence in the training process and better accuracy and higher recall in the prediction process.

In yet another implementation, data partitioning process can be preceded, run in parallel, or followed by a coarse-to-fine training and/or prediction step. The primary goal can be to hierarchize the information that is visually analyzed. On one side, the coarse information is perceived in terms of shapes and colors. On the other hand, detailed information perceived via several stages of convolution and max-pooling in order to obtain fine-level information such as coordinates of shape corners in 2D and/or 3D with certain accuracy (e.g., sub-pixel level accuracy in 2D or mm-level accuracy in 3D coordinates), 2D/3D line equations, 2D/3D plane equations, 2D/3D connectivity among shapes/objects, elevation difference among shapes/objects, etc. As an illustrative example, the existence of a roof corner in a 3D point cloud could be determined via a coarse prediction step. Once a rough neighborhood containing a roof corner is identified, multiple overlapping images, which include the identified region, can be extracted from the existing set of 2D imagery and cropped according to the region of interest. The exact pixel coordinates of the roof corner as well as the roof corner type in those images are then detected via a fine-level prediction/tuning step. Such predictions are then combined, verified, and triangulated into the 3D space resulting in a 3D roof corner with mm-level accuracy.

Yet further, a principal component analysis step could be introduced in the training and prediction steps. This statistical process uses a transformation to convert a set of possibly correlated observations into a set of uncorrelated values. This can be utilized to determine a canonical representation (e.g., orientation) for the given dataset (e.g., a 2D image, a set of overlapping 2D imagery, a 3D point cloud, a set of bounding boxes identified in 2D/3D, etc.). The dataset can then be transformed into its canonical representation followed by training or prediction. Predictions can then be transformed into the original space while adjusting the confidence accordingly.

In yet a further implementation, the 2D-3D AI platform could automatically conclude that 2D images or 3D point cloud views from certain viewpoints construct the optimum dataset for training and prediction. Accordingly, the platform pre-processes the dataset to ensure compliance with such a requirement. If such a requirement cannot be satisfied during the pre-processing step, the platform could generate new virtual data (e.g., virtual images from previously unseen viewpoints, synthetic imagery, orthographic snapshots of a point cloud, etc.) using the existing data such that the requirements are met. As an illustrative example, the platform could automatically determine that training and prediction using orthographic images demonstrate superior accuracy and recall compared to perspective images for certain object types. For example, in automatically detecting ground control points/visual targets in images captured using a UAV system from a construction site, it is concluded that these objects could be detected with higher accuracy and recall in orthographically projected images rather than the original drone imagery which are based on perspective projection. Therefore, the platform calculates a transformation for each image according to its extrinsic and intrinsic camera parameters that would convert an image from a perspective projection into an orthographic projection. As can be appreciated, this transform undoes the impact of perspective projection that distorts a rectangle into a parallelogram which its geometry is dependent on the camera's angle of view towards the target rectangular surface. Such a process eliminates a variable that is difficult to manage during the UAV flight and hence results in a more stable and manageable dataset for training and prediction. In this example, the orthographic projection could be based on the gravity vector, normal vector to a 2D/3D surface, normal vector to the image plane, or any other direction that is identified by the platform or manually set by a user. It should be noted that the utility of the presently disclosed methods and systems is expansive, and the provided examples are meant to be illustrative in purpose.

Yet further, the 2D-3D AI platform could automatically conclude, or directed via user inputs, to generate a new sensor data type based on the existing raw/processed sensor data types. Such a new processed dataset is generated if it is determined that the probability of higher accuracy and recalls would increase by providing access to this new type of dataset. For example, a 3D point cloud, a 3D mesh, and/or a 2D orthomosaic image could be directly generated from a set of 2D overlapping RGB imagery. Different complementary AI training and prediction models could be created accordingly which could support/reject predictions made by other models in a recursive, sequential, or in parallel manner. The cross-referencing nature of such a strategy would maximize the probability of a successful training and prediction process. In a more complex illustrative example, the set of 2D overlapping RGB imagery and their corresponding 3D point cloud could be used together to generate an RGBD dataset. This new dataset is generated via adding a new depth channel to the existing RGB image set. Having access to the RGBD dataset would allow the platform to benefit from existing state-of-the-art machine learning and prediction in the 2.5D or depth imagery domain, such as would relevant to the 360-degree view/virtual orbit implantation discussed above.

Moreover, while the systems and methods herein are directed toward improvements in display and navigation through and around 2D and/or 3D information displayed to the user, the methodology herein can also be used in the training of machine learning models. For example, user selection and action with respect to a scene including one or more objects, components, or features of interest can be incorporated into machine learning systems to improve subsequent processes. Such user behavior can be used to improve subsequent 2D and 3D information displays to users. Further, such user behavior can be used to improve acquisition plans for sensor data. Still further, such user behavior can be used to generate user workflows associated with each user activity and to generate reports thereof associated with user information goals.

In accordance with the inspection context of the present disclosure, one or more features or components of objects, components, scene, or locations of interest can be substantially automatically recognized from the acquired sensor data. In this regard, the systems and methods of the present disclosure can automatically extract and identify componentry present in the images and provide geometrical, topological, and semantic identification thereto. In some aspects, such recognized features can be those that are pertinent to damage, maintenance, and/or the functionality of a physical asset of interest. In implementations, the system can be configured to automatically determine relationships between and among a plurality of objects that are visible in acquired image data. Still further, the system can be configured to determine conditions associated with visual differences image data. For example, a difference in coloration (e.g., shading, shadowing) on a surface can be detected from image data to generate information about a condition relevant to an object of interest. In this regard, a difference in coloration in a location having an object having an identification can allow automatic detection of a condition of interest, for example water ponding (condition) near a roof drain (object).

Referring the evaluation of existing database information to enhance the systems and methods herein, upon identification of the user information goal associated with the objects, components, or features of interest, existing database information associated with the user activity and/or user information goal can be queried to determine whether information pertinent to implementation or completion thereof already exists. Such existing information can comprise 2D and/or 3D information derived from sensor data in a previous user activity, or such data can be included in separate database information. For example, a database incorporating information about the identity, condition, etc. for the objects, components, or features of interest can be queried to provide at least some of the information needed to perform the user activity and/or the user information goal. If existing 2D and/or 3D information pertinent to completing the user activity and/or user information goal is identified as retrievable for use, that available information can be utilized to provide all or part of the information needed. For example, a user may have a user activity of identifying the number of cell towers in a location. If existing image libraries incorporate 2D and/or 3D data that can be evaluated to automatically extract such information—which would be derived, at least in part, as 2D and/or 3D information—the user activity can be facilitated with such information and the information goal can be enhanced with such information, such as by generating a report that is pre-populated with existing information.

Existing database information may be useful in generating and enriching the notifications or reports provided to the user about the information goal, as well as to inform and enrich the user activity as the user navigates and positions his scene camera around his display. Such available existing database information can be used herein to provide context, richness, and improved accuracy in relation to the information generated from the systems and methods of the disclosure, as is set out in one or more examples. Existing database information can also be incorporated to seed and inform machine learning models that can be deployed to provide information relevant to completing a user activity and associated user information goals, such as whether the user activity and/or user information goals can be achieved in context.

As a further example, historical performance information indicating that a type of mechanical equipment often present on a commercial roof is often subject to failure can be incorporated in a machine learning library that is used to enhance the user navigation around and evaluation of objects, components, and features of interest, such as by populating a directed user workflow and/or highlighting, annotating or otherwise marking objects, features scene, or locations. An area or location on a commercial roof that is subject to problems, such as in or near a drain, can be automatically highlighted using AR functionality to better ensure that the user evaluates that area in an inspection, for example. Still further, an HVAC unit that is under a maintenance plan can be highlighted for user viewport. The existing database information relevant to the known presence of objects, components, or features on the roof can enrich and inform user activity during navigation and viewport of displayed 2D and/or 3D information during a user activity and, as such, can further enhance the content and quality of information provided associated therewith Damage detection, condition assessment, functionality assessment, identification, labeling, measurement, orientation, and classification can be relevant elements in inspection for health monitoring/assessment of an object, feature, scene, or location of interest. The present disclosure can enable user detection of information relevant to these and other possible failure points in objects, components, or features early enough to prevent extensive damage from occurring. Moreover, the methodology herein can result in improvements over time by generation of training data associated with various conditions or damage categories or types.

In a further implementation, generated training data can be applied to assist users in the identification of actual or potential damage or other characteristics of interest in objects, components, and scene or locations of interest over time. Such damage detection can be used, for example, to measure differences in acquired 2D and/or 3D sensor data for objects, components, and scene or locations of interest that have been taken at different times. At a first user activity for objects, components, and scene or locations of interest information can be stored in a database. At a second, or subsequent, user activity, the generated information can be compared, by the user, the computer, or both, to identify differences in the objects, components, and scene or locations of interest over time.

In further implementations, the systems and methods herein can provide information about one or more of the existing, current, or future conditions or states of an objects, components, or features of interest. Such information can be derived from actual sensor data acquired in a sensor data acquisition event and/or the information can be derived from the acquired sensor data, such in the form of synthetic images. In this regard, a report can be generated that includes information about a portion of an object of interest that was not included in an image, such as when an occlusion is present in the acquired images associated with that object. A synthetic image of that occluded location can be generated so that a complete image of the object of interest can be generated in a report.

Existing, current, or future condition states can comprise the identified user information goal. As would be appreciated, generation of knowledge about one or more objects of interest in a location or scene of interest are relevant to a digital twin implementation. In this regard, the condition or state of an object, feature, scene, or location of interest can be provided in the form or context of one or a combination of the following categories: inventory management, inspection, health monitoring, assessment, geometry reports, damage assessment and progression over time, deficiency identification, technical performance (e.g., coverage area by antenna or load bearing capacity of a building), serviceability, progress monitoring, as-built vs. as-designed discrepancies, engineering drawings or specifications, Building Information Modeling (BIM), preventive maintenance reports, repair cost estimation, life-cycle modeling or reports, Geographical Information System (GIS) reports, 2D/3D/4D/5D viewport, emergency/disaster simulations, emergency/disaster response guidelines, geometry/topology/semantics modeling, etc. A user can directly request one or a combination of information associated with these conditions or states by providing an information goal for processing according to the disclosure herein.

Yet further, the present disclosure can be used to determine change in objects, components, or features or location proximate thereto over time. The condition of objects, components, or features or a location can change over time. For example, a commercial roof structure and/or any mechanical or other equipment present thereon, can undergo changes (e.g., deterioration, aging, water ponding, etc.) over time. To monitor such changes, the object of interest—here a commercial roof and/or the components or equipment thereon can be imaged in a time series to updating of its condition profile to identify the changes as a function of time. Such time series can be displayed to the user on his display, or the time series can be automatically reviewed.

A notable implementation of the present disclosure is a configuration that display sensor data acquired at different times on the same display. In this regard, a 3D rendering of one or more objects of interest in a scene or location can be generated from collections of sensor data generated in or derived from sensor data acquisition events. This can allow a user to view different aspects of an object of interest that were taken at different times. As an example of this use case, an antenna on a cellular lower can be maintained as a constant image, but the images of the cables taken at different times can be viewed in sequence. This can allow a user to "roll back the clock" to see how the cable positioning changed over time. This can allow one to pinpoint when and under what circumstances the cables changed position. This can allow design engineers to obtain real life performance data that can enhance further cellular tower designs, as well as improving installation, maintenance, and repair activities.

In another example, the objects on a commercial roof can be maintained as static 3D displays, and the roof surface can be changed to obtain information about how long water may have been ponding around a drain on the roof. The methodology herein can thus generate "4D" health monitoring system that can provide decision makers with visibility to the commercial roof structure condition at discrete times. From a preventive maintenance perspective, this also provides owners, managers, and service providers with data that could be used to determine the optimum time to take preventive actions or repairs in order to maximize the life and service condition of the physical asset to reduce or even prevent failures thereof that can affect the condition or performance of the asset over time.

Still further, data acquisition, such as periodic image acquisition by aerial vehicles can generate sensor data in the form of images at different times of the year. Due to the orientation of the sun relative to the objects, components, or features of interest, snow cover, tree cover etc., such periodic image acquisition can reduce the quality of sensor data that is generated from individual data acquisition events. In implementations, the systems and methods herein can comprise sensor data acquired in a plurality of data acquisition events, wherein the sensor data acquired over time can be collected to provide a single set of data for the asset(s) of interest, for example, a 2D and/or 3D reconstruction, measurements, counts, topography etc.

If the user visually reviews 2D or/or 3D information over time, he can be presented with each of the information for the respective time periods. When the change over time is automatically evaluated for the object, components, or features of interest, two change detection methodologies can be used: 2D change detection between image sensor data and 3D change detection between point clouds. Image processing techniques as discussed elsewhere herein that suitably compare two or a set of images together and highlight the differences and/or track the severity and size change over time can be used. Since these acquired images are geo-registered during a data acquisition event for an object, component, of feature of interest, corresponding pixels in every image acquired in a subsequent image acquisition event will represent the same spatial point in real life. As a result, automatic change detection for the object(s) etc. of interest can be provided while accounting for illumination and noise changes between images taken at different times; this can accurately report differences in the objects, components, or features of interest or the locations proximate thereto over time. Information is also provided for geometrical, topological, and semantic information relevant over a period of time. The data acquisition events can be taken 3, 6, 12 months or more apart or at any other time intervals of interest. Alternatively, a subsequent data acquisition event can be taken after storm or heavy winds or an event or disaster, such as a hurricane, earthquake, fire, or the like, to assess damage via the methodology described herein.

Identifying and segmenting visual signs of damage derivable from the acquired sensor data can be well-suited for use with a machine learning engine that incorporates relevant information about damage pertinent to objects, components, or features of interest. As would be recognized, the training model can be actively updated and fine-tuned in its prediction parameters according to new data generated from acquired image data, as well as from information of technicians or other persons who observe and collect information at an object, feature, scene, or location of interest. Geometric clues such as deviation from a flat surface model could also augment the ML-based prediction for signs like sagging (e.g., on the metal structure, in a guyed wire or elsewhere) or bubbling (e.g., from paint failure, etc.).

In further implementations, the system can be configured to identify condition states for one or more objects of interest at a location at a plurality of times, for example at a first time or a second time. This can allow expected condition states to be managed or unexpected condition states to be detected and the reasons therefore to be inferred or identified. For example, the roof of an oil storage tank floats on top of the liquid contained within the tank. Captured imagery of the oil tank taken at different times would indicate that the roof is moving up and down as a function of the amount of oil in the tank. The condition state (e.g., full, or less full) for the oil tank at different times can be determined. If an expected depletion of the amount of oil is different from the actual depletion measured from the level of the oil tank roof, an analysis of the reasons for such deviation from the expected value can be conducted.

As noted, the methodology can be useful herein for digital twin processes, such as that disclosed in US Patent Publication No. 2019/0138970, the disclosure of which is incorporated herein in its entirety. In such applications, an ongoing collection of information for objects or elements of interest can enable a continual aggregation of useful information and insights about the operation thereof. Relationships between objects and elements of interest at the same location or among different locations can also be generated. Because the digital twin processes can include semantic information about not only the objects or elements of interest but for collections of objects or elements of interest and the operations within and among them useful information and insights can be generated therefrom. The context enabled when the methodology herein is configured with digital twin processes such as that in the '970 Publication allows modeling of information and the generation of operational and condition information that are forward looking. Moreover, the generation of such information can allow continual knowledge generation for an object or elements of interest and collections or aggregations thereof.

Figure 15:
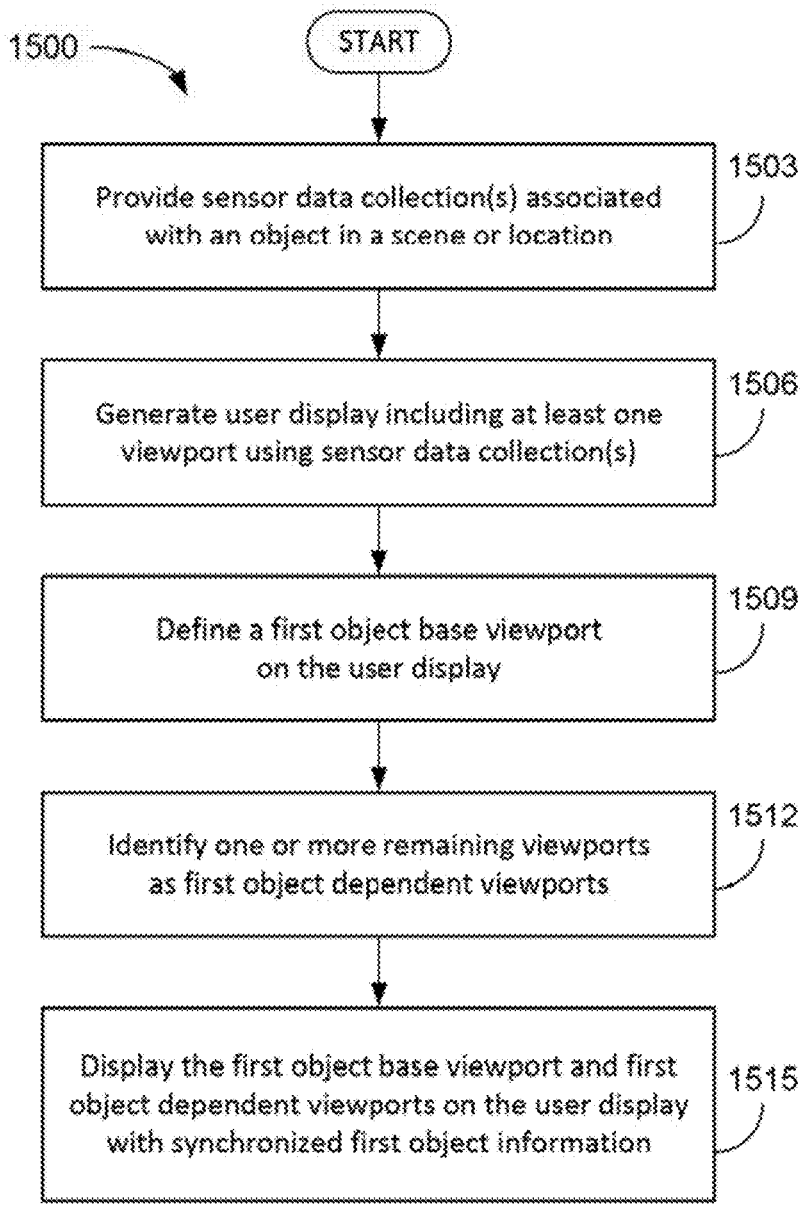
FIG. 15 illustrates an example of a process for visualization on a user's display of acquired sensor data for objects, components, or features of interest in a scene, in accordance with various aspects of the present disclosure.

When used in digital twin processes, the methodology herein can provide information and insights into the condition of facilities, machinery, infrastructure elements, etc. by providing a virtual representation of the object of interest upon which simulations can be conducted. Such processes can, for example, allow the prediction of whether maintenance or repair activities can be delayed or whether, and to what extent, such activities need to be conducted currently and/or at a one or more times in the future. In an example relating to the commercial roof illustrated previously, an appearance of a pool of water on the roof can be modeled using a digital twin of that roof to determine the effect of a coming storm—or more broadly, the predicted rainfall for the location for the upcoming year—to generate a plan for conducting maintenance or repair activities associated with the roof. When a plan is generated, the processes can operate automatically in the background to monitor the plan in relation to the amount of rainfall that was predicted and that which was used to generate the maintenance plan versus the actual amount of rainfall. Moreover, from time to time, additional imagery of the roof can be generated and processed according to the methodology herein to provide updated roof condition information related to the water pooling, for example. The maintenance or repair plan can be updated or modified for that roof. Other maintenance and repair plans for other roofs at other locations can also be automatically updated. As would be appreciated, the use of the sensor data generation and analysis methodology herein, and any information obtainable therefrom in display, report, dashboard for, as well as that which can be deployed in machine learning and digital twin processes can provide benefits such as:

- Reducing costly emergency repairs by detecting problems early
- Generating pro-active maintenance plans
- Reducing routine, but un-need preventive maintenance
- Improving operational availability
- Increasing employee safety and reduce injuries resulting from dangerous inspection and repair activities
- Reducing costs by implementing parts inventories based on real data need assessments based on failure rates, logistical constraints, and downtime and consequence costs cost reduction
- Improve employee productivity
- Reducing total cost of ownership
- Enhancing deployment of knowledge throughout an organization
- Delivering continuous improvements in an organization and among connected organizations Referring next to FIG. 15, shown is an example of a process or method 1500 that can be used for visualization on a user's display of acquired sensor data for objects, components, or features of interest in a scene. Beginning at 1503, one or more sensor data collection associated with an object in a scene or location can be provided by a computer or other computing device. The sensor data collection can be generated from one or more sensor data acquisition event(s). The sensor data collection(s) can comprise synchronized sensor data including one or more sensor data types. The sensor data collection can be generated by transforming the sensor data in the sensor data collection into a single coordinate system or by calculating or determining one or more transformations for the sensor data that enable representation of the sensor data in a single coordinate system.

Next at 1506, a user display including at least one viewport can be generated using the sensor data collection(s). For example, a view of the object can be rendered in the viewport by processing the sensor data collection. The viewports in the user display can be configured to display object information associated with the object, which can be derived using synchronized sensor data based on the sensor data collection. On of the viewports can be defined as a first object base viewport at 1509 and one or more of the remaining viewports can be identified as first object dependent viewports comprising first object information at 512.

The first object base viewport and the first object dependent viewports can then be displayed on the user display at 515. The displayed first object information in the first object dependent viewports substantially corresponds to a real-time positioning and orientation of a scene camera in the first object base viewport. By navigating the scene camera in the first object base viewport, the displayed first object information can be adjusted in the all of the first object dependent viewports, thereby providing a concurrent display of synchronized first object information in each of the viewports.

In a further implementation, an object model can be generated from sensor data in an acquired sensor data collection. The generated object model can comprise an object(s), feature(s), scene or location as defined by the system or as selected by a user. The generated object model can be displayed on the user display in a single user display window, and that object model can comprise the selected base visualization. The system can be configured to automatically identify relevant data associated with the generated object model as dependent information. The relevant data can comprise sensor data generated in a single sensor data acquisition event or in one or more sensor data acquisition events occurring at different times. The user can generate a user's viewport by navigating around the object model, and the dependent information can be updated continuously as the user navigates through and around the object model. For example, an object model can comprise an HVAC system on a roof. Relevant sensor data can be automatically generated to identify relevant features for that HVAC system, such as adjacent roof areas, electrical componentry, drainage, nearby equipment etc. A user can then be automatically presented with object(s), feature(s), scene, or location information to allow him to generate a point of view therefore that is assisted by presenting the relevant information to him as need to derive information for the generated object model.

Still further, the dependent information associated with the generated object model can comprise sensor data acquired over period of time to provide the user with a time series view of the generated object model. Referring again to the HVAC system, sensor data generated over a period of time in a plurality of sensor data acquisition events can be associated with the generated object model. The object model will then comprise a selected base visualization and the time series sensor data will comprise the non-selected sensor data. The user can view the generated object model over time as a function of changes in the dependent sensor data to view differences in the object model in each of a plurality of sensor data acquisition events. As an example, changes in an exterior coloration of the HVAC in a time series view of coloration can indicate rusting or deterioration of the HVAC housing. A further example of this time series implementation could be a roof location as a potential site for solar panels. Sensor data acquired over time for that roof location could be used to determine whether that roof location is suitable for solar panel installation, as well as providing information associated therewith (e.g., cost of installation, amount of power generated annually, maintenance costs, etc.).

Figure 16A:
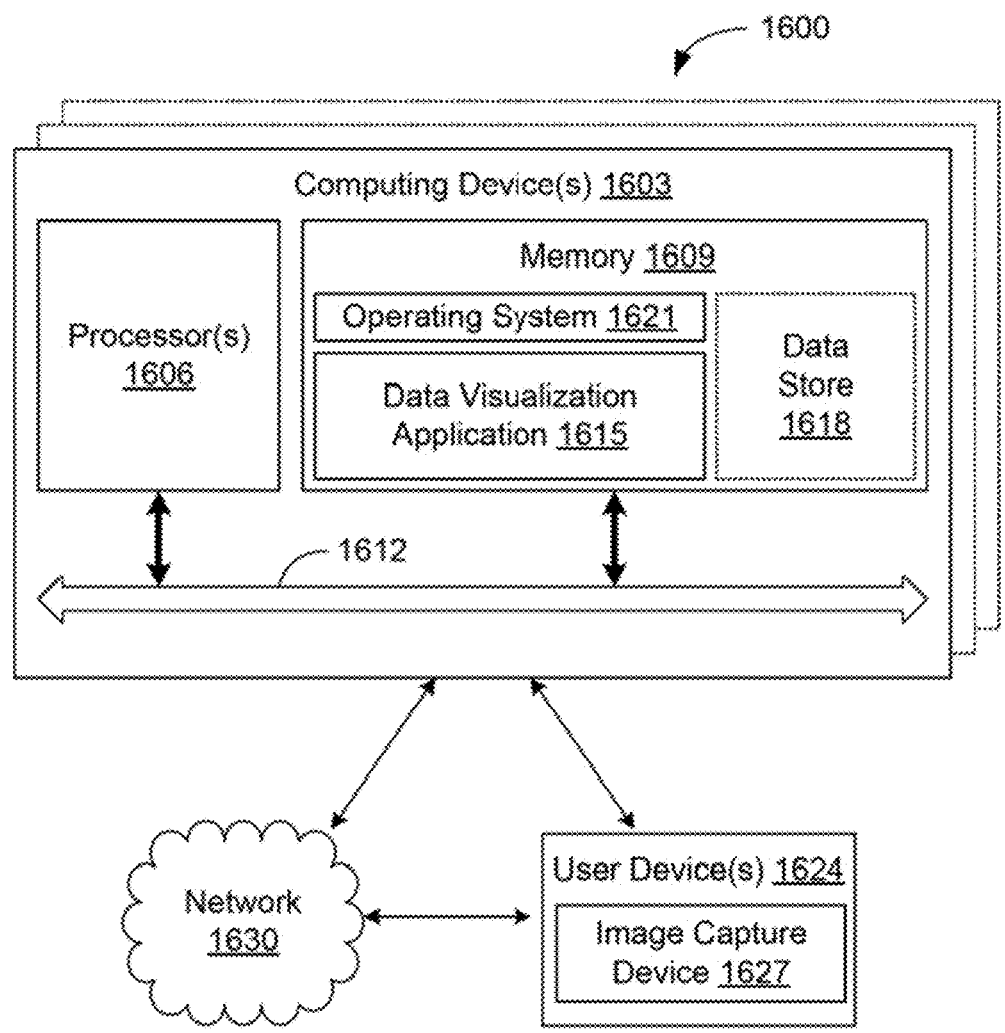
FIGS. 16A and 16B are block diagrams illustrating an example of a system that can be used for visualization of acquired sensor data, in accordance with various aspects of the present disclosure.

Referring now to FIG. 16A, shown is an example of a system 1600 that may be utilized for the data visualization methodology disclosed herein. The system 1600 can be one or more computing device(s) 1603 or other processing device(s), which includes at least one processor circuit, for example, having a processor 1606 and a memory 1609, both of which are coupled to a local interface 1612. To this end, the computing device(s) 1603 may comprise, for example, a server computer, mobile computing device (e.g., laptop, tablet, smart phone, etc.) or any other system providing computing capability. The computing device(s) 1603 may include, for example, one or more display or touch screen devices and various peripheral devices. Even though the computing device (or computer) 1603 is referred to in the singular, it is understood that a plurality of computing devices 1603 may be employed in the various arrangements as described above. The local interface 1612 may comprise, for example, a data bus with an accompanying address/control bus or other bus structure as can be appreciated.

Stored in the memory 1609 are both data and several components that are executable by the processor 1606. In particular, stored in the memory 1609 and executable by the processor 1606 include a data visualization application 1615 and potentially other applications. Also stored in the memory 1609 may be a data store 1618 and other data. The data stored in the data store 1618, for example, is associated with the operation of the various applications and/or functional entities described below. For example, the data store may include databases, object libraries, and other data or information as can be understood. In addition, an operating system 1621 may be stored in the memory 1609 and executable by the processor 1606. The data store 1618 may be located in a single computing device or may be dispersed among many different devices. The components executed on the computing device 1603 include, for example, the data visualization application 1615 and other systems, applications, services, processes, engines, or functionality not discussed in detail herein. It is understood that there may be other applications that are stored in the memory 1609 and are executable by the processor 1606 as can be appreciated. Where any component discussed herein is implemented in the form of software, any one of a number of programming languages may be employed.

The system 1600 can be configured to communicate with one or more user device(s) 1624 (e.g., an unmanned aerial vehicle, mobile computing device or other mobile user device) including an image capture device 1627. For example, the user device(s) 1624 can be communicatively coupled to the computing device(s) 1603 either directly through a wireless communication link or other appropriate wired or wireless communication channel, or indirectly through a network 1630 (e.g., WLAN, internet, cellular or other appropriate network or combination of networks). In this way, capture plan information, acquired image information or other information can be communicated between the computing device(s) 1603 and user device(s) 1624.

A number of software components are stored in the memory 1609 and are executable by the processor 1606. In this respect, the term "executable" means a program file that is in a form that can ultimately be run by the processor 1606. Examples of executable programs may be, for example, a compiled program that can be translated into machine instructions in a format that can be loaded into a random access portion of the memory 1609 and run by the processor 1606, source code that may be expressed in proper format such as object code that is capable of being loaded into a random access portion of the memory 1609 and executed by the processor 1606, or source code that may be interpreted by another executable program to generate instructions in a random access portion of the memory 1609 to be executed by the processor 1606, etc. An executable program may be stored in any portion or component of the memory 1609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1606 may represent multiple processors 1606 and the memory 1609 may represent multiple memories 1609 that operate in parallel processing circuits, respectively. In such a case, the local interface 1612 may be an appropriate network that facilitates communication between any two of the multiple processors 1606, between any processor 1606 and any of the memories 1609, or between any two of the memories 1609, etc. The local interface 1612 may comprise additional systems designed to coordinate this communication, including, for example, performing load balancing. The processor 1606 may be of electrical or of some other available construction.

Although the data visualization application 1615, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the data visualization application 1615, that comprises software or instructions can be embodied in any non-transitory computer-readable medium for use by or in connection with an instruction execution system such as, for example, a processor 1606 in a computer system or other system. In this sense, the logic may comprise, for example, statements including instructions and declarations that can be fetched from the computer-readable medium and executed by the instruction execution system. The flow diagrams of FIG. 15 shows an example of the architecture, functionality, and operation of possible implementations of a data visualization application 1615. In this regard, each block can represent a module, segment, or portion of code, which comprises one or more executable instructions for implementing the specified logical function(s). It should also be noted that in some alternative implementations, the functions noted in the blocks may occur out of the order noted in FIG. 15. For example, two blocks shown in succession in FIG. 15 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Figure 16B:
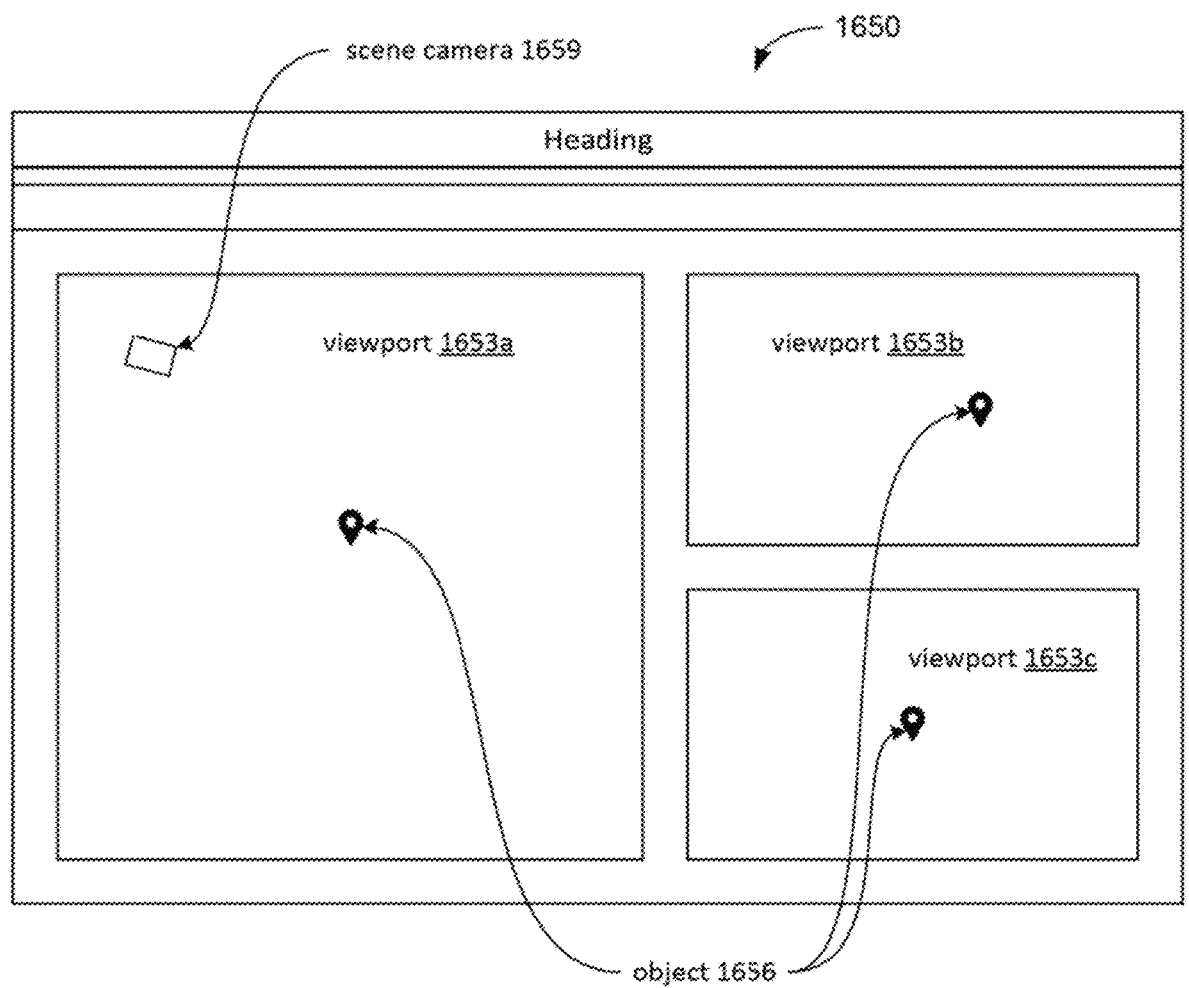

FIG. 16B illustrates an example of a user display of the system 1600 of FIG. 16A. The user display 1650 can include one or more viewports (e.g., viewports 1653*a*, 1653*b*, 1653*c*) for visualization of acquired sensor data for objects, components, or features of interest in a scene. For example, information about an object 1656 in a scene or location can be displayed in the viewports 1653 in a combination of renderings such as, e.g., a 3D rendering, a 2D image, etc. Different viewports 1653 can also display object information based on data acquired at different times. One of the viewports 1653 can be defined as an object base viewport (e.g., 1653*a*) and one or more of the other remaining viewports (e.g., 1653*b* and 1653*c*) can be identified as object dependent viewports as has been discussed. A scene camera 1659 can be navigated by a user within the object base viewport to control concurrent display of synchronized object information in each of the viewports 1653. In addition, the scene camera 1659 can be navigated in the user display between viewports 1653. For example, the scene camera 1659 can be moved from the current object base viewport to one of the object dependent viewports. When the scene camera 1659 is repositioned in the object dependent viewport, it can be redefined as the new object base viewport and the previous object base viewport can be identified as one of the object dependent viewports.

Communication media appropriate for use in or with the disclosures of the present disclosure may be exemplified by computer-readable instructions, data structures, program modules, or other data stored on non-transient computer-readable media and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described herein, the exemplary aspects have been described and illustrated in the drawings and the specification. The exemplary aspects were chosen and described in order to explain certain principles of the disclosure and their practical application, to thereby enable others skilled in the art to make and utilize various exemplary aspects of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A method of remotely inspecting a real-life object in a scene or location using a collection of previously acquired object-related data comprising:
   a. providing, by a computer, a stored data collection associated with an object of interest in a real-life scene or location, wherein:
      i. the stored data collection comprises at least two different data types associated with the object of interest, wherein one of the at least two different data types comprises or is derived from two-dimensional (2D) aerial images including the object of interest, and wherein:
         (1) each of the 2D aerial images is acquired by an unmanned aerial vehicle (UAV) configured with an imaging device, wherein the 2D aerial images are acquired while the UAV is navigated in and around the real-life scene or location during one or more UAV imaging events: and
         (2) each of the 2D aerial images includes information associated with both of a UAV imaging device location and orientation in the real-life scene or location when that 2D aerial image was acquired; and
   b. generating, by the computer, an object information display in a single user viewport configured on a user device, wherein the object information display:
      (1) comprises a first data type and at least one additional data type present in or derived from the stored data collection, wherein one of the data types is defined as a base data type and the at least one additional data type is defined as a dependent data type;
      (2) includes a 3D representation of all or part of the object of interest; and
      (3) prior to generation of the object information display each of the data types are synchronized by either of:
         (a) registering data for each of the data types in a single coordinate system; or
         (b) selecting a target coordinate system and calculating one or more transformations for data in each of the data types, wherein the one or more transformations enable representation of each of the data types in the target coordinate system;
   c. navigating, by a user, a scene camera to generate a user-selected positioning of the scene camera relative to the 3D representation of the object of interest as displayed in the single user viewport; and
   d. updating, by the computer, the object information display in real time as the scene camera is being navigated by the user in the single user viewport, wherein the updated object information display includes an object-centric visualization of the 3D representation of the object of interest derived from the user's positioning of the scene camera relative to the 3D representation as appearing in the single user viewport, and wherein the updated object information display is provided with a concurrent display of the at least one additional data type.

2. The method of claim 1, wherein the at least one additional data type comprises a 2D image of all or part of the object of interest or the real life scene or location in which the object is located, and wherein the 2D image is concurrently displayed as an overlay on the 3D representation.

3. The method of claim 1, wherein the object information display is generated all or in part from synthetic RGB image data derived from the 2D aerial image.

4. The method of claim 1, wherein user navigation of the scene camera results in scaling of one or more areas on the updated object information display as viewed by the user in the single user viewport.

5. The method of claim 1, wherein some of the user navigation is assisted by system identification of locations of interest appearing in the updated object information display or in an associated display of scene or location information.

6. The method of claim 1, wherein the user selects the at least two one additional data types used to generate the updated object information display, thereby providing a user selection of an object information display configuration in the single user viewport.

7. The method of claim 1, wherein a dependent data type included in or associated with the object information display or the updated object information display comprises or is derived from one or more of:
   a. building information model ("BIM") data;
   b. CAD drawings, sketches, or blueprints;
   c. catalogue data associated with the object of interest;
   d. voice or video recordings tagged with location, object instances, or object types; or
   e. notes or labels that are tagged with location, object instances, or object types.

8. The method of claim 1, wherein the at least one additional data type used to generate the object information display or the updated object information display comprises or is derived from:
   a. thermal image data;
   b. charge coupled device data;

c. photosensor data;
d. radio frequency (RF) data;
e. time/date information;
f. LIDAR data;
g. temperature data;
h. terrain elevation data;
i. solar data;
j. spherical image data;
k. building information model ("BIM") data;
l. weather data;
m. accelerometer data;
n. CAD drawings, sketches, or blueprints;
o. RGBD image data;
p. catalogue data associated with the object of interest;
q. voice or video recordings that are tagged with location, object instances, or object types; or
r. notes or labels that are tagged with location, object instances, or object types.

9. The method of claim 1, wherein the method further comprises:
a. recording, by the computer, information derived from user navigation of the scene camera in and around the 3D representation as visible in the single user viewport; and
b. configuring, by the computer, the recorded information for use in one or more of:
i. a report;
ii. a user dashboard;
iii. an updated data collection associated with the object of interest or real-life scene or location;
iv. navigation instructions for use in subsequent UAV aerial imaging events;
v. machine learning processes; or
vi. digital twin processes.

10. The method of claim 1, further comprising deriving object or scene or location information from the user navigation of the scene camera in and around the 3D representation as visible hi the in the single user viewport, wherein the object or scene or location information comprises one or more of:
a. measurement information;
b. geometry information;
c. topology information;
d. topography information; or
e. semantic information.

11. The method of claim 1, wherein the stored data collection is generated from a plurality of UAV aerial imaging events occurring at different times, and the method further comprises generating information about one or more differences in the object of interest or real-life scene or location at a plurality of times.

* * * * *